United States Patent
Itakura

(10) Patent No.: US 12,354,606 B2
(45) Date of Patent: Jul. 8, 2025

(54) SPEAKER IDENTIFICATION METHOD, SPEAKER IDENTIFICATION DEVICE, NON-TRANSITORY COMPUTER READABLE RECORDING MEDIUM STORING SPEAKER IDENTIFICATION PROGRAM, SEX IDENTIFICATION MODEL GENERATION METHOD, AND SPEAKER IDENTIFICATION MODEL GENERATION METHOD

(71) Applicant: Panasonic Intellectual Property Corporation of America, Torrance, CA (US)

(72) Inventor: Kousuke Itakura, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 233 days.

(21) Appl. No.: 17/949,682

(22) Filed: Sep. 21, 2022

(65) Prior Publication Data

US 2023/0016655 A1 Jan. 19, 2023

Related U.S. Application Data

(63) Continuation of application No. PCT/JP2021/005466, filed on Feb. 15, 2021.

(30) Foreign Application Priority Data

Mar. 27, 2020 (JP) .................................. 2020-057437

(51) Int. Cl.
*G10L 25/51* (2013.01)
*G10L 17/02* (2013.01)
(Continued)

(52) U.S. Cl.
CPC .............. *G10L 17/02* (2013.01); *G10L 25/51* (2013.01)

(58) Field of Classification Search
CPC ......... G10L 17/00; G10L 17/02; G10L 17/04; G10L 17/06; G10L 17/08; G10L 17/14;
(Continued)

(56) References Cited

U.S. PATENT DOCUMENTS

| 2008/0195387 A1* | 8/2008 | Zigel | G10L 17/06 704/E17.007 |
| 2012/0197629 A1* | 8/2012 | Nakamura | G10L 15/26 704/E15.003 |

(Continued)

FOREIGN PATENT DOCUMENTS

| CN | 110020167 | | 7/2019 |
| JP | 2014048534 A | * | 3/2014 |

(Continued)

OTHER PUBLICATIONS

Dehak et al., "Front-End Factor Analysis For Speaker Verification", IEEE Transactions on Audio, Speech and Language Processing, 2011, pp. 1-11.

(Continued)

*Primary Examiner* — Leshui Zhang
(74) *Attorney, Agent, or Firm* — Greenblum and Bernstein, P.L.C.

(57) ABSTRACT

A speaker identification device acquires identification target voice data; acquires registered voice data; selects a first speaker identification model machine-learned using male voice data to identify a male speaker in a case where one of a sex of a speaker of the identification target voice data and a sex of a speaker of the registered voice data is male, and selects a second speaker identification model machine-learned using female voice data to identify a female speaker (Continued)

in a case where one of a sex of the speaker of the identification target voice data and a sex of the speaker of the registered voice data is female; and inputs a feature amount of the identification target voice data and a feature amount of the registered voice data to one of the selected first speaker identification model and second speaker identification model to identify the speaker of the identification target voice data.

8 Claims, 42 Drawing Sheets

(51) Int. Cl.
*G10L 17/06* (2013.01)
*G10L 17/26* (2013.01)

(58) Field of Classification Search
CPC ......... G10L 17/18; G10L 17/22; G10L 17/26; G10L 25/51; G10L 15/22; G10L 15/06; G10L 15/02; G10L 15/063; G10L 15/07; G10L 15/08; G10L 15/04; G10L 15/20; G10L 13/033; G10L 17/20; G10L 17/12; G10L 17/24; G10L 17/10; G10L 15/16; G10L 15/183; G10L 25/30; G10L 25/63; G10L 2015/0631; G10L 2015/025; G10L 21/003; G10L 21/028; G06F 21/32; G06F 3/167; G06F 16/68; G06N 3/045; G06N 3/08; G06N 3/084; G06N 3/00; G06N 3/02; G06N 3/004

USPC .................. 704/200, 231, 232, 233, 235
See application file for complete search history.

(56) References Cited

U.S. PATENT DOCUMENTS

2013/0254787 A1\* 9/2013 Cox .................... H04N 21/252
 725/13
2018/0293990 A1\* 10/2018 Li ........................... G10L 17/18

FOREIGN PATENT DOCUMENTS

JP 2018-508799 A 3/2018
KR 10-2019-0024148 3/2019

OTHER PUBLICATIONS

Ranjan et al., "An I-Vector PLDA Based Gender Identification Approach for Severely Distorted and Multilingual Darpa Rats Data", IEEE Workshop on Automatic Speech Recognition and Understanding, Dec. 2015, pp. 331-337.
Snyder et al., "X-Vectors: Robust DNN Embeddings for Speaker Recognition", IEEE, ICASSP, 2018, pp. 5329-5333.
International Search Report (English Language Translation), mailed Apr. 20, 2021 by the Japan Patent Office (JPO), in International Application No. PCT/JP2021/005466.
Johan Rohdin et al., Robust 0-1 loss training for PLDA in speaker verification, Mar. 2014, p. 101-102.

\* cited by examiner

FIG.11

|  | SRE19 progress deataset | | | SRE19 evaluation dataset | | |
|---|---|---|---|---|---|---|
|  | EER(%) | minC | actC | EER(%) | minC | actC |
| CONVENTIONAL SPEAKER IDENTIFICATION DEVICE | 4.1255 | 0.31065 | 0.31763 | 3.7037 | 0.32098 | 0.32738 |
| SPEAKER IDENTIFICATION DEVICE OF FIRST EMBODIMENT | 3.7302 | 0.29214 | 0.29795 | 3.1762 | 0.27944 | 0.28269 |

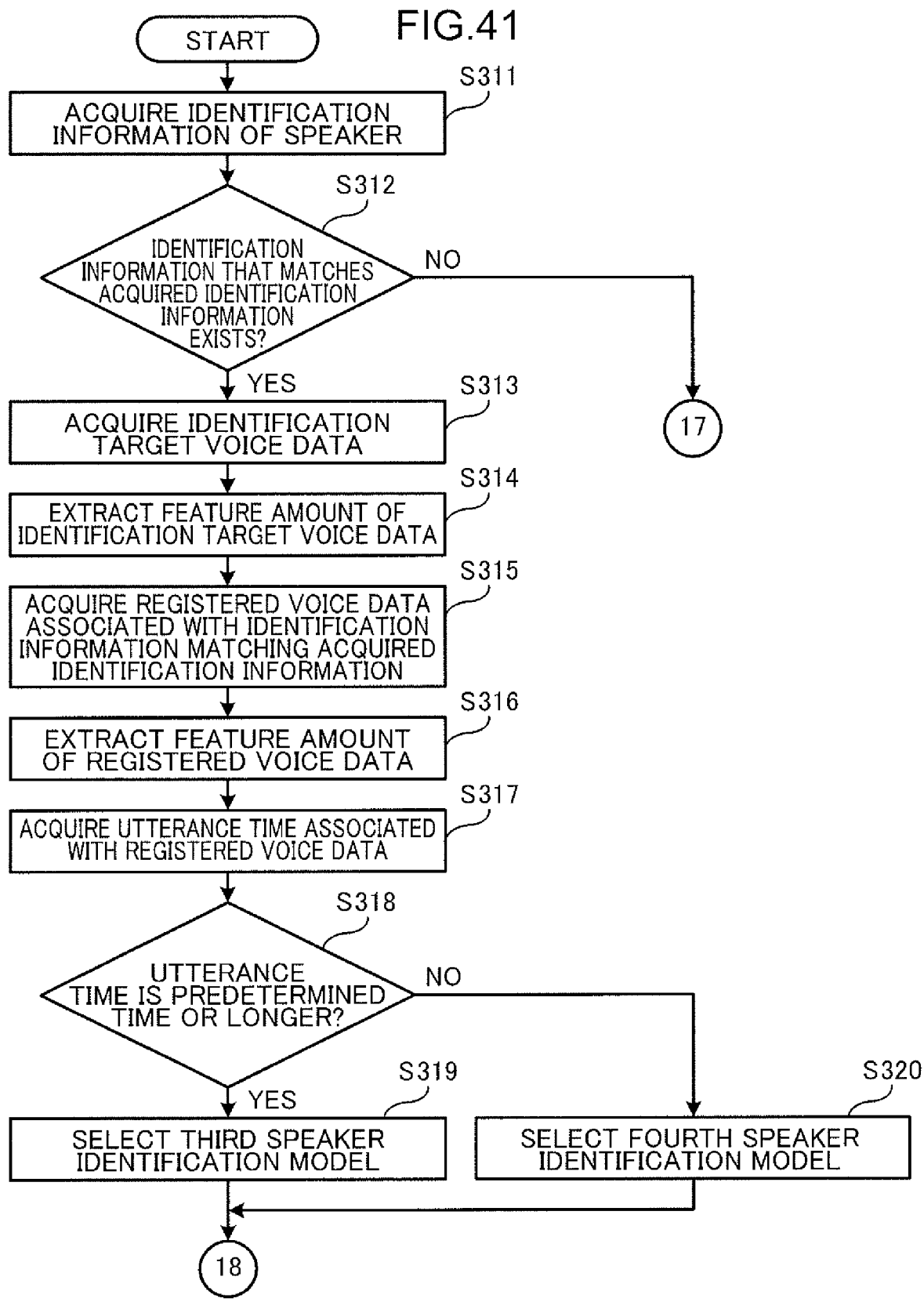

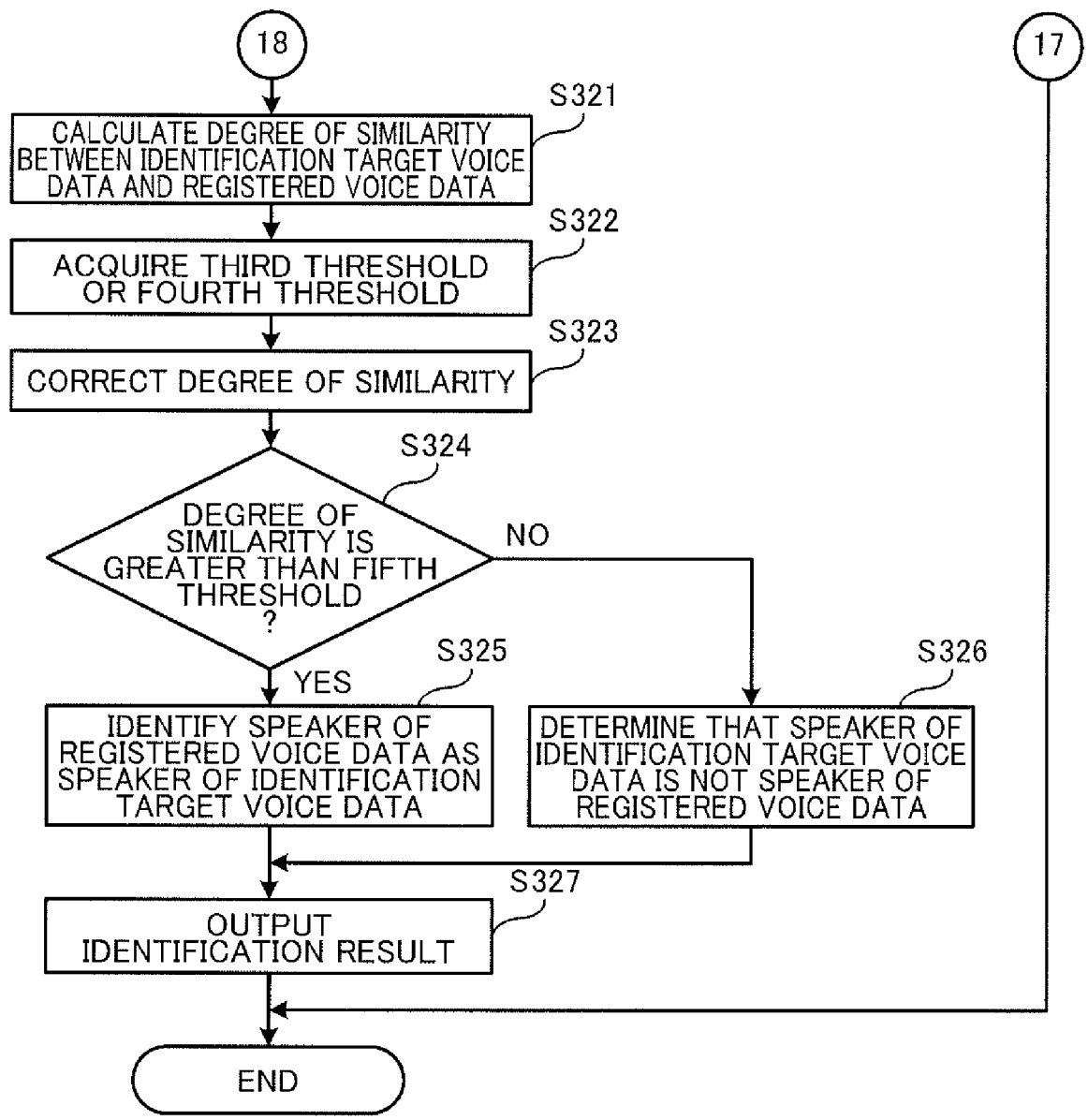

SPEAKER IDENTIFICATION METHOD, SPEAKER IDENTIFICATION DEVICE, NON-TRANSITORY COMPUTER READABLE RECORDING MEDIUM STORING SPEAKER IDENTIFICATION PROGRAM, SEX IDENTIFICATION MODEL GENERATION METHOD, AND SPEAKER IDENTIFICATION MODEL GENERATION METHOD

TECHNICAL FIELD

The present disclosure relates to a technique for identifying a speaker.

BACKGROUND ART

Conventionally, there is known a technique of acquiring voice data of an identification target speaker and identifying whether or not the identification target speaker is a speaker registered in advance on the basis of the acquired voice data. In conventional speaker identification, a degree of similarity between a feature amount of voice data of an identification target speaker and a feature amount of voice data of a registered speaker is calculated, and when the calculated degree of similarity is a threshold or greater, it is determined that the identification target speaker and the registered speaker are the same.

For example, Non-Patent Literature 1 discloses a speaker-specific feature amount called i-vector as a highly accurate feature amount for speaker identification.

Furthermore, for example, Non-Patent Literature 2 discloses x-vector as a feature amount replacing i-vector. x-vector is a feature amount extracted by inputting voice data to a deep neural network generated by deep learning.

However, in the conventional technique described above, further improvement is required in order to improve accuracy of identifying whether or not an identification target speaker is a speaker registered in advance.

CITATION LIST

Non Patent Literature

Non-Patent Literature 1: Najim Dehak, Patrick Kenny, Reda Dehak, Pierre Dumouchel, Pierre Ouellet, "Front-End Factor Analysis For Speaker Verification", IEEE Transactions on Audio, Speech and Language Processing, 2011

Non-Patent Literature 2: David Snyder, Daniel Garcia-Romero, Gregory Sell, Daniel Povery, Sanjeev Khudanpur, "X-Vectors: Robust DNN Embeddings for Speaker Recognition", IEEE, ICASSP 2018

SUMMARY OF INVENTION

The present disclosure has been made to solve the above problem, and an object of the present disclosure is to provide a technique enabling improvement of accuracy of identifying whether or not an identification target speaker is a speaker registered in advance.

A speaker identification method according to an aspect of the present disclosure includes, by a computer: acquiring identification target voice data; acquiring registered voice data registered in advance; extracting a feature amount of the identification target voice data; extracting a feature amount of the registered voice data; selecting a first speaker identification model machine-learned using male voice data to identify a male speaker in a case where one of a sex of a speaker of the identification target voice data and a sex of a speaker of the registered voice data is male, and selecting a second speaker identification model machine-learned using female voice data to identify a female speaker in a case where one of a sex of a speaker of the identification target voice data and a sex of a speaker of the registered voice data is female; and inputting the feature amount of the identification target voice data and the feature amount of the registered voice data to one of the selected first speaker identification model and second speaker identification model to identify the speaker of the identification target voice data.

According to the present disclosure, it is possible to improve accuracy of identifying whether or not an identification target speaker is a speaker registered in advance.

BRIEF DESCRIPTION OF DRAWINGS

FIG. 11 is a diagram illustrating a speaker identification performance evaluation result of a conventional speaker identification device and a speaker identification performance evaluation result of the speaker identification device according to the first embodiment.

FIG. 41 is a first flowchart for explaining operation of speaker identification processing of a speaker identification device according to the sixth embodiment.

FIG. 42 is a second flowchart for explaining the operation of the speaker identification processing of the speaker identification device according to the sixth embodiment.

Figure 1:
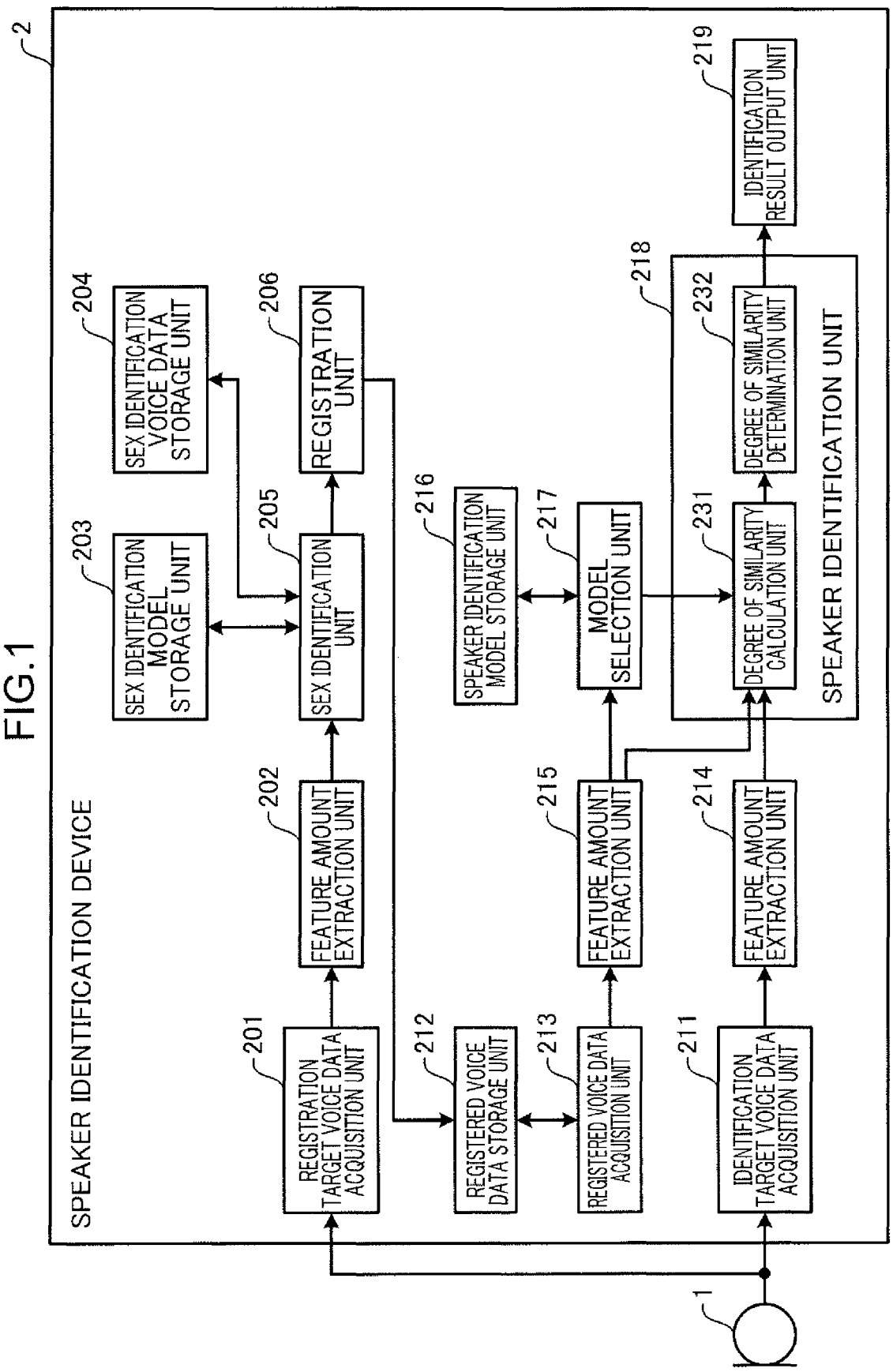
FIG. 1 is a diagram illustrating a configuration of a speaker identification system according to a first embodiment of the present disclosure.

DESCRIPTION OF EMBODIMENTS (Knowledge Underlying the Present Disclosure)

Male and female have different feature amount distributions of uttered voice data. However, a conventional speaker identification device identifies a speaker of voice data to be identified using a speaker identification model generated from voice data collected regardless of a sex of the speaker. Thus, in the conventional technique, speaker identification specialized for each of a male speaker and a female speaker has not been studied. Therefore, there is a possibility that accuracy of speaker identification is improved by performing speaker identification in consideration of sex.

In order to solve the above problems, a speaker identification method according to an aspect of the present disclosure includes, by a computer: acquiring identification target voice data; acquiring registered voice data registered in advance; extracting a feature amount of the identification target voice data; extracting a feature amount of the registered voice data; selecting a first speaker identification model machine-learned using male voice data to identify a male speaker in a case where one of a sex of a speaker of the identification target voice data and a sex of a speaker of the registered voice data is male, and selecting a second speaker identification model machine-learned using female voice data to identify a female speaker in a case where one of a sex of a speaker of the identification target voice data and a sex of a speaker of the registered voice data is female; and inputting the feature amount of the identification target voice data and the feature amount of the registered voice data to one of the selected first speaker identification model and second speaker identification model to identify the speaker of the identification target voice data.

According to this configuration, in a case where one of a sex of a speaker of the identification target voice data and a sex of a speaker of the registered voice data is male, a feature amount of the identification target voice data and a feature amount of the registered voice data are input to the first speaker identification model generated for males, thereby identifying the speaker of the identification target voice data. In addition, in a case where one of the sex of the speaker of the identification target voice data and the sex of the speaker of the registered voice data is female, the feature amount of the identification target voice data and the feature amount of the registered voice data are input to the second speaker identification model generated for females, thereby identifying the speaker of the identification target voice data.

Therefore, even in a case where a distribution of feature amounts of voice data differs depending on a sex, since a speaker of the identification target voice data is identified by the first speaker identification model and the second speaker identification model specialized for the respective sexes, the accuracy of identifying whether or not an identification target speaker is a speaker registered in advance can be improved.

In the speaker identification method described above, the selection of the first speaker identification model or the second speaker identification model may include: selecting the first speaker identification model in a case where the sex of the speaker of the registered voice data is male; and selecting the second speaker identification model in a case where the sex of the speaker of the registered voice data is female.

According to this configuration, one of the first speaker identification model and the second speaker identification model is selected according to a sex of a speaker of the registered voice data. Therefore, since a sex of a speaker of the registered voice data is identified only once in advance at the time of registration, it is not necessary to identify the sex of the identification target voice data for each speaker identification, and a processing load on the speaker identification can be reduced.

The speaker identification method described above may further include: acquiring registration target voice data; extracting a feature amount of the registration target voice data; identifying a sex of a speaker of the registration target voice data using the feature amount of the registration target voice data; and registering the registration target voice data associated with the identified sex as the registered voice data.

According to this configuration, the registered voice data associated with a sex can be registered in advance at the time of registration, and at the time of speaker identification, one of the first speaker identification model and the second speaker identification model can be easily selected using the sex associated with the registered voice data registered in advance.

Further, in the speaker identification method described above, the identification of the sex may include acquiring a sex identification model machine-learned by using male and female voice data to identify a sex of a speaker; and inputting the feature amount of the registration target voice data to the sex identification model to identify the sex of the speaker of the registration target voice data.

According to this configuration, it is possible to easily identify a sex of a speaker of the registration target voice data simply by inputting the registration target voice data to the sex identification model machine-learned using the male and female voice data to identify a sex of a speaker.

Further, in the speaker identification method described above, the identification of the sex may include: by inputting the feature amount of the registration target voice data and a feature amount of each of a plurality of pieces of male voice data stored in advance to the sex identification model, acquiring a degree of similarity between the registration target voice data and each of the plurality of pieces of male voice data from the sex identification model; calculating an average of the acquired plurality of degrees of similarity as an average male degree of similarity; by inputting the feature amount of the registration target voice data and a feature amount of each of a plurality of pieces of female voice data stored in advance to the sex identification model, acquiring a degree of similarity between the registration target voice data and each of the plurality of pieces of female voice data from the sex identification model; calculating an average of the acquired plurality of degrees of similarity as an average female degree of similarity; in a case where the average male degree of similarity is higher than the average female degree of similarity, identifying the sex of the speaker of the registration target voice data as male; and in a case where the average male degree of similarity is lower than the average female degree of similarity, identifying the sex of the speaker of the registration target voice data as female.

According to this configuration, in a case where a speaker of the registration target voice data is male, an average degree of similarity between a feature amount of the registration target voice data and feature amounts of the voice data of the plurality of males is higher than an average degree of similarity between the feature amount of the registration target voice data and feature amounts of the voice data of the plurality of females. In a case where a speaker of the registration target voice data is a female, the average degree of similarity between a feature amount of the registration target voice data and feature amounts of the voice data of the plurality of females is higher than the average degree of similarity between the feature amount of the registration target voice data and the feature amounts of the voice data of the plurality of males. Therefore, a sex of a speaker of the registration target voice data can be easily identified by comparing the average degree of similarity between the feature amount of the registration target voice data and the feature amounts of the voice data of the plurality of males with the average degree of similarity between the feature amount of the registration target voice data and the feature amounts of the voice data of the plurality of females.

In the speaker identification method described above, the identification of the sex may include: by inputting the feature amount of the registration target voice data and a feature amount of each of a plurality of pieces of male voice data stored in advance to the sex identification model, acquiring a degree of similarity between the registration target voice data and each of the plurality of pieces of male voice data from the sex identification model; calculating a maximum value among the acquired plurality of degrees of similarity as a maximum male degree of similarity; by inputting the feature amount of the registration target voice data and a feature amount of each of a plurality of pieces of female voice data stored in advance to the sex identification model, acquiring a degree of similarity between the registration target voice data and each of the plurality of pieces of female voice data from the sex identification model; calculating a maximum value among the acquired plurality of degrees of similarity as a maximum female degree of similarity; in a case where the maximum male degree of similarity is higher than the maximum female degree of similarity, identifying the sex of the speaker of the registration target voice data as male; and in a case where the maximum male degree of similarity is lower than the maximum female degree of similarity, identifying the sex of the speaker of the registration target voice data as female.

According to this configuration, in a case where a speaker of the registration target voice data is male, a maximum degree of similarity among a plurality of degrees of similarity between a feature amount of the registration target voice data and feature amounts of the voice data of the plurality of males is higher than a maximum degree of similarity among a plurality of degrees of similarity between the feature amount of the registration target voice data and feature amounts of the voice data of the plurality of females. In a case where a speaker of the registration target voice data is female, a maximum degree of similarity among a plurality of degrees of similarity between a feature amount of the registration target voice data and feature amounts of the voice data of the plurality of females is higher than a maximum degree of similarity among a plurality of degrees of similarity between the feature amount of the registration target voice data and feature amounts of the voice data of the plurality of males. Therefore, a sex of a speaker of the registration target voice data can be easily identified by comparing the maximum degree of similarity among the plurality of degrees of similarity between the feature amount of the registration target voice data and the feature amounts of the voice data of the plurality of males with the maximum degree of similarity among the plurality of degrees of similarity between the feature amount of the registration target voice data and the feature amounts of the voice data of the plurality of females.

Further, in the speaker identification method described above, the identification of the sex may include: calculating an average feature amount of a plurality of pieces of male voice data stored in advance; by inputting the feature amount of the registration target voice data and the average feature amount of the plurality of pieces of male voice data to the sex identification model, acquiring a first degree of similarity between the registration target voice data and a male voice data group from the sex identification model; calculating an average feature amount of a plurality of pieces of female voice data stored in advance; by inputting the feature amount of the registration target voice data and the average feature amount of the plurality of pieces of female voice data to the sex identification model, acquiring a second degree of similarity between the registration target voice data and a female voice data group from the sex identification model; in a case where the first degree of similarity is higher than the second degree of similarity, identifying the sex of the speaker of the registration target voice data as male; and in a case where the first degree of similarity is lower than the second degree of similarity, identifying the sex of the speaker of the registration target voice data as female.

According to this configuration, in a case where a speaker of the registration target voice data is male, the first degree of similarity between a feature amount of the registration target voice data and an average feature amount of the voice data of the plurality of males is higher than the second degree of similarity between the feature amount of the registration target voice data and an average feature amount of the voice data of the plurality of females. In a case where a speaker of the registration target voice data is a female, the second degree of similarity between the feature amount of the registration target voice data and the average feature amount of the voice data of the plurality of females is higher than the first degree of similarity between the feature amount of the registration target voice data and the average feature amount of the voice data of the plurality of males. Therefore, a sex of a speaker of the registration target voice data can be easily identified by comparing the first degree of similarity between the feature amount of the registration target voice data and the average feature amount of the voice data of the plurality of males with the second degree of similarity between the feature amount of the registration target voice data and the average feature amount of the voice data of the plurality of females.

In the speaker identification method described above, the registered voice data may include a plurality of pieces of registered voice data, and the identification of the speaker may include: by inputting the feature amount of the identification target voice data and the feature amount of each of the plurality of pieces of registered voice data to one of the selected first speaker identification model and second speaker identification model, acquiring a degree of similarity between the identification target voice data and each of the plurality of pieces of registered voice data from one of the first speaker identification model and the second speaker identification model; and identifying a speaker of the registered voice data whose acquired degree of similarity is highest as a speaker of the identification target voice data.

According to this configuration, a degree of similarity between the identification target voice data and each of the plurality of pieces of registered voice data is acquired from one of the first speaker identification model and the second speaker identification model, and a speaker of the registered voice data having the highest degree of similarity is identified as the speaker of the identification target voice data. Therefore, a speaker of the most similar registered voice data can be identified as the speaker of the identification target voice data from among the plurality of pieces of registered voice data.

Further, in the speaker identification method described above, the registered voice data may include a plurality of pieces of registered voice data, the plurality of pieces of registered voice data being associated with identification information for identifying a speaker of each of the plurality of pieces of registered voice data. The speaker identification method may further include: acquiring identification information for identifying a speaker of the identification target voice data, in which the acquisition of the registered voice data includes acquiring registered voice data associated with identification information matching the acquired identification information from among the plurality of pieces of registered voice data, and the identification of the speaker includes: by inputting the feature amount of the identification target voice data and the feature amount of the registered voice data to one of the selected first speaker identification model and second speaker identification model, acquiring a degree of similarity between the identification target voice data and the registered voice data from one of the first speaker identification model and the second speaker identification model; and in a case where the acquired degree of similarity is higher than a threshold, identifying the speaker of the registered voice data as the speaker of the identification target voice data.

According to this configuration, one piece of registered voice data associated with identification information that matches the identification information for identifying a speaker of the identification target voice data is acquired from the plurality of pieces of registered voice data. Therefore, it is not necessary to calculate a degree of similarity between feature amounts of all the registered voice data among the plurality of pieces of registered voice data and the feature amount of the identification target voice data, and it is sufficient to calculate a degree of similarity between a feature amount of one piece of registered voice data among the plurality of pieces of registered voice data and the feature amount of the identification target voice data, so that a processing load on speaker identification can be reduced.

Further, in the speaker identification method described above, in machine learning, by inputting all combinations of feature amounts of two pieces of voice data among a plurality of pieces of male voice data to the first speaker identification model, a degree of similarity of each of the plurality of combinations of the two pieces of voice data may be acquired from the first speaker identification model to calculate a first threshold that enables identification of the degree of similarity between the two pieces of voice data of a same speaker and the degree of similarity between the two pieces of voice data of different speakers, in machine learning, by inputting all combinations of feature amounts of two pieces of voice data among a plurality of pieces of female voice data to the second speaker identification model, a degree of similarity of each of the plurality of combinations of the two pieces of voice data may be acquired from the second speaker identification model to calculate a second threshold that enables identification of the degree of similarity between the two pieces of voice data of a same speaker and the degree of similarity between the two pieces of voice data of different speakers, and the identification of the speaker may include, in a case where the degree of similarity is acquired from the first speaker identification model, subtracting the first threshold from the acquired degree of similarity, and in a case where the degree of similarity is acquired from the second speaker identification model, subtracting the second threshold from the acquired degree of similarity.

In a case where two different first speaker identification model and second speaker identification model are used, the first speaker identification model and the second speaker identification model may have different ranges of output values. Therefore, at the time of registration, the first threshold and the second threshold that enable identification of the same speaker are calculated for the first speaker identification model and the second speaker identification model, respectively. In addition, at the time of speaker identification, the first threshold or the second threshold is subtracted from the calculated degree of similarity between the identification target voice data and the registered voice data to correct the degree of similarity. Then, the speaker of the identification target voice data is identified more accurately by comparing the corrected degree of similarity with the threshold common to the first speaker identification model and the second speaker identification model.

A speaker identification device according to another aspect of the present disclosure includes: an identification target voice data acquisition unit that acquires identification target voice data; a registered voice data acquisition unit that acquires registered voice data registered in advance; a first extraction unit that extracts a feature amount of the identification target voice data; a second extraction unit that extracts a feature amount of the registered voice data; a speaker identification model selection unit that selects a first speaker identification model machine-learned using male voice data to identify a male speaker in a case where one of a sex of a speaker of the identification target voice data and a sex of a speaker of the registered voice data is male, and selects a second speaker identification model machine-learned using female voice data to identify a female speaker in a case where one of a sex of a speaker of the identification target voice data and a sex of a speaker of the registered voice data is female; and a speaker identification unit that identifies the speaker of the identification target voice data by inputting the feature amount of the identification target voice data and the feature amount of the registered voice data to one of the selected first speaker identification model and second speaker identification model.

According to this configuration, in a case where one of a sex of a speaker of the identification target voice data and a sex of a speaker of the registered voice data is male, a feature amount of the identification target voice data and a feature amount of the registered voice data are input to the first speaker identification model generated for males, thereby identifying the speaker of the identification target voice data. In addition, in a case where one of the sex of the speaker of the identification target voice data and the sex of the speaker of the registered voice data is female, the feature amount of the identification target voice data and the feature amount of the registered voice data are input to the second speaker identification model generated for females, thereby identifying the speaker of the identification target voice data.

Therefore, even in a case where a distribution of feature amounts of voice data differs depending on a sex, since a speaker of the identification target voice data is identified by the first speaker identification model and the second speaker identification model specialized for the respective sexes, the accuracy of identifying whether or not an identification target speaker is a speaker registered in advance can be improved.

A non-transitory computer readable recording medium storing a speaker identification program according to yet another aspect of the present disclosure causes a computer to function to: acquire identification target voice data; acquire registered voice data registered in advance; extract a feature amount of the identification target voice data; extract a feature amount of the registered voice data; select a first speaker identification model machine-learned using male voice data to identify a male speaker in a case where one of a sex of a speaker of the identification target voice data and a sex of a speaker of the registered voice data is male, and select a second speaker identification model machine-learned using female voice data to identify a female speaker in a case where one of a sex of a speaker of the identification target voice data and a sex of a speaker of the registered voice data is female; and input the feature amount of the identification target voice data and the feature amount of the registered voice data to one of the selected first speaker identification model and second speaker identification model to identify the speaker of the identification target voice data.

According to this configuration, in a case where one of a sex of a speaker of the identification target voice data and a sex of a speaker of the registered voice data is male, a feature amount of the identification target voice data and a feature amount of the registered voice data are input to the first speaker identification model generated for males, thereby identifying the speaker of the identification target voice data. In addition, in a case where one of the sex of the speaker of the identification target voice data and the sex of the speaker of the registered voice data is female, the feature amount of the identification target voice data and the feature amount of the registered voice data are input to the second speaker identification model generated for females, thereby identifying the speaker of the identification target voice data.

Therefore, even in a case where a distribution of feature amounts of voice data differs depending on a sex, since a speaker of the identification target voice data is identified by the first speaker identification model and the second speaker identification model specialized for the respective sexes, the accuracy of identifying whether or not an identification target speaker is a speaker registered in advance can be improved.

A sex identification model generation method according to still another aspect of the present disclosure includes, by a computer: acquiring a plurality of pieces of voice data to which a sex label indicating one of male and female is assigned; and using, as teacher data, feature amounts of first voice data and second voice data among the plurality of pieces of voice data, and a degree of similarity between the sex labels of the first voice data and the second voice data, to generate, by machine learning, a sex identification model with feature amounts of two pieces of voice data as an input and a degree of similarity between the two pieces of voice data as an output.

According to this configuration, a feature amount of the registered voice data or the identification target voice data and a feature amount of the male voice data are input to the sex identification model generated by machine learning, whereby a first degree of similarity between the two pieces of voice data is output. In addition, when the feature amount of the registered voice data or the identification target voice data and a feature amount of the female voice data are input to the sex identification model, a second degree of similarity between the two pieces of voice data is output. Then, a sex of a speaker of the registered voice data or the identification target voice data can be easily estimated by comparing the first degree of similarity with the second degree of similarity.

A speaker identification model generation method according to still another aspect of the present disclosure includes, by a computer: acquiring a plurality of pieces of male voice data to which a speaker identification label for identifying a male speaker is assigned; using a feature amount of each of first male voice data and second male voice data among the plurality of pieces of male voice data and a degree of similarity between the speaker identification labels of the first male voice data and the second male voice data as teacher data, to generate, by machine learning, a first speaker identification model with each feature amount of two pieces of voice data as an input and a degree of similarity of the two pieces of voice data as an output; acquiring a plurality of pieces of female voice data to which a speaker identification label for identifying a female speaker is assigned; and using, as teacher data, a feature amount of each of first female voice data and second female voice data among the plurality of pieces of female voice data and a degree of similarity between the speaker identification labels of the first female voice data and the second female voice data, to generate, by machine learning, a second speaker identification model with each feature amount of two pieces of voice data as an input and a degree of similarity between the two pieces of voice data as an output.

According to this configuration, in a case where one of a sex of a speaker of the identification target voice data and a sex of a speaker of the registered voice data is male, a feature amount of the identification target voice data and a feature amount of the registered voice data are input to the first speaker identification model generated for males, thereby identifying the speaker of the identification target voice data. In addition, in a case where one of the sex of the speaker of the identification target voice data and the sex of the speaker of the registered voice data is female, the feature amount of the identification target voice data and the feature amount of the registered voice data are input to the second speaker identification model generated for females, thereby identifying the speaker of the identification target voice data.

Therefore, even in a case where a distribution of feature amounts of voice data differs depending on a sex, since a speaker of the identification target voice data is identified by the first speaker identification model specialized for a male and the second speaker identification model specialized for a female, the accuracy of identifying whether or not an identification target speaker is a speaker registered in advance can be improved.

Hereinafter, embodiments of the present disclosure will be described with reference to the accompanying drawings. Note that the following embodiments are examples embodying the present disclosure and do not limit a technical scope of the present disclosure.

First Embodiment

FIG. 1 is a diagram illustrating a configuration of a speaker identification system according to a first embodiment of the present disclosure.

The speaker identification system illustrated in FIG. 1 includes a microphone 1 and a speaker identification device 2. Note that the speaker identification device 2 may or may not include the microphone 1.

The microphone 1 collects voice uttered by a speaker, converts the voice into voice data, and outputs the voice data to the speaker identification device 2. When registering voice data in advance, the microphone 1 outputs registration target voice data uttered by the speaker to the speaker identification device 2. Further, when identifying a speaker, the microphone 1 outputs identification target voice data uttered by the speaker to the speaker identification device 2.

The speaker identification device 2 includes a registration target voice data acquisition unit 201, a feature amount extraction unit 202, a sex identification model storage unit 203, a sex identification voice data storage unit 204, a sex identification unit 205, a registration unit 206, an identification target voice data acquisition unit 211, a registered voice data storage unit 212, a registered voice data acquisition unit 213, a feature amount extraction unit 214, a feature amount extraction unit 215, a speaker identification model storage unit 216, a model selection unit 217, a speaker identification unit 218, and an identification result output unit 219.

The registration target voice data acquisition unit 201, the feature amount extraction unit 202, the sex identification unit 205, the registration unit 206, the identification target voice data acquisition unit 211, the registered voice data acquisition unit 213, the feature amount extraction unit 214, the feature amount extraction unit 215, the model selection unit 217, the speaker identification unit 218, and the identification result output unit 219 are implemented by a processor. The processor includes, for example, a central processing unit (CPU) or the like.

The sex identification model storage unit 203, the sex identification voice data storage unit 204, the registered voice data storage unit 212, and the speaker identification model storage unit 216 are implemented by a memory. The memory includes, for example, a read only memory (ROM), an electrically erasable programmable read only memory (EEPROM), or the like.

Note that the speaker identification device 2 may be, for example, a computer, a smartphone, a tablet computer, or a server.

The registration target voice data acquisition unit 201 acquires registration target voice data output from the microphone 1.

The feature amount extraction unit 202 extracts a feature amount of the registration target voice data acquired by the registration target voice data acquisition unit 201. The feature amount is, for example, i-vector. i-vector is a feature amount of a low-dimensional vector extracted from voice data by using a factor analysis for a Gaussian mixture model (GMM) supervector. Note that a method for extracting an i-vector is a conventional technique, and thus detailed description thereof will be omitted. Furthermore, the feature amount is not limited to the i-vector, and may be another feature amount such as an x-vector.

The sex identification model storage unit 203 stores in advance a sex identification model machine-learned using male and female voice data in order to identify a sex of a speaker. A method for generating a sex identification model will be described later.

The sex identification voice data storage unit 204 stores in advance a feature amount of sex identification voice data used to identify a sex of a speaker of registration target voice data. The sex identification voice data includes a plurality of pieces of male voice data and a plurality of pieces of female voice data. Note that although the sex identification voice data storage unit 204 stores a feature amount of sex identification voice data in advance, the present disclosure is not particularly limited thereto, and the sex identification voice data may be stored in advance. In this case, the speaker identification device 2 includes a feature amount extraction unit that extracts a feature amount of sex identification voice data.

The sex identification unit 205 identifies a sex of a speaker of registration target voice data using a feature amount of registration target voice data extracted by the feature amount extraction unit 202. The sex identification unit 205 acquires, from the sex identification model storage unit 203, a sex identification model machine-learned using male and female voice data to identify a sex of a speaker. The sex identification unit 205 identifies a sex of a speaker of registration target voice data by inputting a feature amount of registration target voice data to the sex identification model.

The sex identification unit 205 inputs the feature amount of the registration target voice data and the feature amount of each of the plurality of pieces of male voice data stored in advance in the sex identification voice data storage unit 204 to the sex identification model, thereby acquiring a degree of similarity between the registration target voice data and each of the plurality of pieces of male voice data from the sex identification model. Then, the sex identification unit 205 calculates an average of the acquired plurality of degrees of similarity as an average male degree of similarity.

The sex identification unit 205 also inputs the feature amount of the registration target voice data and a feature amount of each of the plurality of pieces of female voice data stored in advance in the sex identification voice data storage unit 204 to the sex identification model, thereby acquiring a degree of similarity between the registration target voice data and each of the plurality of pieces of female voice data from the sex identification model. Then, the sex identification unit 205 calculates an average of the acquired plurality of degrees of similarity as an average female degree of similarity.

In a case where the average male degree of similarity is higher than the average female degree of similarity, the sex identification unit 205 identifies the sex of the speaker of the registration target voice data as male. On the other hand, in a case where the average male degree of similarity is lower than the average female degree of similarity, the sex identification unit 205 identifies the sex of the speaker of the registration target voice data as female. In a case where the average male degree of similarity is the same as the average female degree of similarity, the sex identification unit 205 may identify the sex of the speaker of the registration target voice data as male, or may identify the sex of the speaker of the registration target voice data as female.

The registration unit 206 registers, as registered voice data, registration target voice data associated with sex information identified by the sex identification unit 205. The registration unit 206 registers the registered voice data in the registered voice data storage unit 212.

The speaker identification device 2 may further include an input reception unit that receives input of information on a speaker of registration target voice data. Then, the registration unit 206 may register registered voice data in the registered voice data storage unit 212 in association with the information on the speaker. Information on a speaker is, for example, a name of the speaker.

The identification target voice data acquisition unit 211 acquires identification target voice data output from the microphone 1.

The registered voice data storage unit 212 stores registered voice data associated with the sex information. The registered voice data storage unit 212 stores a plurality of pieces of registered voice data.

The registered voice data acquisition unit 213 acquires the registered voice data registered in the registered voice data storage unit 212.

The feature amount extraction unit 214 extracts a feature amount of identification target voice data acquired by the identification target voice data acquisition unit 211. The feature amount is, for example, i-vector.

The feature amount extraction unit 215 extracts a feature amount of the registered voice data acquired by the registered voice data acquisition unit 213. The feature amount is, for example, i-vector.

The speaker identification model storage unit 216 stores in advance a first speaker identification model machine-learned using male voice data to identify a male speaker and a second speaker identification model machine-learned using female voice data to identify a female speaker. The speaker identification model storage unit 216 stores in advance the first speaker identification model and the second speaker identification model generated by a speaker identification model generation device 4 to be described later. A method for generating the first speaker identification model and the second speaker identification model will be described later.

In a case where one of a sex of a speaker of identification target voice data and a sex of a speaker of registered voice data is male, the model selection unit 217 selects the first speaker identification model machine-learned using male voice data to identify a male speaker. In a case where one of a sex of a speaker of identification target voice data and a sex of a speaker of registered voice data is female, the model selection unit 217 selects the second speaker identification model machine-learned using female voice data to identify a female speaker.

In the first embodiment, the model selection unit 217 selects the first speaker identification model when the sex of the speaker of the registered voice data is male, and selects the second speaker identification model when the sex of the speaker of the registered voice data is female. A sex is associated with the registered voice data in advance. Therefore, the model selection unit 217 selects the first speaker identification model when a sex associated with the registered voice data is male, and selects the second speaker identification model when a sex associated with the registered voice data is female.

The speaker identification unit 218 identifies a speaker of identification target voice data by inputting a feature amount of the identification target voice data and a feature amount of the registered voice data to one of the first speaker identification model and the second speaker identification model selected by the model selection unit 217.

The speaker identification unit 218 includes a degree of similarity calculation unit 231 and a degree of similarity determination unit 232.

The degree of similarity calculation unit 231 inputs a feature amount of identification target voice data and a feature amount of each of the plurality of pieces of registered voice data to one of the selected first speaker identification model and second speaker identification model to acquire a degree of similarity between the identification target voice data and each of the plurality of pieces of registered voice data from one of the first speaker identification model and the second speaker identification model.

The degree of similarity determination unit 232 identifies a speaker of the registered voice data whose acquired degree of similarity is the highest as a speaker of the identification target voice data.

Note that the degree of similarity determination unit 232 may determine whether or not the highest degree of similarity is greater than a threshold. Even in a case where the registered voice data of the same speaker as the speaker of the identification target voice data does not exist in the registered voice data storage unit 212, a degree of similarity between the identification target voice data and each registered voice data is calculated. Therefore, even when the registered voice data has the highest degree of similarity, a speaker of the registered voice data is not necessarily the same as a speaker of the identification target voice data. Therefore, a speaker can be reliably identified by determining whether or not the highest degree of similarity is greater than the threshold.

The identification result output unit 219 outputs an identification result obtained by the speaker identification unit 218. The identification result output unit 219 is, for example, a display or a speaker, and outputs a message indicating that a speaker of the identification target voice data is a speaker registered in advance to the display or the speaker when the speaker of the identification target voice data is identified. On the other hand, when the speaker of the identification target voice data is not identified, the identification result output unit 219 outputs, to the display or the speaker, a message indicating that the speaker of the identification target voice data is not a speaker registered in advance. The identification result output unit 219 may output the identification result obtained by the speaker identification unit 218 to a device other than the speaker identification device 2.

Next, a sex identification model generation device according to the first embodiment of the present disclosure will be described.

Figure 2:
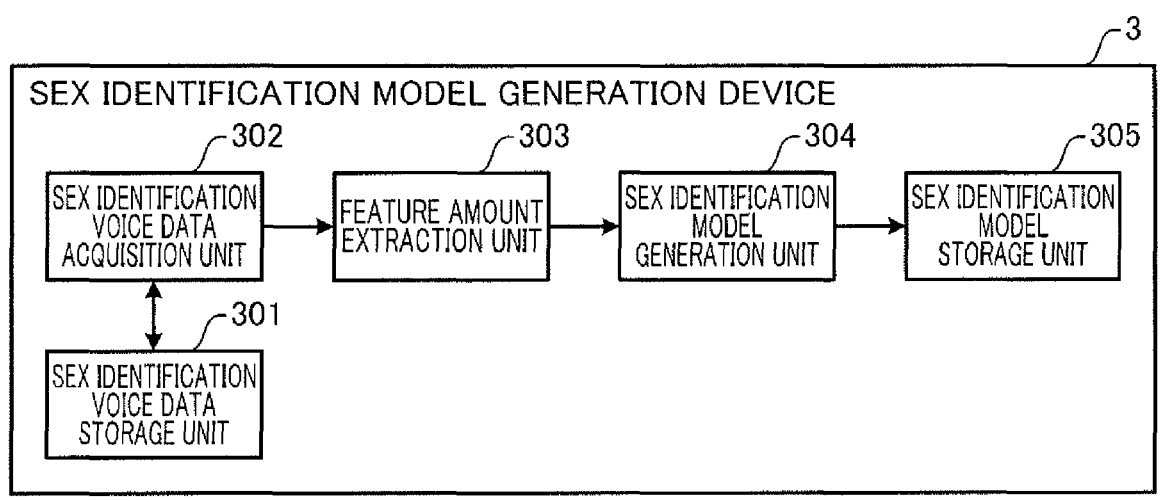
FIG. 2 is a diagram illustrating a configuration of a sex identification model generation device according to the first embodiment of the present disclosure.

FIG. 2 is a diagram illustrating a configuration of the sex identification model generation device according to the first embodiment of the present disclosure.

A sex identification model generation device 3 illustrated in FIG. 2 includes a sex identification voice data storage unit 301, a sex identification voice data acquisition unit 302, a feature amount extraction unit 303, a sex identification model generation unit 304, and a sex identification model storage unit 305.

The sex identification voice data acquisition unit 302, the feature amount extraction unit 303, and the sex identification model generation unit 304 are implemented by a processor. The sex identification voice data storage unit 301 and the sex identification model storage unit 305 are implemented by a memory.

The sex identification voice data storage unit 301 stores in advance a plurality of voice data to which a sex label indicating one of male and female is assigned. The sex identification voice data storage unit 301 stores a plurality of pieces of voice data different for each of a plurality of speakers.

The sex identification voice data acquisition unit 302 acquires, from the sex identification voice data storage unit 301, the plurality of pieces of voice data to which the sex label indicating one of male and female is assigned. Although in the first embodiment, the sex identification voice data acquisition unit 302 acquires a plurality of pieces of voice data from the sex identification voice data storage unit 301, the present disclosure is not particularly limited thereto, and a plurality of pieces of voice data may be acquired (received) from an external device via a network.

The feature amount extraction unit 303 extracts feature amounts of a plurality of pieces of voice data acquired by the sex identification voice data acquisition unit 302. The feature amount is, for example, i-vector.

The sex identification model generation unit 304 uses, as teacher data, a feature amount of each of first voice data and second voice data among the plurality of pieces of voice data, and a degree of similarity between the sex labels of the first voice data and the second voice data, to generate, by machine learning, a sex identification model with each feature amount of the two pieces of voice data as an input and a degree of similarity between the two pieces of voice data as an output. For example, the sex identification model is machine-learned such that the highest degree of similarity is output when a sex label of the first voice data is the same as a sex label of the second voice data, and the lowest degree of similarity is output when the sex label of the first voice data is different from the sex label of the second voice data.

As a sex identification model, a model based on probabilistic linear discriminant analysis (PLDA) is used. The PLDA model automatically selects a feature amount effective for speaker identification from 400 dimensional i-vector feature amounts, and calculates a logarithmic likelihood ratio as a degree of similarity.

Examples of the machine learning include supervised learning in which a relationship between an input and an output is learned using teacher data in which a label (output information) is assigned to input information, unsupervised learning in which a data structure is constructed only by an unlabeled input, semi-supervised learning in which both labeled and unlabeled input are handled, and reinforcement learning in which an action that maximizes a reward is learned by trial and error. Furthermore, as a specific method of machine learning, presented are a neural network (including deep learning using a multilayer neural network), genetic programming, a decision tree, a Bayesian network, a support vector machine (SVM), and the like. In the machine learning of the sex identification model, any of the specific examples described above may be used.

The sex identification model storage unit 305 stores the sex identification model generated by the sex identification model generation unit 304.

The sex identification model generation device 3 may transmit the sex identification model stored in the sex identification model storage unit 305 to the speaker identification device 2. The speaker identification device 2 may store the received sex identification model in the sex identification model storage unit 203. In addition, at the time of manufacturing the speaker identification device 2, the sex identification model generated by the sex identification model generation device 3 may be stored in the speaker identification device 2.

Further, although in the sex identification model generation device 3 of the first embodiment, a sex label indicating one of male and female is assigned to a plurality of pieces of voice data, the present disclosure is not particularly limited thereto, and identification information for identifying a speaker may be assigned as a label. In this case, the sex identification model generation unit 304 uses, as teacher data, a feature amount of each of the first voice data and the second voice data among the plurality of pieces of voice data and a degree of similarity between the respective pieces of identification information of the first voice data and the second voice data, to generate, by machine learning, a sex identification model with each feature amount of the two pieces of voice data as an input and a degree of similarity between the two pieces of voice data as an output. For example, the sex identification model is machine-learned such that the highest degree of similarity is output when identification information of the first voice data is the same as identification information of the second voice data, and the lowest degree of similarity is output when the identification information of the first voice data is different from the identification information of the second voice data.

Next, a speaker identification model generation device according to the first embodiment of the present disclosure will be described.

Figure 3:
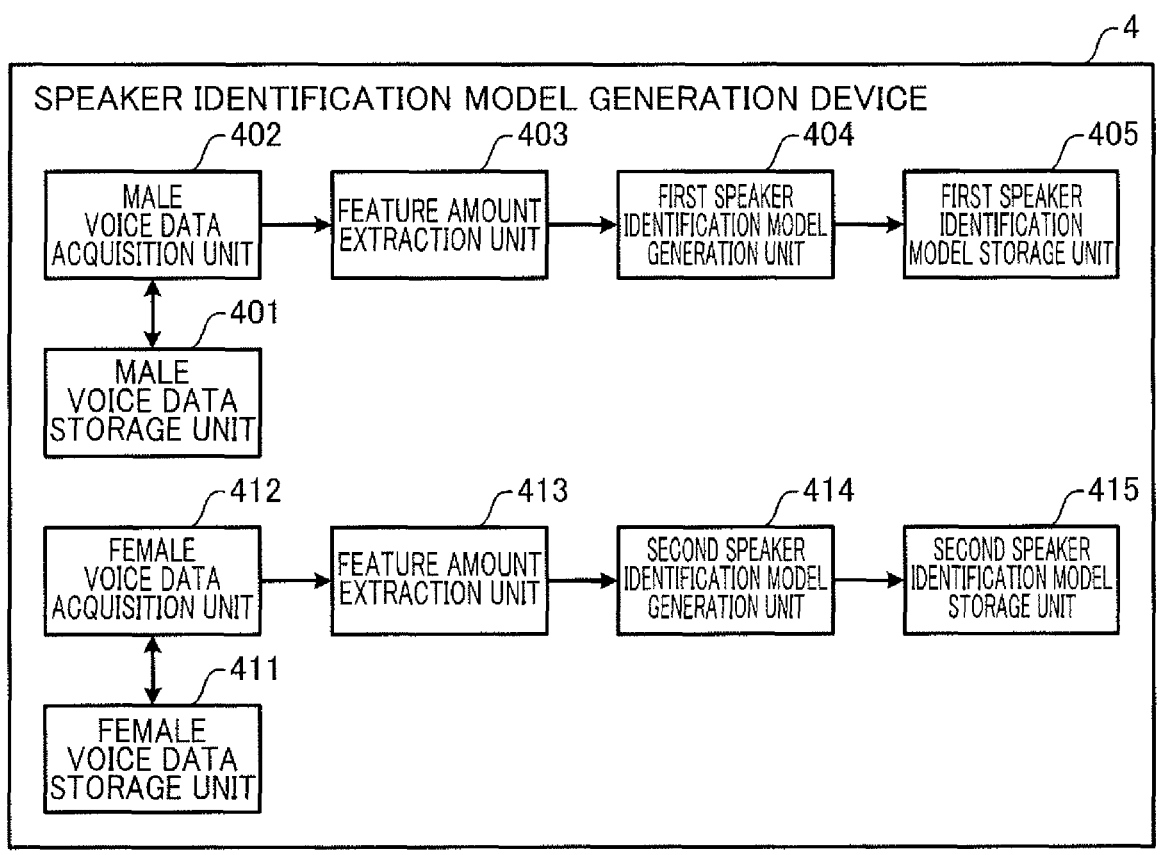
FIG. 3 is a diagram illustrating a configuration of a speaker identification model generation device according to the first embodiment of the present disclosure.

FIG. 3 is a diagram illustrating a configuration of the speaker identification model generation device according to the first embodiment of the present disclosure.

The speaker identification model generation device 4 illustrated in FIG. 3 includes a male voice data storage unit 401, a male voice data acquisition unit 402, a feature amount extraction unit 403, a first speaker identification model generation unit 404, a first speaker identification model storage unit 405, a female voice data storage unit 411, a female voice data acquisition unit 412, a feature amount extraction unit 413, a second speaker identification model generation unit 414, and a second speaker identification model storage unit 415.

The male voice data acquisition unit 402, the feature amount extraction unit 403, the first speaker identification model generation unit 404, the female voice data acquisition unit 412, the feature amount extraction unit 413, and the second speaker identification model generation unit 414 are implemented by a processor. The male voice data storage unit 401, the first speaker identification model storage unit 405, the female voice data storage unit 411, and the second speaker identification model storage unit 415 are implemented by a memory.

The male voice data storage unit 401 stores a plurality of pieces of male voice data to which a speaker identification label for identifying a male speaker is assigned. The male voice data storage unit 401 stores a plurality of pieces of male voice data different for each of a plurality of speakers.

The male voice data acquisition unit 402 acquires, from the male voice data storage unit 401, the plurality of pieces of male voice data to which the speaker identification label for identifying a male speaker is assigned. Although in the first embodiment, the male voice data acquisition unit 402 acquires the plurality of pieces of male voice data from the male voice data storage unit 401, the present disclosure is not particularly limited thereto, and the plurality of pieces of male voice data may be acquired (received) from an external device via a network.

The feature amount extraction unit 403 extracts feature amounts of the plurality of pieces of male voice data acquired by the male voice data acquisition unit 402. The feature amount is, for example, i-vector.

The first speaker identification model generation unit 404 uses, as teacher data, a feature amount of each of first male voice data and second male voice data among the plurality of pieces of male voice data and a degree of similarity between the speaker identification labels of the first male voice data and the second male voice data, to generate, by machine learning, a first speaker identification model with each feature amount of the two pieces of voice data as an input and a degree of similarity between the two pieces of voice data as an output. For example, the first speaker identification model is machine-learned such that the highest degree of similarity is output when a speaker identification label of the first male voice data is the same as a speaker identification label of the second male voice data, and the lowest degree of similarity is output when the speaker identification label of the first male voice data is different from the speaker identification label of the second male voice data.

As the first speaker identification model, a model based on PLDA is used. The PLDA model automatically selects a feature amount effective for speaker identification from 400 dimensional i-vectors (feature amounts), and calculates a logarithmic likelihood ratio as a degree of similarity.

Examples of the machine learning include supervised learning in which a relationship between an input and an output is learned using teacher data in which a label (output information) is assigned to input information, unsupervised learning in which a data structure is constructed only by an unlabeled input, semi-supervised learning in which both labeled and unlabeled input are handled, and reinforcement learning in which an action that maximizes a reward is learned by trial and error. Furthermore, as a specific method of machine learning, presented are a neural network (including deep learning using a multilayer neural network), genetic programming, a decision tree, a Bayesian network, a support vector machine (SVM), and the like. In the machine learning of the first speaker identification model, any of the specific examples described above may be used.

The first speaker identification model storage unit 405 stores the first speaker identification model generated by the first speaker identification model generation unit 404.

The female voice data storage unit 411 stores a plurality of pieces of female voice data to which a speaker identification label for identifying a female speaker is assigned. The female voice data storage unit 411 stores the plurality of pieces of female voice data different for each of a plurality of speakers.

The female voice data acquisition unit 412 acquires, from the female voice data storage unit 411, the plurality of pieces of female voice data to which a speaker identification label for identifying a female speaker is assigned. Although in the first embodiment, the female voice data acquisition unit 412 acquires the plurality of pieces of female voice data from the female voice data storage unit 411, the present disclosure is not particularly limited thereto, and a plurality of pieces of female voice data may be acquired (received) from an external device via a network.

The feature amount extraction unit 413 extracts feature amounts of the plurality of pieces of female voice data acquired by the female voice data acquisition unit 412. The feature amount is, for example, i-vector.

The second speaker identification model generation unit 414 uses, as teacher data, a feature amount of each of first female voice data and second female voice data among the plurality of pieces of female voice data and a degree of similarity between the speaker identification labels of the first female voice data and the second female voice data, to generate, by machine learning, a second speaker identification model with each feature amount of the two pieces of voice data as an input and a degree of similarity between the two pieces of voice data as an output. For example, the second speaker identification model is machine-learned such that the highest degree of similarity is output when a speaker identification label of the first female voice data is the same as a speaker identification label of the second female voice data, and the lowest degree of similarity is output when the speaker identification label of the first female voice data is different from the speaker identification label of the second female voice data.

As the second speaker identification model, a model based on PLDA is used. The PLDA model automatically selects a feature amount effective for speaker identification from 400 dimensional i-vectors (feature amounts), and calculates a logarithmic likelihood ratio as a degree of similarity.

Examples of the machine learning include supervised learning in which a relationship between an input and an output is learned using teacher data in which a label (output information) is assigned to input information, unsupervised learning in which a data structure is constructed only by an unlabeled input, semi-supervised learning in which both labeled and unlabeled input are handled, and reinforcement learning in which an action that maximizes a reward is learned by trial and error. Furthermore, as a specific method of machine learning, presented are a neural network (including deep learning using a multilayer neural network), genetic programming, a decision tree, a Bayesian network, a support vector machine (SVM), and the like. In the machine learning of the second speaker identification model, any of the specific examples described above may be used.

The second speaker identification model storage unit 415 stores the second speaker identification model generated by the second speaker identification model generation unit 414.

The speaker identification model generation device 4 may transmit the first speaker identification model stored in the first speaker identification model storage unit 405 and the second speaker identification model stored in the second speaker identification model storage unit 415 to the speaker identification device 2. The speaker identification device 2 may store the received first speaker identification model and second speaker identification model in the speaker identification model storage unit 216. In addition, at the time of manufacturing the speaker identification device 2, the first speaker identification model and the second speaker identification model generated by the speaker identification model generation device 4 may be stored in the speaker identification device 2.

Next, operation of each of registration processing and speaker identification processing of the speaker identification device 2 in the first embodiment will be described.

Figure 4:
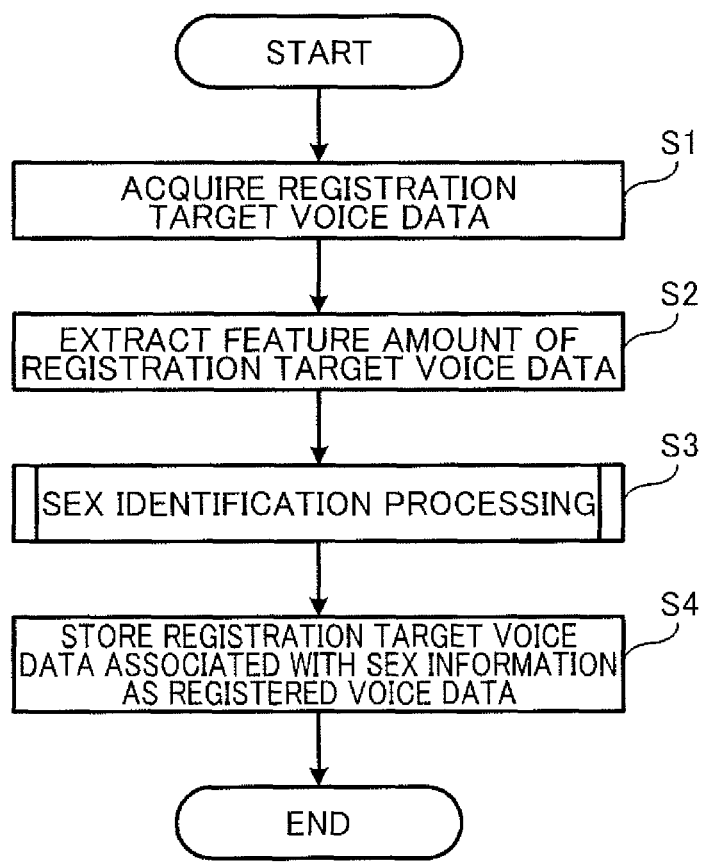
FIG. 4 is a flowchart for explaining operation of registration processing of a speaker identification device according to the first embodiment.

FIG. 4 is a flowchart for explaining the operation of the registration processing of the speaker identification device in the first embodiment.

First, in Step S1, the registration target voice data acquisition unit 201 acquires registration target voice data output from the microphone 1. A speaker who wishes to register voice data uttered by himself/herself utters a predetermined sentence toward the microphone 1. At this time, the sentence of the registration target voice data is preferably longer than a sentence of the identification target voice data. The accuracy of speaker identification can be improved by acquiring registration target voice data having a relatively large number of characters. In addition, the speaker identification device 2 may present a plurality of predetermined sentences to a registration target speaker. In this case, the registration target speaker utters the plurality of presented sentences.

Next, in Step S2, the feature amount extraction unit 202 extracts a feature amount of the registration target voice data acquired by the registration target voice data acquisition unit 201.

Next, in Step S3, the sex identification unit 205 performs sex identification processing of identifying a sex of the speaker of the registration target voice data using the feature amount of the registration target voice data extracted by the feature amount extraction unit 202. The sex identification processing will be described later.

Next, in Step S4, the registration unit 206 stores, as registered voice data, the registration target voice data associated with sex information identified by the sex identification unit 205 in the registered voice data storage unit 212.

Figure 5:
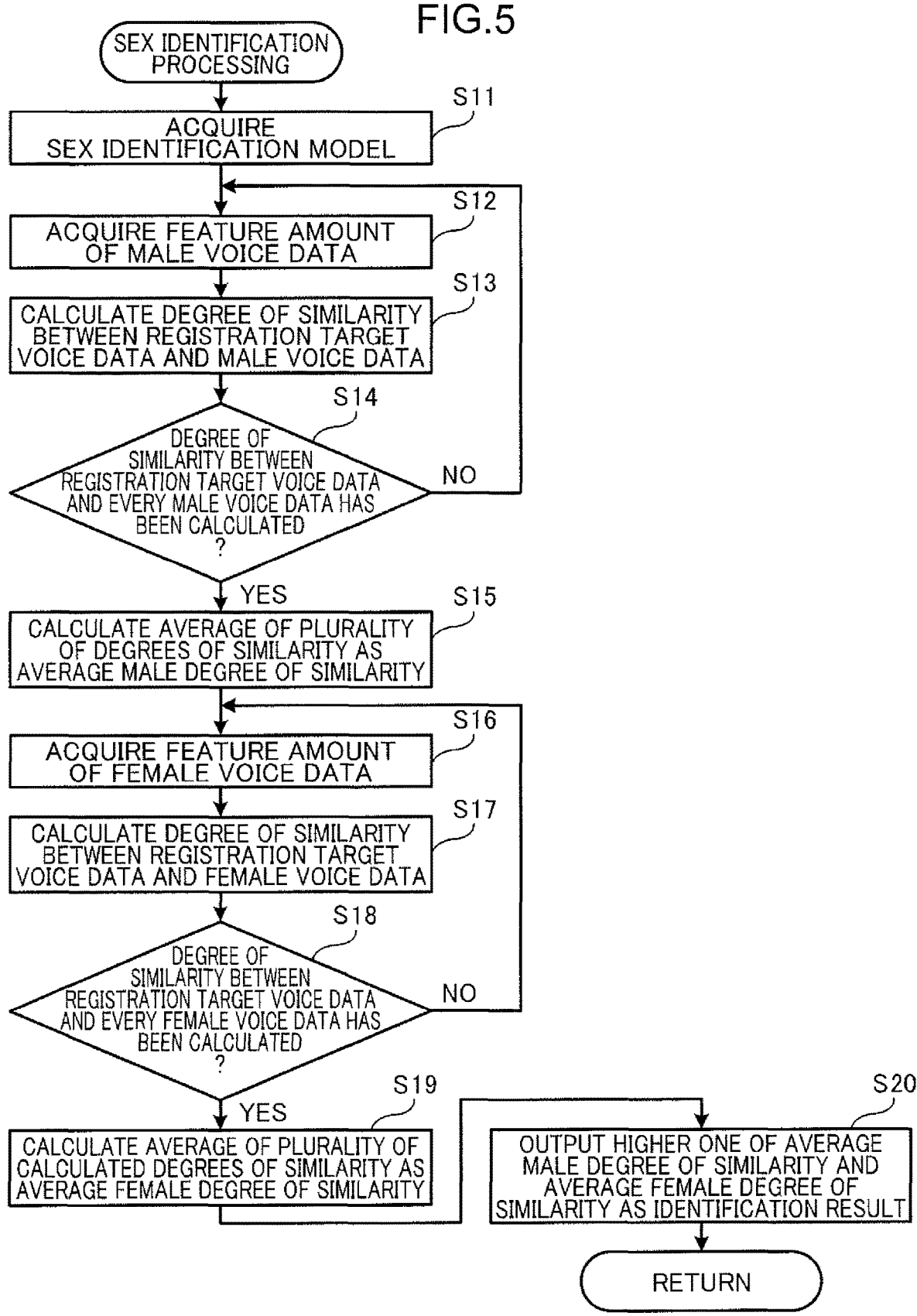
FIG. 5 is a flowchart for explaining operation of sex identification processing in Step S3 of FIG. 4.

FIG. 5 is a flowchart for explaining operation of the sex identification processing in Step S3 of FIG. 4.

First, in Step S11, the sex identification unit 205 acquires the sex identification model from the sex identification model storage unit 203. The sex identification model is a sex identification model machine-learned by using, as teacher data, a feature amount of each of the first voice data and the second voice data among the plurality of pieces of voice data and a degree of similarity between the sex labels of the first voice data and the second voice data. Note that the sex identification model may be a sex identification model machine-learned by using, as teacher data, a feature amount of each of the first voice data and the second voice data among the plurality of pieces of voice data and a degree of similarity between the respective pieces of identification information of the first voice data and the second voice data.

Next, in Step S12, the sex identification unit 205 acquires a feature amount of the male voice data from the sex identification voice data storage unit 204.

Next, in Step S13, the sex identification unit 205 inputs the feature amount of the registration target voice data and the feature amount of the male voice data to the sex identification model to calculate a degree of similarity between the registration target voice data and the male voice data.

Next, in Step S14, the sex identification unit 205 determines whether or not a degree of similarity between the registration target voice data and every male voice data has been calculated. In a case where it is determined here that the degree of similarity between the registration target voice data and every male voice data has not been calculated (NO in Step S14), the processing returns to Step S12. Then, the sex identification unit 205 acquires, from the sex identification voice data storage unit 204, a feature amount of the male voice data whose degree of similarity is yet to be calculated from among the feature amounts of the plurality of pieces of male voice data.

On the other hand, in a case where it is determined that the degree of similarity between the registration target voice data and every male voice data has been calculated (YES in Step S14), in Step S15, the sex identification unit 205 calculates an average of the plurality of calculated degrees of similarity as an average male degree of similarity.

Next, in Step S16, the sex identification unit 205 acquires a feature amount of the female voice data from the sex identification voice data storage unit 204.

Next, in Step S17, the sex identification unit 205 inputs the feature amount of the registration target voice data and the feature amount of the female voice data to the sex identification model to calculate a degree of similarity between the registration target voice data and the female voice data.

Next, in Step S18, the sex identification unit 205 determines whether or not a degree of similarity between the registration target voice data and every female voice data has been calculated. In a case where it is determined here that the degree of similarity between the registration target voice data and every female voice data has not been calculated (NO in Step S18), the processing returns to step S16. Then, the sex identification unit 205 acquires, from the sex identification voice data storage unit 204, a feature amount of the female voice data whose degree of similarity is yet to be calculated from among the feature amounts of the plurality of pieces of female voice data.

On the other hand, in a case where it is determined that the degree of similarity between the registration target voice data and every female voice data has been calculated (YES in Step S18), in Step S19, the sex identification unit 205 calculates an average of the plurality of calculated degrees of similarity as an average female degree of similarity.

Next, in Step S20, the sex identification unit 205 outputs the higher one of the average male degree of similarity and the average female degree of similarity to the registration unit 206 as an identification result.

Figure 6:
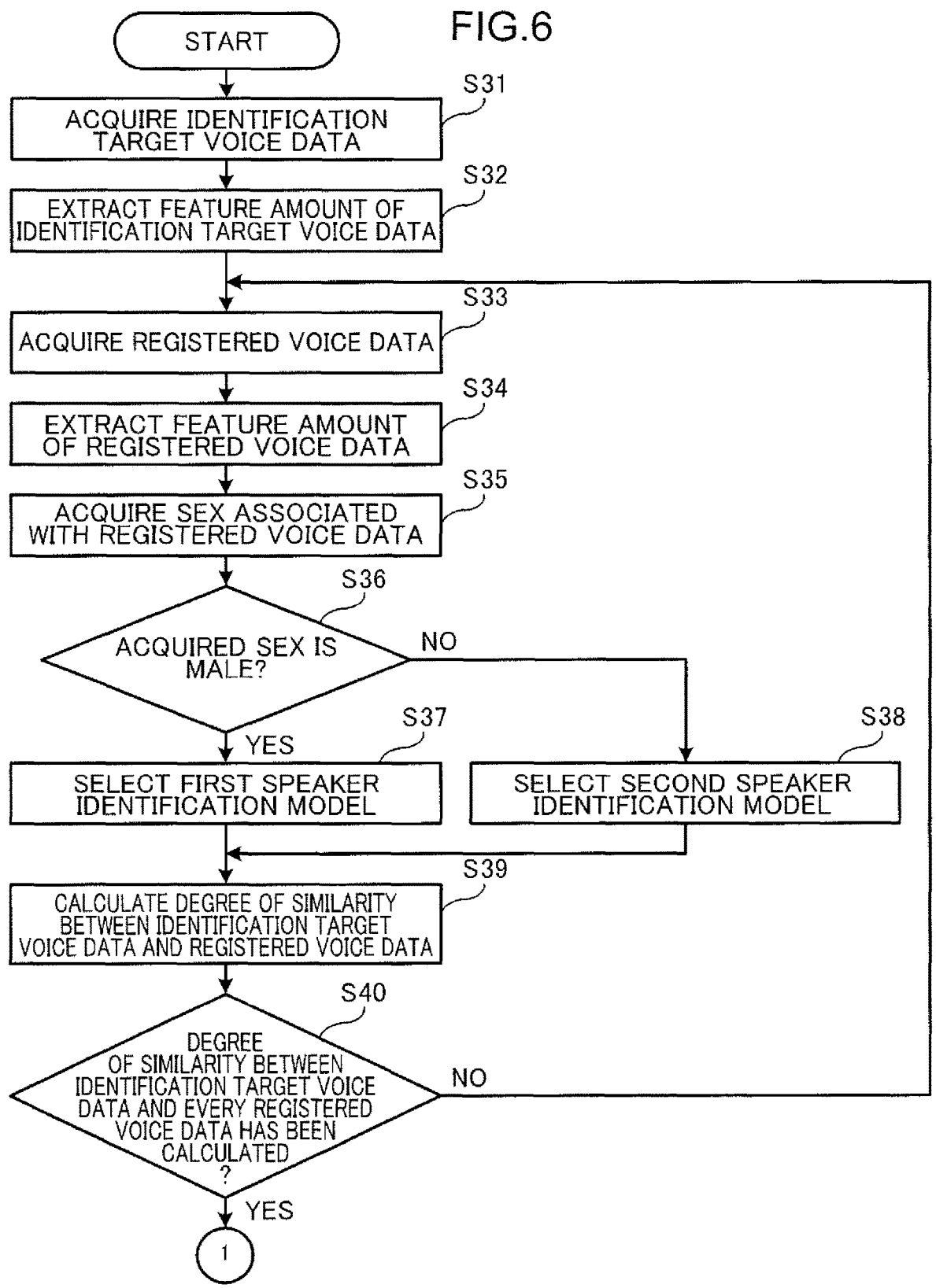
FIG. 6 is a first flowchart for explaining operation of speaker identification processing of the speaker identification device according to the first embodiment.
Figure 7:
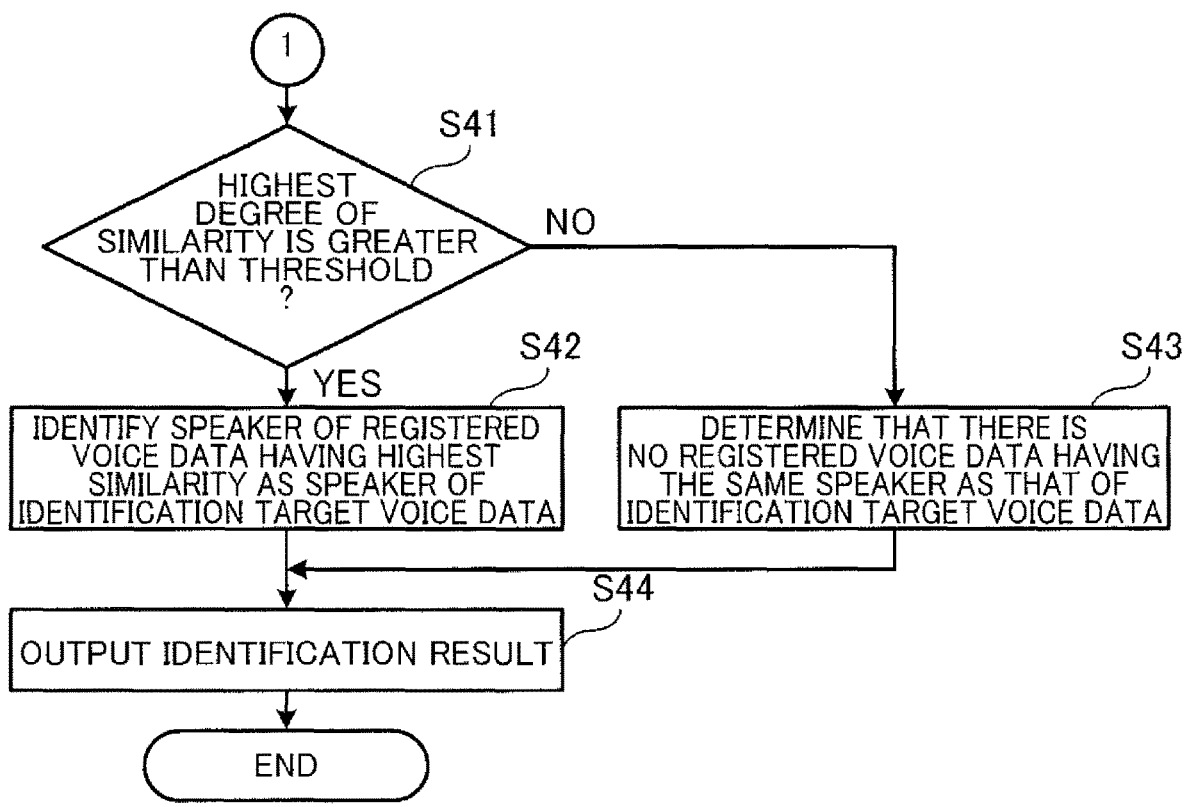
FIG. 7 is a second flowchart for explaining the operation of the speaker identification processing of the speaker identification device according to the first embodiment.

FIG. 6 is a first flowchart for explaining operation of the speaker identification processing of the speaker identification device in the first embodiment, and FIG. 7 is a second flowchart for explaining the operation of the speaker identification processing of the speaker identification device in the first embodiment.

First, in Step S31, the identification target voice data acquisition unit 211 acquires the identification target voice data output from the microphone 1. An identification target speaker speaks toward the microphone 1. The microphone 1 collects voice uttered by the identification target speaker and outputs the identification target voice data.

Next, in Step S32, the feature amount extraction unit 214 extracts a feature amount of the identification target voice data acquired by the identification target voice data acquisition unit 211.

Next, in Step S33, the registered voice data acquisition unit 213 acquires the registered voice data from the registered voice data storage unit 212. At this time, the registered voice data acquisition unit 213 acquires one piece of registered voice data from the plurality of pieces of registered voice data that are registered in the registered voice data storage unit 212.

Next, in Step S34, the feature amount extraction unit 215 extracts a feature amount of the registered voice data acquired by the registered voice data acquisition unit 213.

Next, in Step S35, the model selection unit 217 acquires a sex associated with the registered voice data acquired by the registered voice data acquisition unit 213.

Next, in Step S36, the model selection unit 217 determines whether or not the acquired sex is male. In a case where it is determined here that the acquired sex is male (YES in Step S36), the model selection unit 217 selects the first speaker identification model in Step S37. The model selection unit 217 acquires the selected first speaker identification model from the speaker identification model storage unit 216, and outputs the acquired first speaker identification model to the degree of similarity calculation unit 231.

On the other hand, in a case where it is determined that the acquired sex is not male, i.e., in a case where it is determined that the acquired sex is female (NO in Step S36), the model selection unit 217 selects the second speaker identification model in Step S38. The model selection unit 217 acquires the selected second speaker identification model from the speaker identification model storage unit 216, and outputs the acquired second speaker identification model to the degree of similarity calculation unit 231.

Next, in Step S39, the degree of similarity calculation unit 231 inputs the feature amount of the identification target voice data and the feature amount of the registered voice data to one of the selected first speaker identification model and second speaker identification model to calculate a degree of similarity between the identification target voice data and the registered voice data.

Next, in Step S40, the degree of similarity calculation unit 231 determines whether or not a degree of similarity between the identification target voice data and every registered voice data stored in the registered voice data storage unit 212 has been calculated. In a case where it is determined here that the degree of similarity between the identification target voice data and every registered voice data has not been calculated (NO in Step S40), the processing returns to Step S33. Then, the registered voice data acquisition unit 213 acquires registered voice data whose degree of similarity is yet to be calculated from among the plurality of pieces of registered voice data stored in the registered voice data storage unit 212.

On the other hand, in a case where it is determined that the degree of similarity between the identification target voice data and every registered voice data has been calculated (YES in Step S40), in Step S41, the degree of similarity determination unit 232 determines whether or not the highest degree of similarity is greater than the threshold.

In a case where it is determined here that the highest degree of similarity is greater than the threshold (YES in Step S41), in Step S42, the degree of similarity determination unit 232 identifies a speaker of the registered voice data having the highest degree of similarity as the speaker of the identification target voice data.

On the other hand, in a case where it is determined that the highest degree of similarity is the threshold or lower (NO in Step S41), in Step S43, the degree of similarity determination unit 232 determines that there is no registered voice data having the same speaker as that of the identification target voice data among the plurality of pieces of registered voice data.

Next, in Step S44, the identification result output unit 219 outputs an identification result obtained by the speaker identification unit 218. In a case where the speaker of the identification target voice data is identified, the identification result output unit 219 outputs a message indicating that the speaker of the identification target voice data is a speaker registered in advance. On the other hand, in a case where the speaker of the identification target voice data is not identified, the identification result output unit 219 outputs a message indicating that the speaker of the identification target voice data is not a speaker registered in advance.

As described above, in a case where the sex of one of the speaker of the identification target voice data and the speaker of the registered voice data is male, the speaker of the identification target voice data is identified by inputting the feature amount of the identification target voice data and the feature amount of the registered voice data to the first speaker identification model generated for males. In addition, in a case where one of the sex of the speaker of the identification target voice data and the sex of the speaker of the registered voice data is female, the feature amount of the identification target voice data and the feature amount of the registered voice data are input to the second speaker identification model generated for females, thereby identifying the speaker of the identification target voice data.

Therefore, even in a case where a distribution of feature amounts of voice data differs depending on a sex, since a speaker of the identification target voice data is identified by the first speaker identification model and the second speaker identification model specialized for the respective sexes, the accuracy of identifying whether or not an identification target speaker is a speaker registered in advance can be improved.

Although in the first embodiment, the model selection unit 217 selects one of the first speaker identification model and the second speaker identification model on the basis of a sex of a speaker of the registered voice data, the present disclosure is not particularly limited thereto. The model selection unit 217 may select one of the first speaker identification model and the second speaker identification model on the basis of a sex of a speaker of the identification target voice data. In this case, the speaker identification device 2 includes a sex identification unit that identifies a sex of a speaker of identification target voice data, a sex identification model storage unit that stores in advance a sex identification model machine-learned using male and female voice data to identify a sex of a speaker, and a sex identification voice data storage unit that stores in advance a feature amount of sex identification voice data for use to identify a sex of a speaker of identification target voice data. The sex identification unit, the sex identification model storage unit, and the sex identification voice data storage unit have the same configurations as the sex identification unit 205, the sex identification model storage unit 203, and the sex identification voice data storage unit 204 described above. In addition, in a case of identifying a sex of a speaker of identification target voice data, the sex identification unit 205, the sex identification model storage unit 203, and the sex identification voice data storage unit 204 are unnecessary.

Next, operation of sex identification model generation processing of the sex identification model generation device 3 in the first embodiment will be described.

Figure 8:
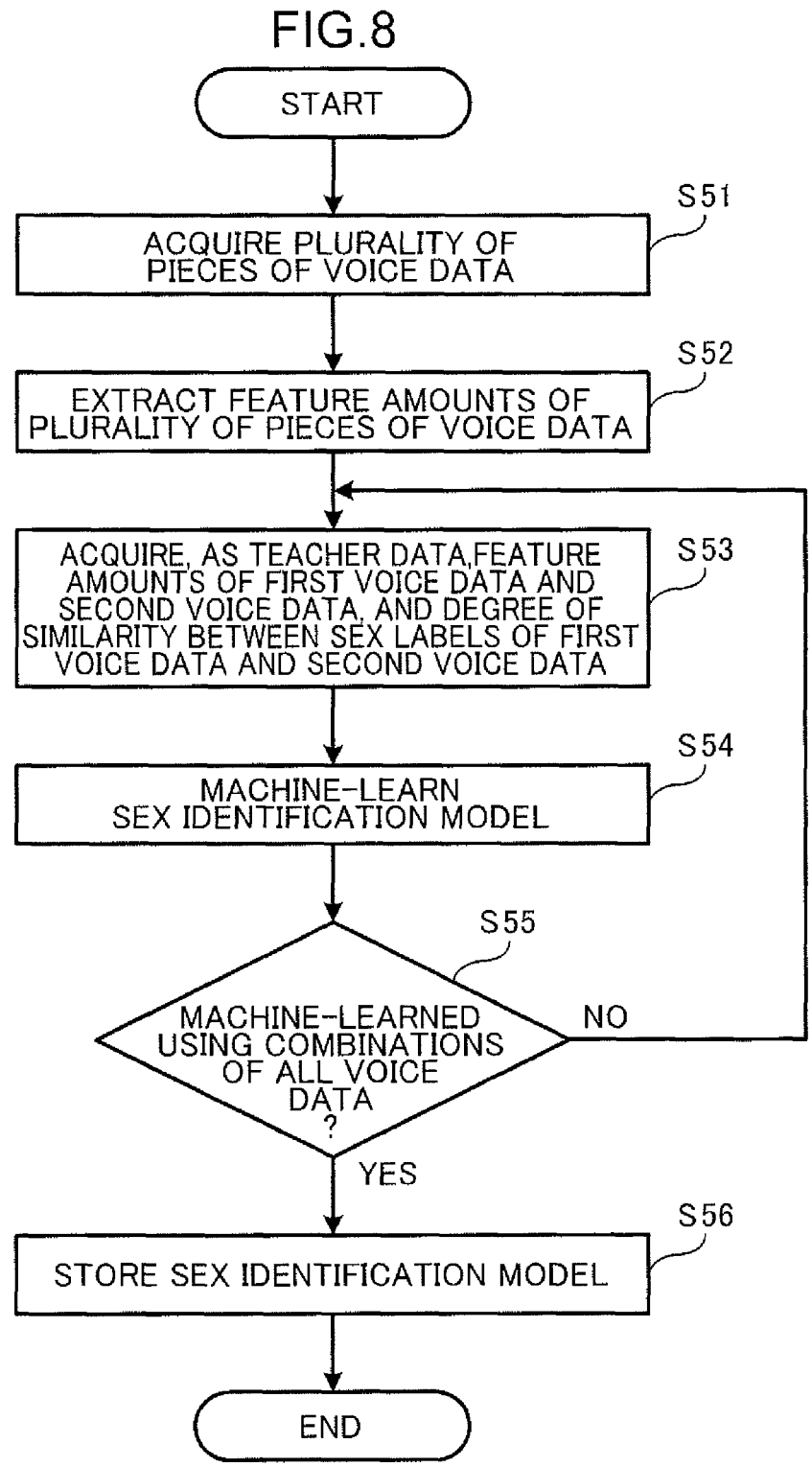
FIG. 8 is a flowchart for explaining operation of sex identification model generation processing of the sex identification model generation device according to the first embodiment.

FIG. 8 is a flowchart for explaining the operation of the sex identification model generation processing of the sex identification model generation device according to the first embodiment.

First, in Step S51, the sex identification voice data acquisition unit 302 acquires, from the sex identification voice data storage unit 301, a plurality of pieces of voice data to which the sex label indicating one of male and female is assigned.

Next, in Step S52, the feature amount extraction unit 303 extracts feature amounts of the plurality of pieces of voice data acquired by the sex identification voice data acquisition unit 302.

Next, in Step S53, the sex identification model generation unit 304 acquires, as teacher data, feature amounts of the first voice data and the second voice data among the plurality of pieces of voice data, and a degree of similarity between the sex labels of the first voice data and the second voice data.

Next, in Step S54, using the acquired teacher data, the sex identification model generation unit 304 machine-learns a sex identification model with the feature amounts of the two pieces of voice data as an input and the degree of similarity between the two pieces of voice data as an output.

Next, in Step S55, the sex identification model generation unit 304 determines whether or not the sex identification model has been machine-learned using combinations of all the voice data among the plurality of pieces of voice data. In a case where it is determined here that the sex identification model has not been machine-learned using the combinations of all the voice data (NO in Step S55), the processing returns to step S53. Then, the sex identification model generation unit 304 acquires, as teacher data, the feature amounts of the first voice data and the second voice data whose combination is not used for the machine learning among the plurality of pieces of voice data, and a degree of similarity between the sex labels of the first voice data and the second voice data.

On the other hand, in a case where it is determined that the sex identification model has been machine-learned using the combinations of all the voice data (YES in Step S55), in Step S56, the sex identification model generation unit 304 stores the sex identification model generated by the machine learning in the sex identification model storage unit 305.

As described above, a feature amount of the registered voice data or the identification target voice data and a feature amount of the male voice data are input to a sex identification model generated by machine learning, whereby a first degree of similarity between the two pieces of voice data is output. In addition, when the feature amount of the registered voice data or the identification target voice data and a feature amount of the female voice data are input to the sex identification model, a second degree of similarity between the two pieces of voice data is output. Then, a sex of a speaker of the registered voice data or the identification target voice data can be easily estimated by comparing the first degree of similarity with the second degree of similarity.

Next, operation of speaker identification model generation processing of the speaker identification model generation device 4 according to the first embodiment will be described.

Figure 9:
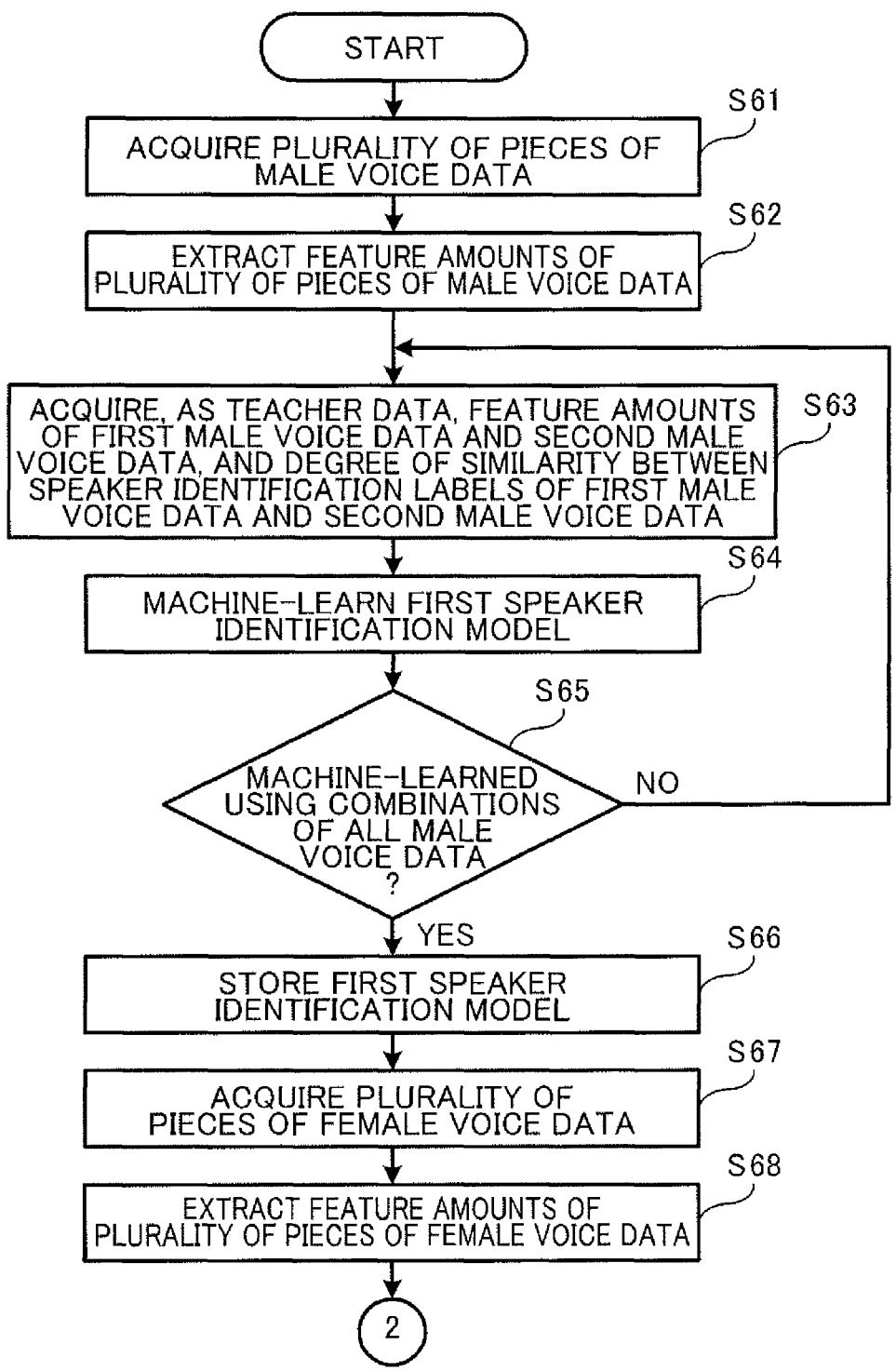
FIG. 9 is a first flowchart for explaining operation of speaker identification model generation processing of the speaker identification model generation device according to the first embodiment.
Figure 10:
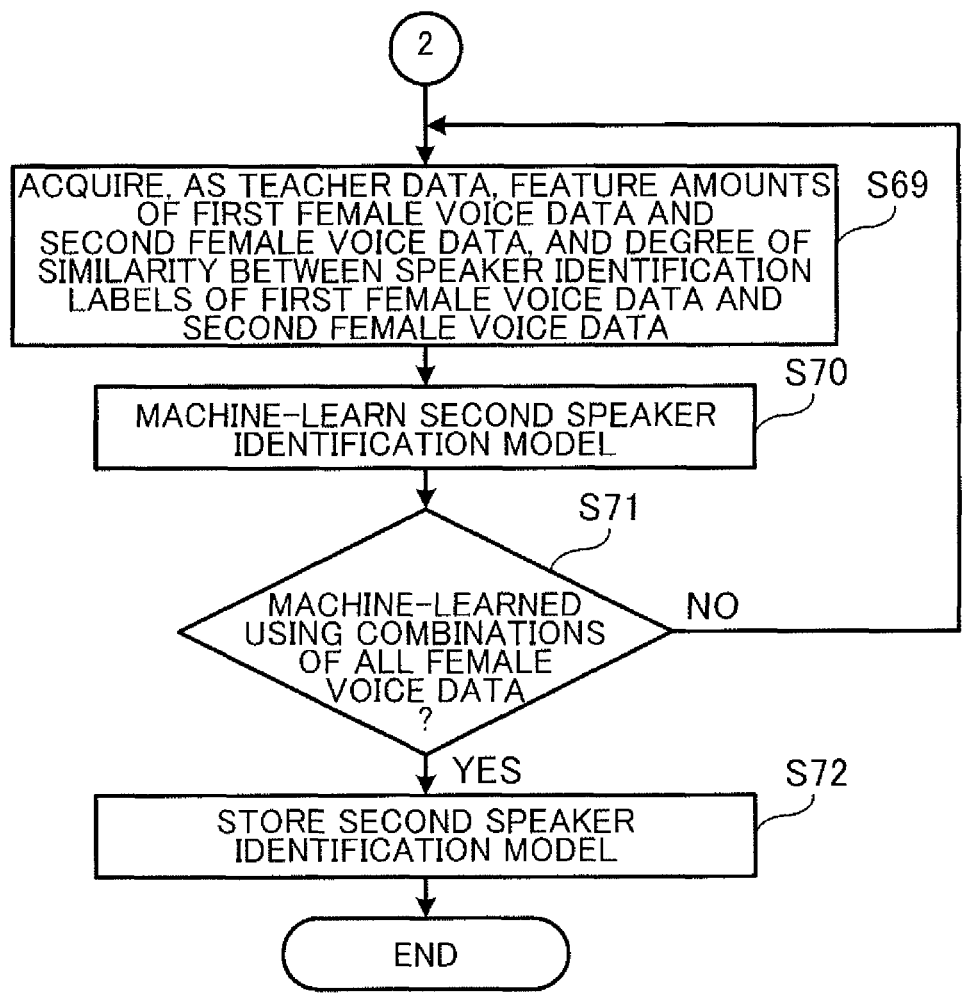
FIG. 10 is a second flowchart for explaining the operation of the speaker identification model generation processing of the speaker identification model generation device according to the first embodiment.

FIG. 9 is a first flowchart for explaining the operation of the speaker identification model generation processing of the speaker identification model generation device according to the first embodiment, and FIG. 10 is a second flowchart for explaining the operation of the speaker identification model generation processing of the speaker identification model generation device according to the first embodiment.

First, in Step S61, the male voice data acquisition unit 402 acquires, from the male voice data storage unit 401, a plurality of pieces of male voice data to which the speaker identification label for identifying a male speaker is assigned.

Next, in Step S62, the feature amount extraction unit 403 extracts feature amounts of the plurality of pieces of male voice data acquired by the male voice data acquisition unit 402.

Next, in Step S63, the first speaker identification model generation unit 404 acquires, as teacher data, the feature amounts of the first male voice data and the second male voice data among the plurality of pieces of male voice data, and a degree of similarity between the speaker identification labels of the first male voice data and the second male voice data.

Next, in Step S64, using the acquired teacher data, the first speaker identification model generation unit 404 machine-learns the first speaker identification model with each feature amount of the two pieces of voice data as an input and a degree of similarity between the two pieces of voice data as an output.

Next, in Step S65, the first speaker identification model generation unit 404 determines whether or not the first speaker identification model has been machine-learned using the combinations of all the male voice data among the plurality of pieces of male voice data. In a case where it is determined here that the first speaker identification model has not been machine-learned using the combinations of all the male voice data (NO in Step S65), the processing returns to Step S63. Then, the first speaker identification model generation unit 404 acquires, as teacher data, the feature amounts of the first male voice data and the second male voice data whose combination is not used for the machine learning among the plurality of pieces of male voice data, and a degree of similarity between the speaker identification labels of the first male voice data and the second male voice data.

On the other hand, in a case where it is determined that the first speaker identification model has been machine-learned using the combinations of all the male voice data (YES in Step S65), in Step S66, the first speaker identification model generation unit 404 stores the first speaker identification model generated by the machine learning in the first speaker identification model storage unit 405.

Next, in Step S67, the female voice data acquisition unit 412 acquires, from the female voice data storage unit 411, a plurality of pieces of female voice data to which a speaker identification label for identifying a female speaker is assigned.

Next, in Step S68, the feature amount extraction unit 413 extracts feature amounts of the plurality of pieces of female voice data acquired by the female voice data acquisition unit 412.

Next, in Step S69, the second speaker identification model generation unit 414 acquires, as teacher data, the feature amounts of the first female voice data and the second female voice data among the plurality of pieces of female voice data, and a degree of similarity between the speaker identification labels of the first female voice data and the second female voice data.

Next, in Step S70, using the acquired teacher data, the second speaker identification model generation unit 414 machine-learns the second speaker identification model with each feature amount of the two pieces of voice data as an input and a degree of similarity between the two pieces of voice data as an output.

Next, in Step S71, the second speaker identification model generation unit 414 determines whether or not the second speaker identification model has been machine-learned using the combinations between all the female voice data among the plurality of pieces of female voice data. In a case where it is determined here that the second speaker identification model has not been machine-learned using the combinations of all the female voice data (NO in Step S71), the processing returns to Step S69. Then, the second speaker identification model generation unit 414 acquires, as teacher data, the feature amounts of the first female voice data and the second female voice data whose combination is not used for the machine learning among the plurality of pieces of female voice data, and a degree of similarity between the speaker identification labels of the first female voice data and the second female voice data.

On the other hand, in a case where it is determined that the second speaker identification model has been machine-learned using the combinations of all the female voice data (YES in Step S71), in Step S72, the second speaker identification model generation unit 414 stores the second speaker identification model generated by the machine learning in the second speaker identification model storage unit 415.

As described above, in a case where the sex of one of the speaker of the identification target voice data and the speaker of the registered voice data is male, the speaker of the identification target voice data is identified by inputting the feature amount of the identification target voice data and the feature amount of the registered voice data to the first speaker identification model generated for males. In addition, in a case where one of the sex of the speaker of the identification target voice data and the sex of the speaker of the registered voice data is female, the feature amount of the identification target voice data and the feature amount of the registered voice data are input to the second speaker identification model generated for females, thereby identifying the speaker of the identification target voice data.

Therefore, even in a case where a distribution of feature amounts of voice data differs depending on a sex, since a speaker of the identification target voice data is identified by the first speaker identification model specialized for a male and the second speaker identification model specialized for a female, the accuracy of identifying whether or not an identification target speaker is a speaker registered in advance can be improved.

Next, evaluation of speaker identification performance of the speaker identification device 2 according to the first embodiment will be described.

FIG. 11 is a diagram illustrating a speaker identification performance evaluation result of a conventional speaker identification device and a speaker identification performance evaluation result of the speaker identification device according to the first embodiment.

The performance evaluation results illustrated in FIG. 11 represent identification results of a speaker of voice data provided by the SRE 19 progress dataset and the SRE 19 evaluation dataset by the conventional speaker identification device and the speaker identification device 2 according to the first embodiment.

The SRE 19 is a speaker identification competition hosted by the National Institute of Standards and Technology (NIST). Both the SRE 19 progress dataset and the SRE 19 evaluation dataset are datasets provided by the SRE 19.

The conventional speaker identification device identifies a speaker of voice data by using a speaker identification model generated without distinction between male and female.

The speaker identification device 2 of the first embodiment identifies the speaker of the voice data using the first speaker identification model for male and the second speaker identification model for female.

The evaluation results are represented by an equal error rate (EER) (%) generally used for evaluating speaker identification, a minimum cost (minC) defined by the NIST, and an actual cost (actC) defined by the NIST. Note that the smaller the values of EER, minC, and actC are, the higher the performance is.

As illustrated in FIG. 11, the EER, minC, and actC of the speaker identification device 2 of the first embodiment are all smaller than the EER, minC, and actC of the conventional speaker identification device. As a result, it can be seen that the speaker identification performance of the speaker identification device 2 according to the first embodiment is higher than the speaker identification performance of the conventional speaker identification device.

Next, a speaker identification device 2 according to a first modification example of the first embodiment will be described.

The speaker identification device 2 according to the first modification example of the first embodiment is different in sex identification processing of a sex identification unit 205 from the above processing.

The sex identification unit 205 in the first modification example of the first embodiment inputs a feature amount of registration target voice data and a feature amount of each of the plurality of pieces of male voice data stored in advance in the sex identification voice data storage unit 204 to the sex identification model, thereby acquiring a degree of similarity between the registration target voice data and each of the plurality of pieces of male voice data from the sex identification model. Then, the sex identification unit 205 calculates a maximum value among the acquired plurality of degrees of similarity as a maximum male degree of similarity.

The sex identification unit 205 also inputs the feature amount of the registration target voice data and a feature amount of each of the plurality of pieces of female voice data stored in advance in the sex identification voice data storage unit 204 to the sex identification model, thereby acquiring a degree of similarity between the registration target voice data and each of the plurality of pieces of female voice data from the sex identification model. Then, the sex identification unit 205 calculates a maximum value among the acquired plurality of degrees of similarity as a maximum female degree of similarity.

In a case where the maximum male degree of similarity is higher than the maximum female degree of similarity, the sex identification unit 205 identifies a sex of the speaker of the registration target voice data as male. On the other hand, in a case where the maximum male degree of similarity is lower than the maximum female degree of similarity, the sex identification unit 205 identifies the sex of the speaker of the registration target voice data as female. In a case where the maximum male degree of similarity is the same as the maximum female degree of similarity, the sex identification unit 205 may identify the sex of the speaker of the registration target voice data as male, or may identify the sex of the speaker of the registration target voice data as female.

Next, operation of the sex identification processing in the first modification example of the first embodiment will be described.

Figure 12:
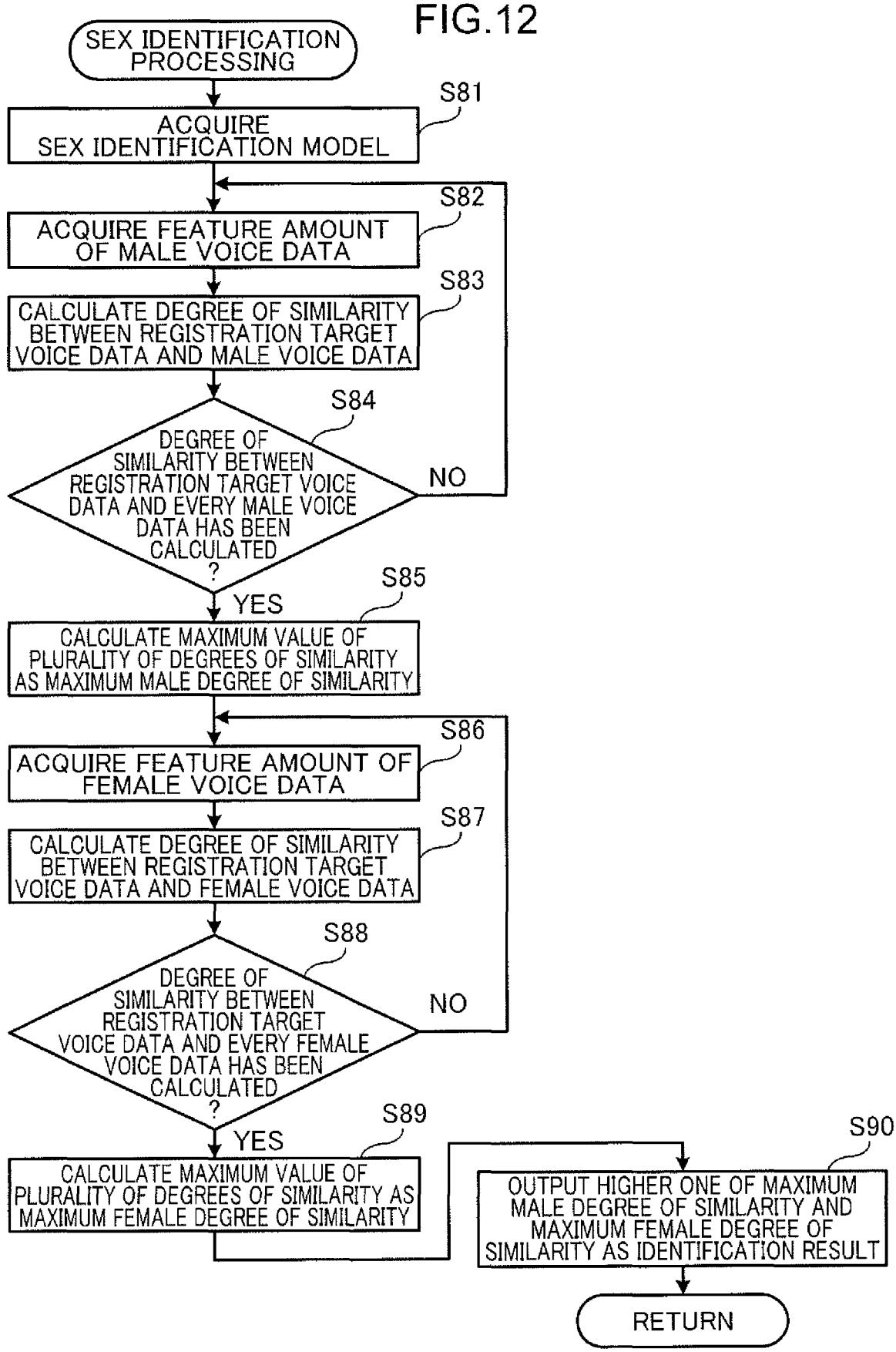
FIG. 12 is a flowchart for explaining operation of sex identification processing in a first modification example of the first embodiment.

FIG. 12 is a flowchart for explaining the operation of the sex identification processing in the first modification example of the first embodiment. The sex identification processing in the first modification example of the first embodiment is another operation example of the sex identification processing in Step S3 in FIG. 4.

Since processing in Steps S81 to S84 is the same as the processing in Steps S11 to S14 illustrated in FIG. 5, description thereof will be omitted.

In a case where it is determined that the degree of similarity between the registration target voice data and every male voice data has been calculated (YES in Step S84), in Step S85, the sex identification unit 205 calculates a maximum value of the plurality of calculated degrees of similarity as a maximum male degree of similarity.

Since processing in Steps S86 to S88 is the same as the processing in Steps S16 to S18 illustrated in FIG. 5, description thereof will be omitted.

In a case where it is determined that the degree of similarity between the registration target voice data and every female voice data has been calculated (YES in Step S88), in Step S89, the sex identification unit 205 calculates a maximum value of the plurality of calculated degrees of similarity as a maximum female degree of similarity.

Next, in Step S90, the sex identification unit 205 outputs the higher one of the maximum male degree of similarity and the maximum female degree of similarity to the registration unit 206 as an identification result.

Next, a speaker identification device 2 in a second modification example of the first embodiment will be described.

The speaker identification device 2 according to the second modification example of the first embodiment is different in sex identification processing of a sex identification unit 205 from the above processing.

The sex identification unit 205 in the second modification example of the first embodiment calculates an average feature amount of a plurality of pieces of male voice data stored in advance. Then, the sex identification unit 205 inputs the feature amount of the registration target voice data and the average feature amount of the plurality of pieces of male voice data to the sex identification model to acquire a first degree of similarity between the registration target voice data and a male voice data group from the sex identification model.

In addition, the sex identification unit 205 calculates an average feature amount of a plurality of pieces of female voice data stored in advance. Then, the sex identification unit 205 inputs the feature amount of the registration target voice data and the average feature amount of the plurality of pieces of female voice data to the sex identification model to acquire a second degree of similarity between the registration target voice data and a female voice data group from the sex identification model.

In a case where the first degree of similarity is higher than the second degree of similarity, the sex identification unit 205 identifies the sex of the speaker of the registration target voice data as male. On the other hand, in a case where the first degree of similarity is lower than the second degree of similarity, the sex identification unit 205 identifies the sex of the speaker of the registration target voice data as female. In a case where the first degree of similarity is the same as the second degree of similarity, the sex identification unit 205 may identify the sex of the speaker of the registration target voice data as male, or may identify the sex of the speaker of the registration target voice data as female.

Next, operation of the sex identification processing in the second modification example of the first embodiment will be described.

Figure 13:
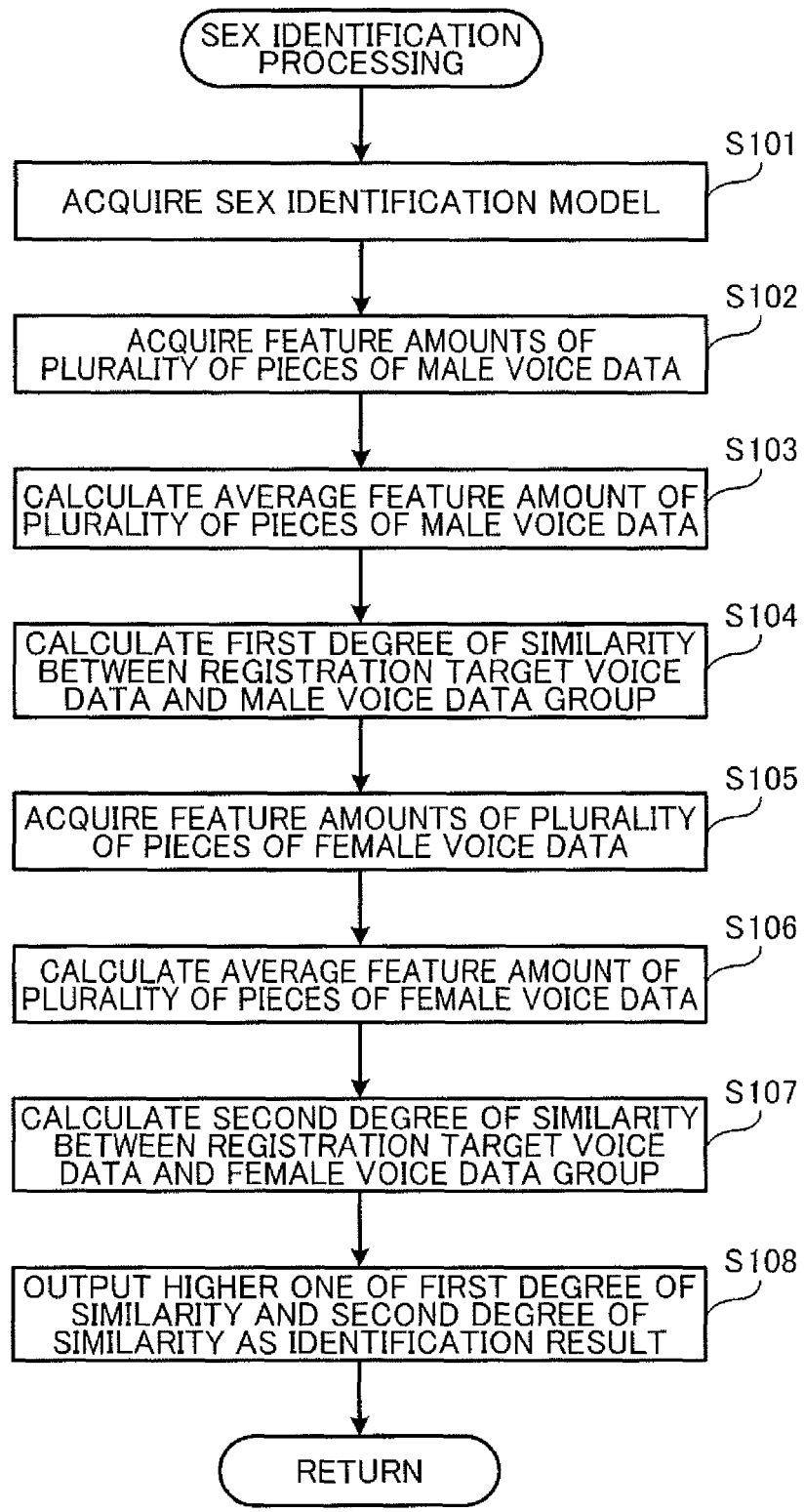
FIG. 13 is a flowchart for explaining operation of sex identification processing in a second modification example of the first embodiment.

FIG. 13 is a flowchart for explaining the operation of the sex identification processing in the second modification example of the first embodiment. The sex identification processing in the second modification example of the first embodiment is another operation example of the sex identification processing in Step S3 in FIG. 4.

First, in Step S101, the sex identification unit 205 acquires a sex identification model from a sex identification model storage unit 203. The sex identification model is a sex identification model machine-learned by using, as teacher data, a feature amount of each of the first voice data and the second voice data among the plurality of pieces of voice data and a degree of similarity between the sex labels of the first voice data and the second voice data. Note that the sex identification model may be a sex identification model machine-learned by using, as teacher data, a feature amount of each of the first voice data and the second voice data among the plurality of pieces of voice data and a degree of similarity between the respective pieces of identification information of the first voice data and the second voice data.

Next, in Step S102, the sex identification unit 205 acquires feature amounts of a plurality of pieces of male voice data from the sex identification voice data storage unit 204.

Next, in Step S103, the sex identification unit 205 calculates an average feature amount of the acquired plurality of pieces of male voice data.

Next, in Step S104, the sex identification unit 205 inputs the feature amount of the registration target voice data and the average feature amount of the plurality of the pieces of the male voice data to the sex identification model to calculate the first degree of similarity between the registration target voice data and the male voice data group.

Next, in Step S105, the sex identification unit 205 acquires feature amounts of a plurality of pieces of female voice data from the sex identification voice data storage unit 204.

Next, in Step S106, the sex identification unit 205 calculates an average feature amount of the acquired plurality of pieces of female voice data.

Next, in Step S107, the sex identification unit 205 inputs the feature amount of the registration target voice data and the average feature amount of the plurality of the pieces of the female voice data to the sex identification model to calculate the second degree of similarity between the registration target voice data and the female voice data group.

Next, in Step S108, the sex identification unit 205 outputs the higher one of the first degree of similarity and the second degree of similarity to the registration unit 206 as an identification result.

Note that although in the sex identification processing in the first embodiment, the degree of similarity between the registered voice data and the male voice data and the degree of similarity between the registered voice data and the female voice data are calculated, and the calculated two degrees of similarity are compared to determine a sex of the registered voice data, the present disclosure is not particularly limited thereto. For example, the sex identification model generation unit 304 uses a feature amount of one of the plurality of pieces of voice data and a sex label of the one voice data as teacher data, to generate, by machine learning, a sex identification model with a feature amount of the voice data as an input and one of male and female as an output. In this case, the sex identification model is, for example, a deep neural network model, and the machine learning is, for example, deep learning.

In addition, the sex identification model may calculate a probability of being male and a probability of being female with respect to the input voice data. In this case, the sex identification unit 205 may output, as an identification result, a sex having a higher probability of being male or female.

In addition, the speaker identification device 2 may include an input reception unit that receives an input of a sex of a speaker of a registration target voice data when the registration target voice data is acquired. In this case, the registration unit 206 may store, in the registered voice data storage unit 212, the registration target voice data acquired by the registration target voice data acquisition unit 201 in association with the sex received by the input reception unit. This eliminates a need of the feature amount extraction unit 202, the sex identification model storage unit 203, the sex identification voice data storage unit 204, and the sex identification unit 205, thereby simplifying the configuration of the speaker identification device 2, and reducing a load on the registration processing of the speaker identification device 2.

Second Embodiment

In the first embodiment, a degree of similarity between each of all the pieces of registered voice data stored in the registered voice data storage unit 212 and the identification target voice data is calculated, and a speaker of the registered voice data having the highest degree of similarity is identified as the speaker of the identification target voice data. On the other hand, in the second embodiment, identification information of a speaker of identification target voice data is input, and one piece of registered voice data associated with the identification information in advance is acquired from among a plurality of pieces of registered voice data stored in the registered voice data storage unit 212. Then, a degree of similarity between the one piece of registered voice data and the identification target voice data is calculated, and in a case where the degree of similarity is higher than a threshold, the speaker of the registered voice data is identified as the speaker of the identification target voice data.

Figure 14:
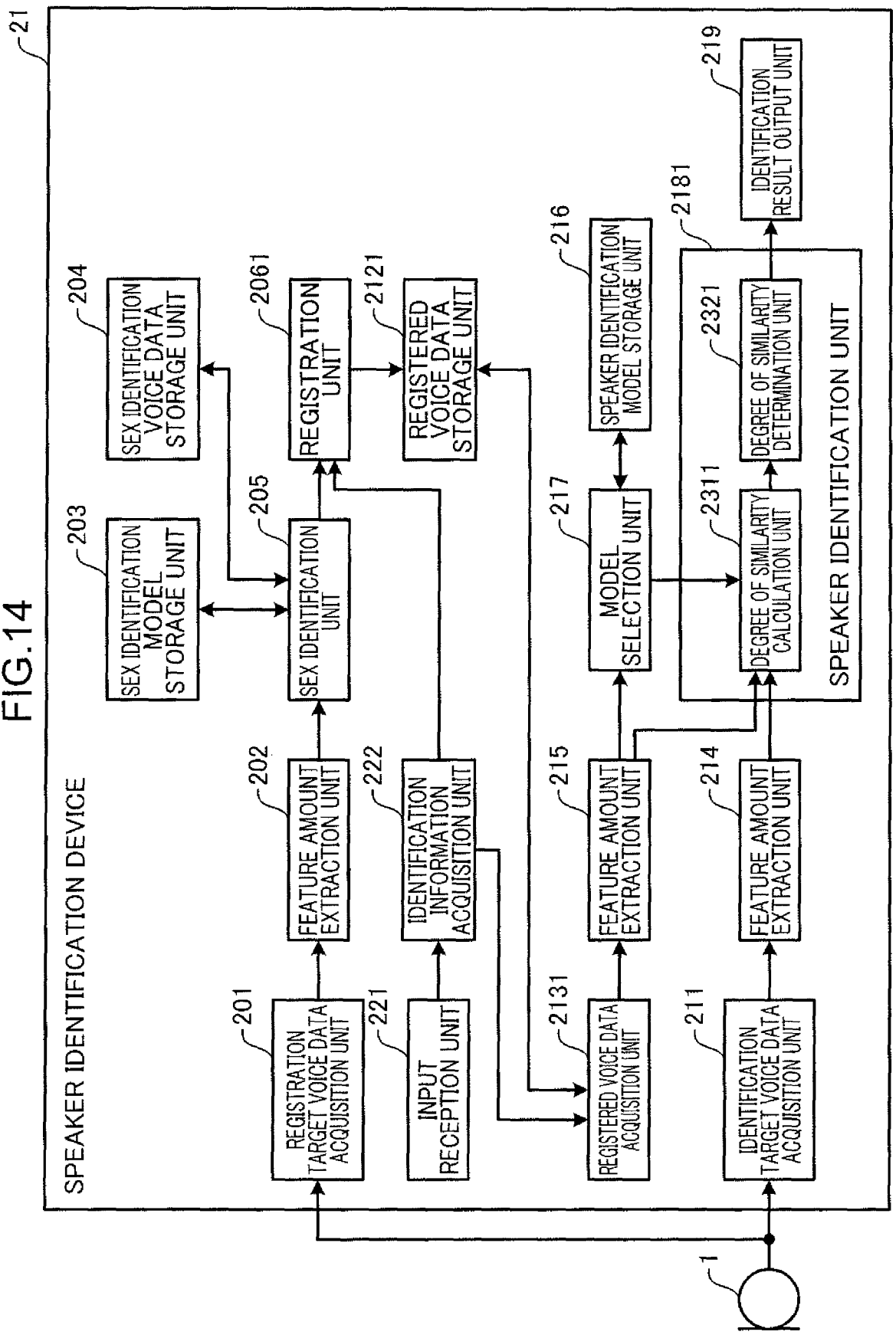
FIG. 14 is a diagram illustrating a configuration of a speaker identification system according to a second embodiment of the present disclosure.

FIG. 14 is a diagram illustrating a configuration of a speaker identification system according to the second embodiment of the present disclosure.

The speaker identification system illustrated in FIG. 14 includes a microphone 1 and a speaker identification device 21. Note that the speaker identification device 21 may or may not include the microphone 1.

In the second embodiment, the same components as those in the first embodiment are denoted by the same reference numerals, and description thereof will be omitted.

The speaker identification device 21 includes a registration target voice data acquisition unit 201, a feature amount extraction unit 202, a sex identification model storage unit 203, a sex identification voice data storage unit 204, a sex identification unit 205, a registration unit 2061, an identification target voice data acquisition unit 211, a registered voice data storage unit 2121, a registered voice data acquisition unit 2131, a feature amount extraction unit 214, a feature amount extraction unit 215, a speaker identification model storage unit 216, a model selection unit 217, a speaker identification unit 2181, an identification result output unit 219, an input reception unit 221, and an identification information acquisition unit 222.

The input reception unit 221 is an input device such as a keyboard, a mouse, and a touch panel. At the time of registering voice data, the input reception unit 221 receives an input, by a speaker, of identification information for identifying a speaker who registers the voice data. Also at the time of identifying voice data, the input reception unit 221 receives an input, by a speaker, of identification information for identifying the speaker of the voice data to be identified. Note that the input reception unit 221 may be a card reader, a radio frequency identification (RFID) reader, or the like. In this case, the speaker causes the card reader to read a card on which identification information is recorded or causes the RFID reader to read an RFID tag on which identification information is recorded.

The identification information acquisition unit 222 acquires the identification information received by the input reception unit 221. At the time of registering voice data, the identification information acquisition unit 222 acquires identification information for identifying a speaker of registration target voice data, and outputs the acquired identification information to the registration unit 2061. Also at the time of identifying voice data, the identification information acquisition unit 222 acquires identification information for identifying a speaker of identification target voice data, and outputs the acquired identification information to the registered voice data acquisition unit 2131.

The registration unit 2061 registers, as registered voice data, registration target voice data in which sex information identified by the sex identification unit 205 and identification information acquired by the identification information acquisition unit 222 are associated with each other. The registration unit 2061 registers the registered voice data in the registered voice data storage unit 2121.

The registered voice data storage unit 2121 stores the registered voice data associated with the sex information and the identification information. The registered voice data storage unit 2121 stores a plurality of pieces of registered voice data. Each of the plurality of pieces of registered voice data is associated with identification information for identifying a speaker of each of the plurality of pieces of registered voice data.

The registered voice data acquisition unit 2131 acquires registered voice data associated with identification information matching the identification information acquired by the identification information acquisition unit 222 from among the plurality of pieces of registered voice data registered in the registered voice data storage unit 2121.

The speaker identification unit 2181 includes a degree of similarity calculation unit 2311 and a degree of similarity determination unit 2321.

The degree of similarity calculation unit 2311 inputs a feature amount of identification target voice data and a feature amount of registered voice data to one of the selected first speaker identification model and second speaker identification model to acquire a degree of similarity between the identification target voice data and the registered voice data from one of the first speaker identification model and the second speaker identification model.

In a case where the acquired degree of similarity is higher than a threshold, the degree of similarity determination unit 2321 identifies a speaker of the registered voice data as a speaker of the identification target voice data.

Next, operation of each of registration processing and speaker identification processing of the speaker identification device 21 in the second embodiment will be described.

Figure 15:
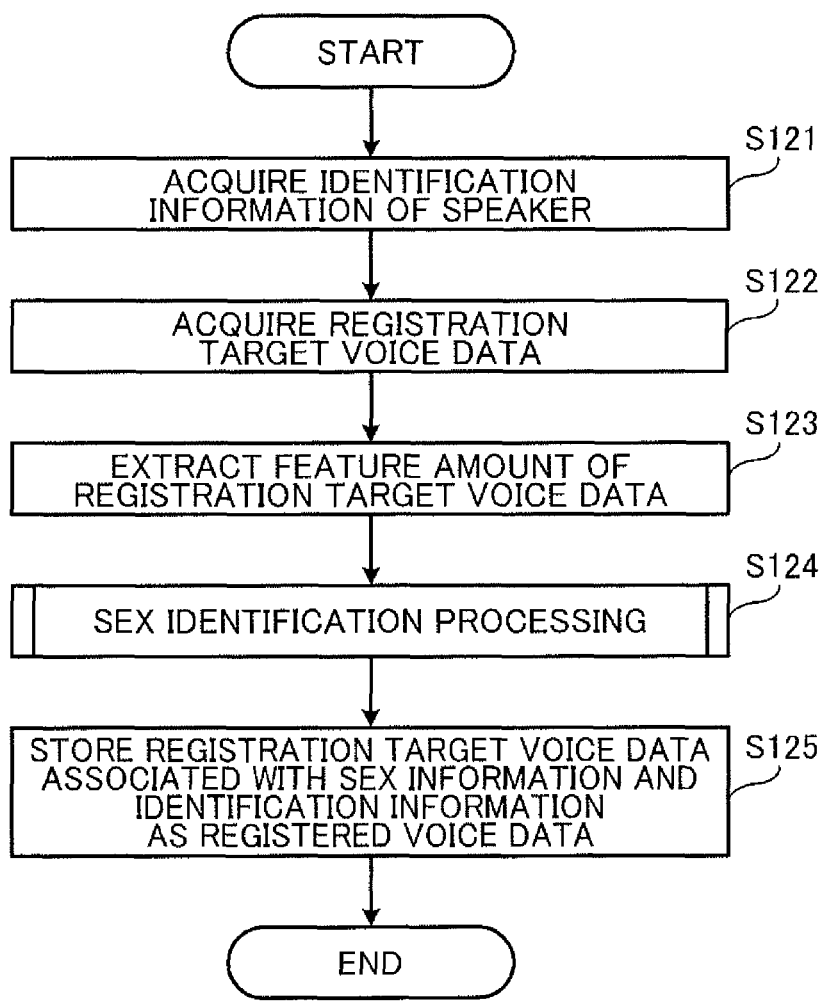
FIG. 15 is a flowchart for explaining operation of registration processing of a speaker identification device according to the second embodiment.

FIG. 15 is a flowchart for explaining the operation of the registration processing of the speaker identification device in the second embodiment.

First, in Step S121, the identification information acquisition unit 222 acquires identification information of a speaker received by the input reception unit 221. The input reception unit 221 receives an input, by a speaker, of identification information for identifying the speaker who registers voice data, and outputs the received identification information to the identification information acquisition unit 222. The identification information acquisition unit 222 outputs identification information for identifying a speaker of registration target voice data to the registration unit 2061.

Next, in Step S122, the registration target voice data acquisition unit 201 acquires registration target voice data output from the microphone 1. The speaker who has input the identification information and wishes to register voice data uttered by himself/herself utters a predetermined sentence toward the microphone 1.

Note that processing in Step S123 and Step S124 is the same as the processing in Step S2 and Step S3 shown in FIG. 4, and thus description thereof is omitted.

Next, in Step S125, the registration unit 2061 stores, in the registered voice data storage unit 2121, registration target voice data associated with sex information identified by the sex identification unit 205 and identification information acquired by the identification information acquisition unit 222 as registered voice data. As a result, the registered voice data storage unit 2121 stores the registered voice data in which the sex information and the identification information are associated with each other.

Figure 16:
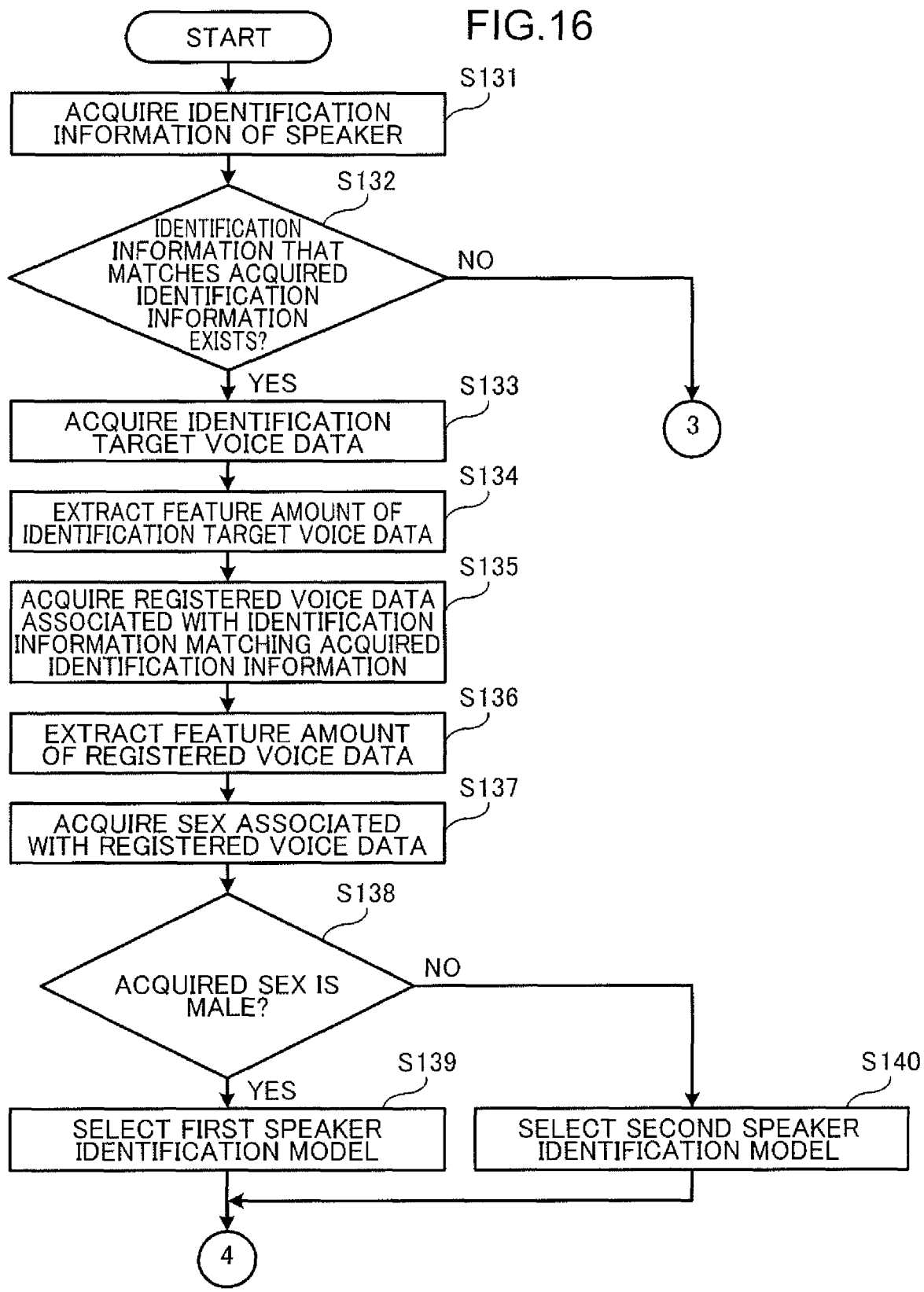
FIG. 16 is a first flowchart for explaining operation of speaker identification processing of the speaker identification device according to the second embodiment.
Figure 17:
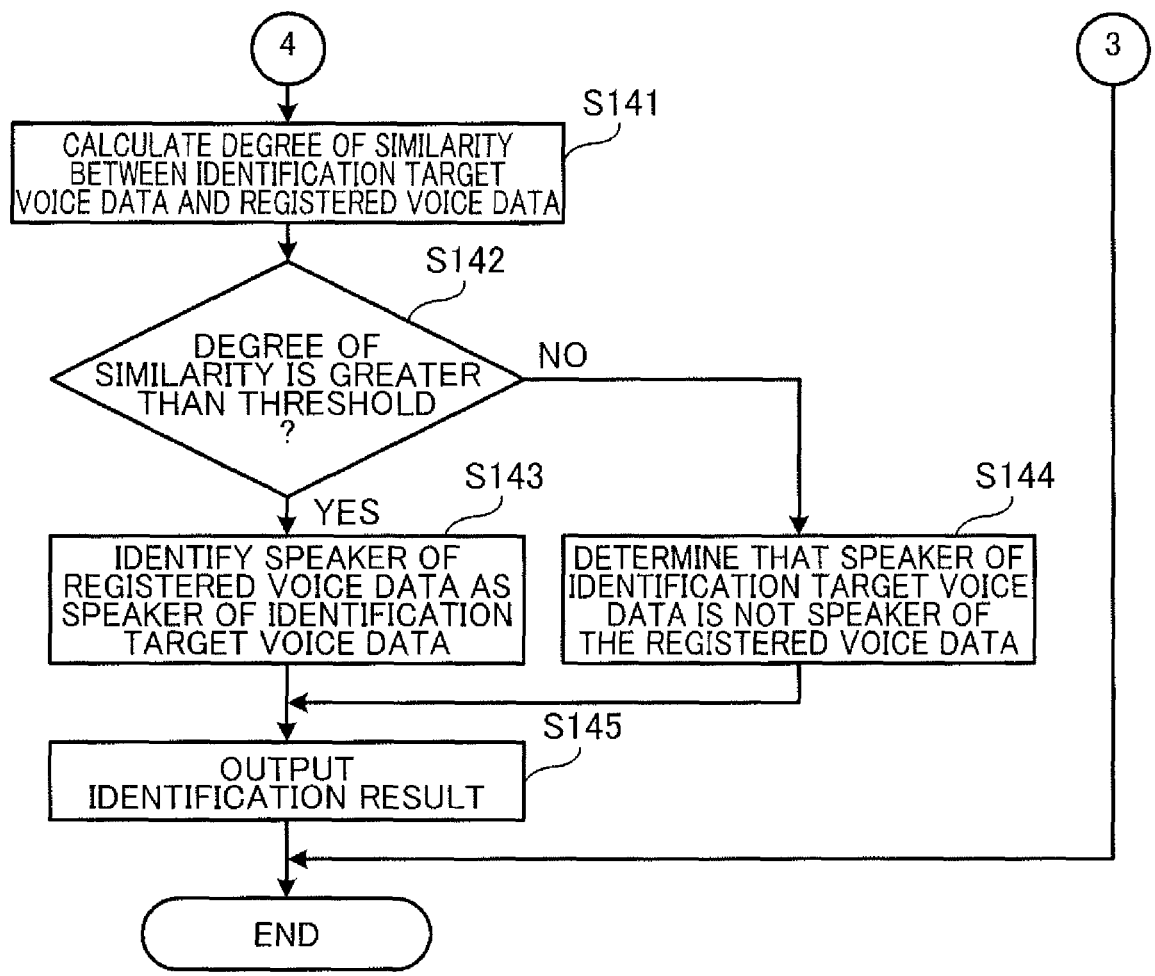
FIG. 17 is a second flowchart for explaining the operation of the speaker identification processing of the speaker identification device according to the second embodiment.

FIG. 16 is a first flowchart for explaining the operation of the speaker identification processing of the speaker identification device in the second embodiment, and FIG. 17 is a second flowchart for explaining the operation of the speaker identification processing of the speaker identification device in the second embodiment.

First, in Step S131, the identification information acquisition unit 222 acquires identification information of a speaker received by the input reception unit 221. The input reception unit 221 receives an input, by a speaker, of identification information for identifying the speaker of voice data to be identified, and outputs the received identification information to the identification information acquisition unit 222. The identification information acquisition unit 222 outputs identification information for identifying a speaker of identification target voice data to the registered voice data acquisition unit 2131.

Next, in Step S132, the registered voice data acquisition unit 2131 determines whether or not the registered voice data storage unit 2121 has identification information that matches the identification information acquired by the identification information acquisition unit 222. In a case where it is determined here that there is no identification information that matches the acquired identification information in the registered voice data storage unit 2121 (NO in Step S132), the speaker identification processing ends. In a case where it is determined that there is no identification information that matches the acquired identification information in the registered voice data storage unit 2121, the identification result output unit 219 may output notification information for notifying a speaker that the input identification information is not registered. In a case where it is determined that there is no identification information that matches the acquired identification information in the registered voice data storage unit 2121, the identification result output unit 219 may also output notification information for urging a speaker to register voice data.

On the other hand, in a case where it is determined that the identification information matching the acquired identification information exists in the registered voice data storage unit 2121 (YES in Step S132), in Step S133, the identification target voice data acquisition unit 211 acquires the identification target voice data output from the microphone 1.

Next, in Step S134, the feature amount extraction unit 214 extracts a feature amount of the identification target voice data acquired by the identification target voice data acquisition unit 211.

Next, in Step S135, the registered voice data acquisition unit 2131 acquires registered voice data associated with identification information matching the identification information acquired by the identification information acquisition unit 222 from among the plurality of pieces of registered voice data registered in the registered voice data storage unit 2121.

Since processing of Steps S136 to S141 is the same as the processing of Steps S34 to S39 illustrated in FIG. 6, description thereof will be omitted.

Next, in Step S142, the degree of similarity determination unit 2321 determines whether or not the degree of similarity calculated by the degree of similarity calculation unit 2311 is greater than the threshold.

In a case where it is determined here that the degree of similarity calculated by the degree of similarity calculation unit 2311 is greater than the threshold (YES in Step S142), in Step S143, the degree of similarity determination unit 2321 identifies the speaker of the registered voice data as the speaker of the identification target voice data.

On the other hand, in a case where it is determined that the degree of similarity calculated by the degree of similarity calculation unit 2311 is the threshold or lower (NO in Step S142), in Step S144, the degree of similarity determination unit 2321 determines that the speaker of the identification target voice data is not the speaker of the registered voice data.

Next, in Step S145, the identification result output unit 219 outputs an identification result obtained by the speaker identification unit 2181. In a case where the speaker of the identification target voice data is identified, the identification result output unit 219 outputs a message indicating that the speaker of the identification target voice data is a speaker registered in advance. On the other hand, in a case where the speaker of the identification target voice data is not identified, the identification result output unit 219 outputs a message indicating that the speaker of the identification target voice data is not a speaker registered in advance.

As described above, in the second embodiment, only the degree of similarity between the registered voice data associated with the identification information and the identification target voice data is calculated. Therefore, as compared with the first embodiment in which a plurality of degrees of similarity between each of a plurality of pieces of registered voice data and identification target voice data are calculated, a processing load on calculation of a degree of similarity can be reduced in the second embodiment.

Third Embodiment

Although in the first embodiment and the second embodiment described above, one of the first speaker identification model and the second speaker identification model is selected according to a sex of a speaker of registered voice data, in a case where two different first speaker identification model and second speaker identification model are used, the first speaker identification model and the second speaker identification model may have different ranges of output values. Therefore, in a third embodiment, at the time of registering voice data, a first threshold and a second threshold enabling identification of the same speaker are calculated for the first speaker identification model and the second speaker identification model, respectively, and the calculated first threshold and second threshold are stored. Furthermore, at the time of identification of voice data, the first threshold or the second threshold is subtracted from the calculated degree of similarity between the identification target voice data and the registered voice data to correct the degree of similarity. Then, the speaker of the identification target voice data is identified by comparing the corrected degree of similarity with a third threshold common to the first speaker identification model and the second speaker identification model.

First, a speaker identification model generation device according to the third embodiment of the present disclosure will be described.

Figure 18:
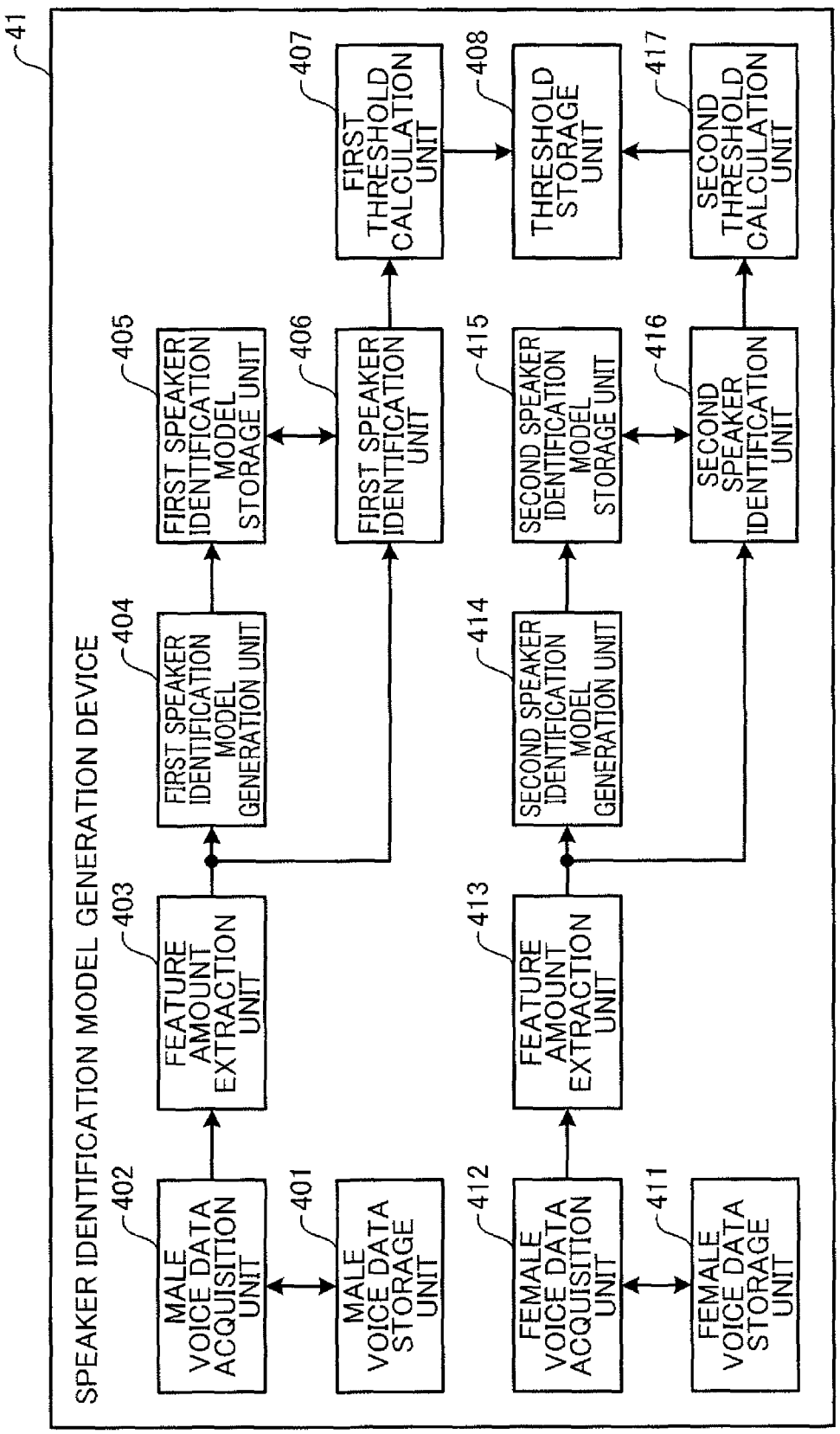
FIG. 18 is a diagram illustrating a configuration of a speaker identification model generation device according to a third embodiment of the present disclosure.

FIG. 18 is a diagram illustrating a configuration of the speaker identification model generation device according to the third embodiment of the present disclosure.

The speaker identification model generation device 41 illustrated in FIG. 18 includes a male voice data storage unit 401, a male voice data acquisition unit 402, a feature amount extraction unit 403, a first speaker identification model generation unit 404, a first speaker identification model storage unit 405, a first speaker identification unit 406, a first threshold calculation unit 407, a threshold storage unit 408, a female voice data storage unit 411, a female voice data acquisition unit 412, a feature amount extraction unit 413, a second speaker identification model generation unit 414, a second speaker identification model storage unit 415, a second speaker identification unit 416, and a second threshold calculation unit 417.

In the third embodiment, the same components as those in the first embodiment and the second embodiment are denoted by the same reference numerals, and description thereof will be omitted.

The first speaker identification unit 406 inputs all combinations of feature amounts of two pieces of voice data among a plurality of pieces of male voice data to the first speaker identification model, thereby acquiring a degree of similarity of each of the plurality of combinations of the two pieces of voice data from the first speaker identification model.

The first threshold calculation unit 407 calculates a first threshold enabling identification of a degree of similarity between two pieces of voice data of the same speaker and a degree of similarity between two pieces of voice data of different speakers. The first threshold calculation unit 407 calculates the first threshold by performing regression analysis on the plurality of degrees of similarity calculated by the first speaker identification unit 406.

The second speaker identification unit 416 inputs all combinations of feature amounts of two pieces of voice data among a plurality of pieces of female voice data to the second speaker identification model, thereby acquiring a degree of similarity of each of the plurality of combinations of the two pieces of voice data from the second speaker identification model.

The second threshold calculation unit 417 calculates a second threshold enabling identification of a degree of similarity between two pieces of voice data of the same speaker and a degree of similarity between two pieces of voice data of different speakers. The second threshold calculation unit 417 calculates the second threshold by performing regression analysis on the plurality of degrees of similarity calculated by the second speaker identification unit 416.

The threshold storage unit 408 stores the first threshold calculated by the first threshold calculation unit 407 and the second threshold calculated by the second threshold calculation unit 417.

Next, a speaker identification system according to the third embodiment of the present disclosure will be described.

Figure 19:
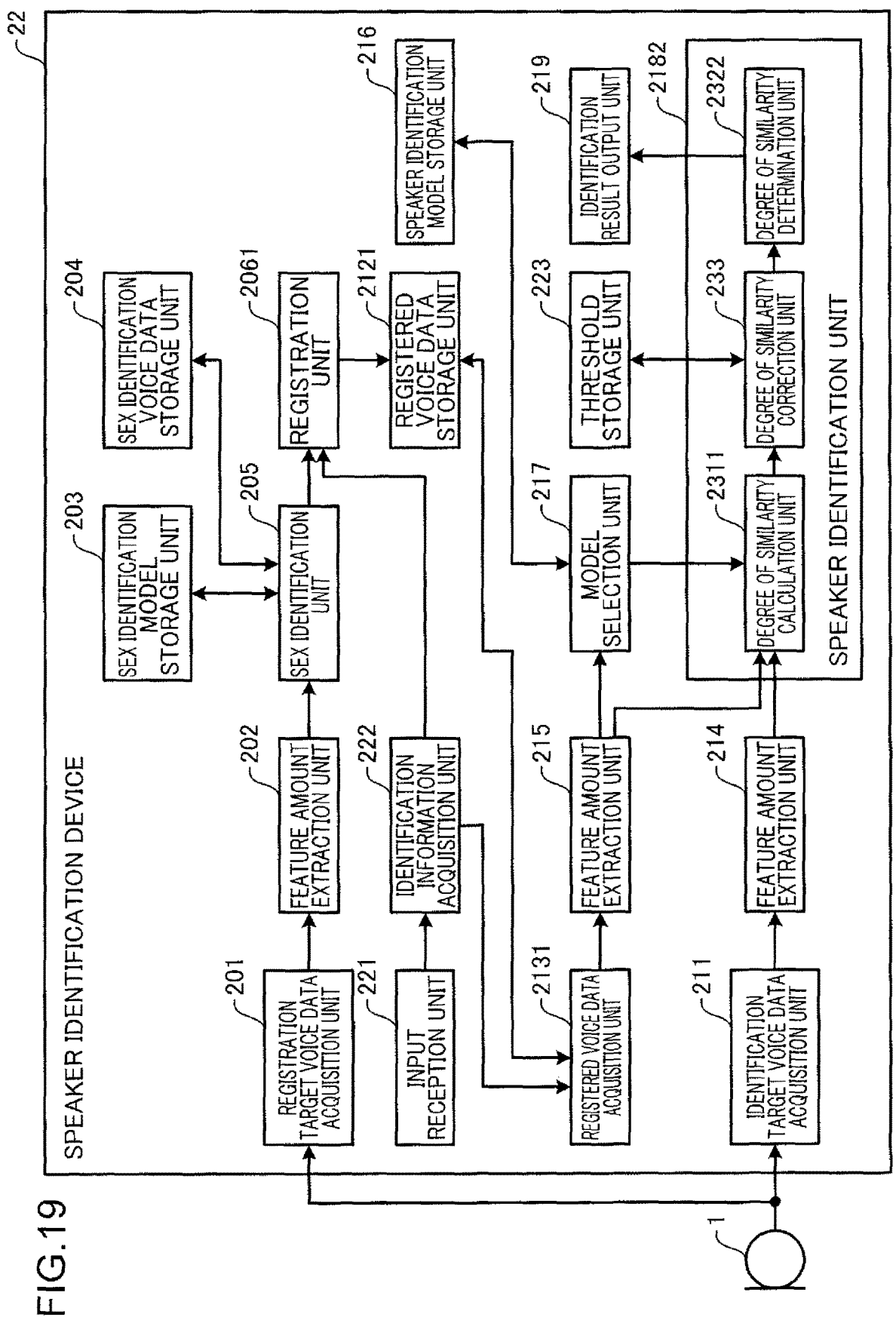
FIG. 19 is a diagram illustrating a configuration of a speaker identification system according to the third embodiment of the present disclosure.

FIG. 19 is a diagram illustrating a configuration of the speaker identification system according to the third embodiment of the present disclosure.

The speaker identification system illustrated in FIG. 19 includes a microphone 1 and a speaker identification device 22. Note that the speaker identification device 22 may or may not include the microphone 1.

In the third embodiment, the same components as those in the first embodiment and the second embodiment are denoted by the same reference numerals, and description thereof will be omitted.

The speaker identification device 22 includes a registration target voice data acquisition unit 201, a feature amount extraction unit 202, a sex identification model storage unit 203, a sex identification voice data storage unit 204, a sex identification unit 205, a registration unit 2061, an identification target voice data acquisition unit 211, a registered voice data storage unit 2121, a registered voice data acquisition unit 2131, a feature amount extraction unit 214, a feature amount extraction unit 215, a speaker identification model storage unit 216, a model selection unit 217, a speaker identification unit 2182, an identification result output unit 219, an input reception unit 221, an identification information acquisition unit 222, and a threshold storage unit 223.

The speaker identification unit 2182 includes a degree of similarity calculation unit 2311, a degree of similarity correction unit 233, and a degree of similarity determination unit 2322.

When acquiring a degree of similarity from the first speaker identification model, the degree of similarity correction unit 233 subtracts the first threshold from the acquired degree of similarity. When acquiring a degree of similarity from the second speaker identification model, the degree of similarity correction unit 233 subtracts the second threshold from the acquired degree of similarity. When a degree of similarity is calculated by the degree of similarity calculation unit 2311 using the first speaker identification model, the degree of similarity correction unit 233 reads the first threshold from the threshold storage unit 223 and subtracts the first threshold from the calculated degree of similarity. When a degree of similarity is calculated by the degree of similarity calculation unit 2311 using the second speaker identification model, the degree of similarity correction unit 233 reads the second threshold from the threshold storage unit 223 and subtracts the second threshold from the calculated degree of similarity.

The threshold storage unit 223 stores in advance the first threshold for correcting a degree of similarity calculated using the first speaker identification model and the second threshold for correcting a degree of similarity calculated using the second speaker identification model. The threshold storage unit 223 stores in advance the first threshold and the second threshold generated by the speaker identification model generation device 41.

The speaker identification model generation device 41 may transmit the first threshold and the second threshold stored in the threshold storage unit 408 to the speaker identification device 22. The speaker identification device 22 may store the received first threshold and second threshold in the threshold storage unit 223. In addition, at the time of manufacturing the speaker identification device 22, the first threshold and the second threshold generated by the speaker identification model generation device 41 may be stored in the threshold storage unit 223.

When a degree of similarity obtained by subtracting the first threshold or the second threshold by the degree of similarity correction unit 233 is higher than the third threshold, the degree of similarity determination unit 2322 identifies a speaker of registered voice data as a speaker of identification target voice data.

Next, operation of speaker identification model generation processing of the speaker identification model generation device 41 in the third embodiment will be described.

Figure 20:
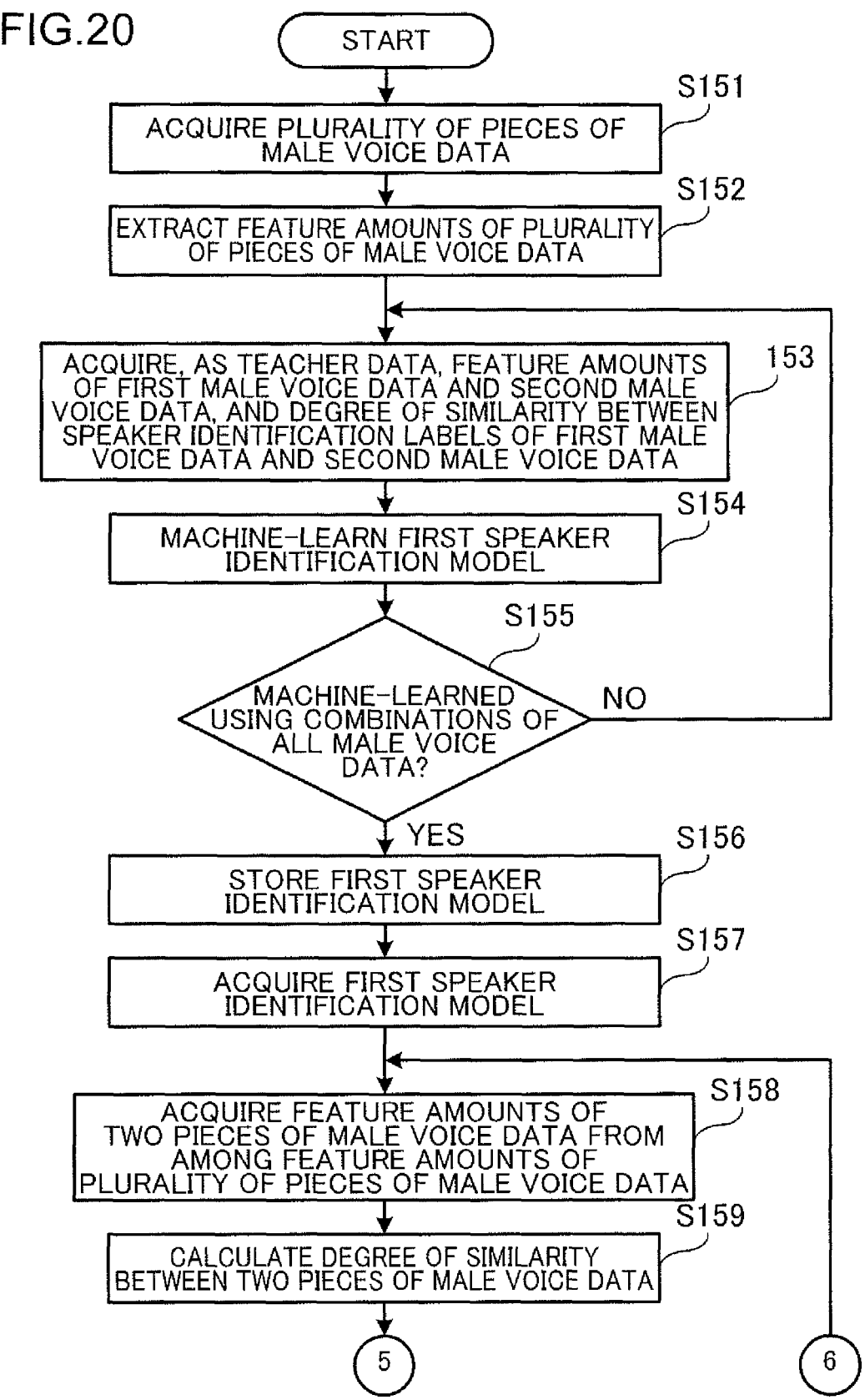
FIG. 20 is a first flowchart for explaining operation of speaker identification model generation processing of the speaker identification model generation device according to the third embodiment.
Figure 21:
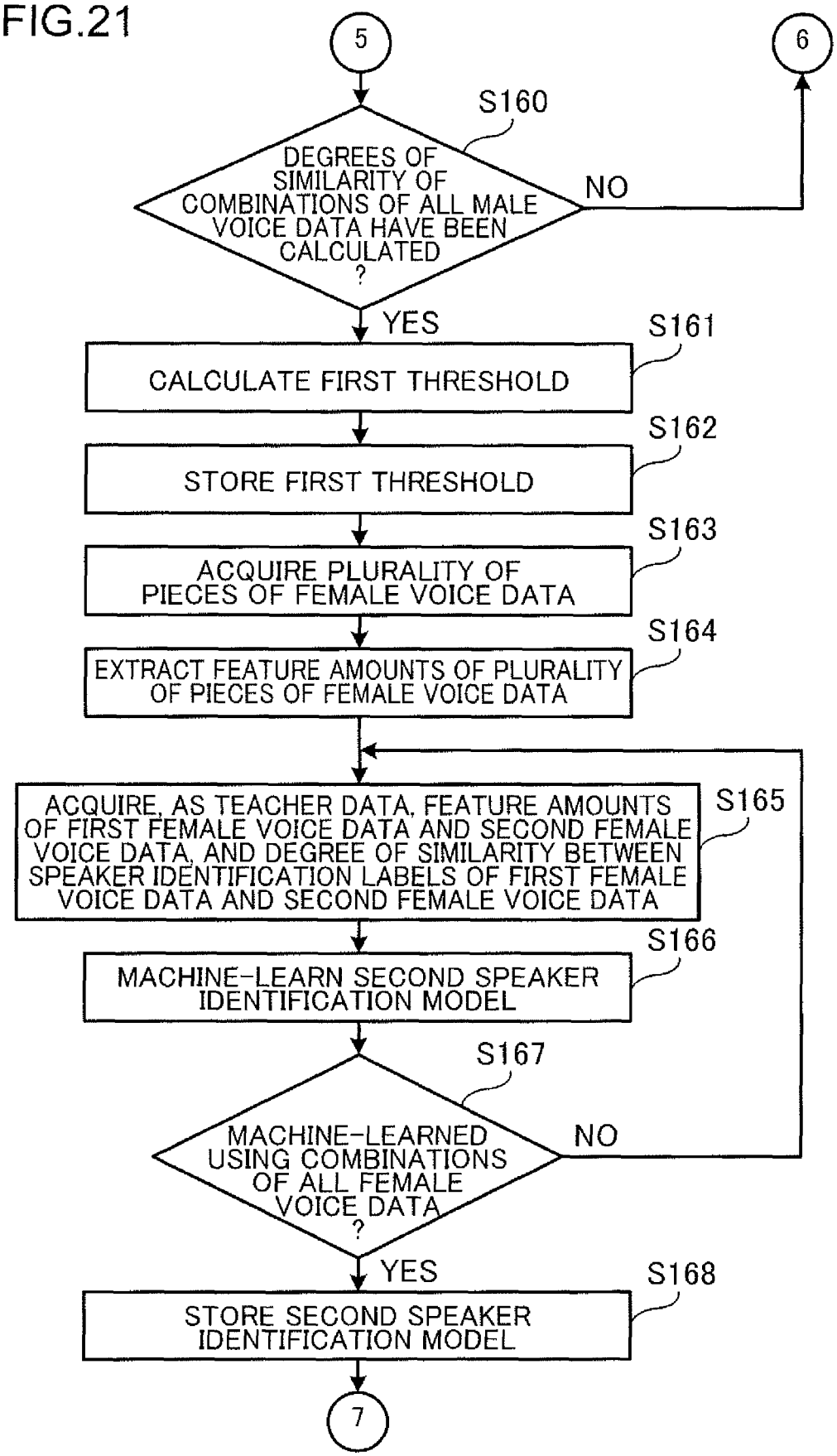
FIG. 21 is a second flowchart for explaining the operation of the speaker identification model generation processing of the speaker identification model generation device according to the third embodiment.
Figure 22:
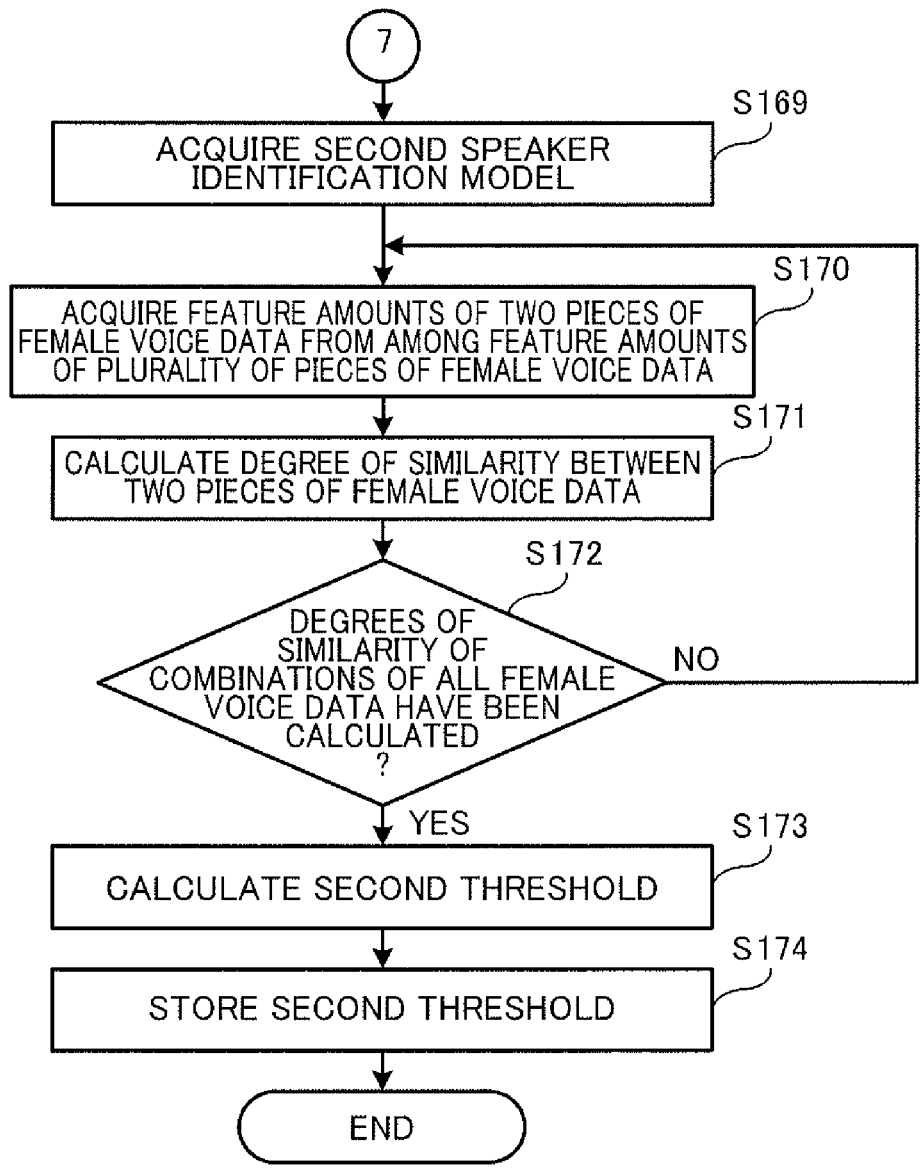
FIG. 22 is a third flowchart for explaining the operation of the speaker identification model generation processing of the speaker identification model generation device according to the third embodiment.

FIG. 20 is a first flowchart for explaining the operation of the speaker identification model generation processing of the speaker identification model generation device according to the third embodiment, FIG. 21 is a second flowchart for explaining the operation of the speaker identification model generation processing of the speaker identification model generation device according to the third embodiment, and FIG. 22 is a third flowchart for explaining the operation of the speaker identification model generation processing of the speaker identification model generation device in according to third embodiment.

Since processing of Steps S151 to S156 is the same as the processing of Steps S61 to S66 illustrated in FIG. 9, description thereof will be omitted.

Next, in Step S157, the first speaker identification unit 406 acquires the first speaker identification model from the first speaker identification model storage unit 405.

Next, in Step S158, the first speaker identification unit 406 acquires feature amounts of two pieces of male voice data from among the feature amounts of the plurality of pieces of male voice data extracted by the feature amount extraction unit 403.

Next, in Step S159, the first speaker identification unit 406 inputs the acquired feature amounts of the two pieces of male voice data to the first speaker identification model to calculate a degree of similarity between the two pieces of male voice data. Note that the two pieces of male voice data are either two pieces of male voice data uttered by one speaker or two pieces of male voice data uttered by two speakers. At this time, a degree of similarity in a case where the two pieces of male voice data are male voice data uttered by one speaker is higher than a degree of similarity in a case where the two pieces of male voice data are male voice data uttered by two speakers.

Next, in Step S160, the first speaker identification unit 406 determines whether or not degrees of similarity of the combinations of all the male voice data have been calculated. In a case where it is determined here that the degrees of similarity of the combinations of all the male voice data have not been calculated (NO in Step S160), the processing returns to Step S158. Then, the first speaker identification unit 406 acquires, from the feature amount extraction unit 403, feature amounts of two pieces of the male voice data whose degree of similarity is yet to be calculated from among the feature amounts of the plurality of pieces of male voice data.

On the other hand, in a case where it is determined that the degrees of similarity of the combinations of all the male voice data have been calculated (YES in Step S160), in Step S161, the first threshold calculation unit 407 performs regression analysis on the plurality of degrees of similarity calculated by the first speaker identification unit 406 to calculate the first threshold that enables identification of a degree of similarity between two pieces of male voice data of the same speaker and a degree of similarity between two pieces of male voice data of different speakers.

Next, in Step S162, the first threshold calculation unit 407 stores the calculated first threshold in the threshold storage unit 408.

Since processing of Steps S163 to S168 is the same as the processing of Steps S67 to S72 illustrated in FIG. 9 and FIG. 10, description thereof will be omitted.

Next, in Step S169, the second speaker identification unit 416 acquires the second speaker identification model from the second speaker identification model storage unit 415.

Next, in Step S170, the second speaker identification unit 416 acquires feature amounts of two pieces of female voice data from among the feature amounts of the plurality of pieces of female voice data extracted by the feature amount extraction unit 413.

Next, in Step S171, the second speaker identification unit 416 inputs the acquired feature amounts of the two pieces of female voice data to the second speaker identification model to calculate a degree of similarity between the two pieces of female voice data. Note that the two pieces of female voice data are either two pieces of female voice data uttered by one speaker or two pieces of female voice data uttered by two speakers. At this time, a degree of similarity in a case where the two pieces of female voice data are female voice data uttered by one speaker is higher than a degree of similarity in a case where the two pieces of female voice data are female voice data uttered by two speakers.

Next, in Step S172, the second speaker identification unit 416 determines whether or not degrees of similarity of the combinations of all the female voice data have been calculated. In a case where it is determined here that the degrees of similarity of the combinations of all the female voice data have not been calculated (NO in Step S172), the processing returns to Step S170. Then, the second speaker identification unit 416 acquires, from the feature amount extraction unit 413, feature amounts of two pieces of the female voice data whose degree of similarity is yet to be calculated from among the feature amounts of the plurality of pieces of female voice data.

On the other hand, in a case where it is determined that the degrees of similarity of the combinations of all the female voice data have been calculated (YES in Step S172), in Step S173, the second threshold calculation unit 417 performs regression analysis on the plurality of degrees of similarity calculated by the second speaker identification unit 416 to calculate the second threshold that enables identification of a degree of similarity between two pieces of female voice data of the same speaker and a degree of similarity between two pieces of female voice data of different speakers.

Next, in Step S174, the second threshold calculation unit 417 stores the calculated second threshold in the threshold storage unit 408.

Next, operation of speaker identification processing of the speaker identification device 22 in the third embodiment will be described.

Figure 23:
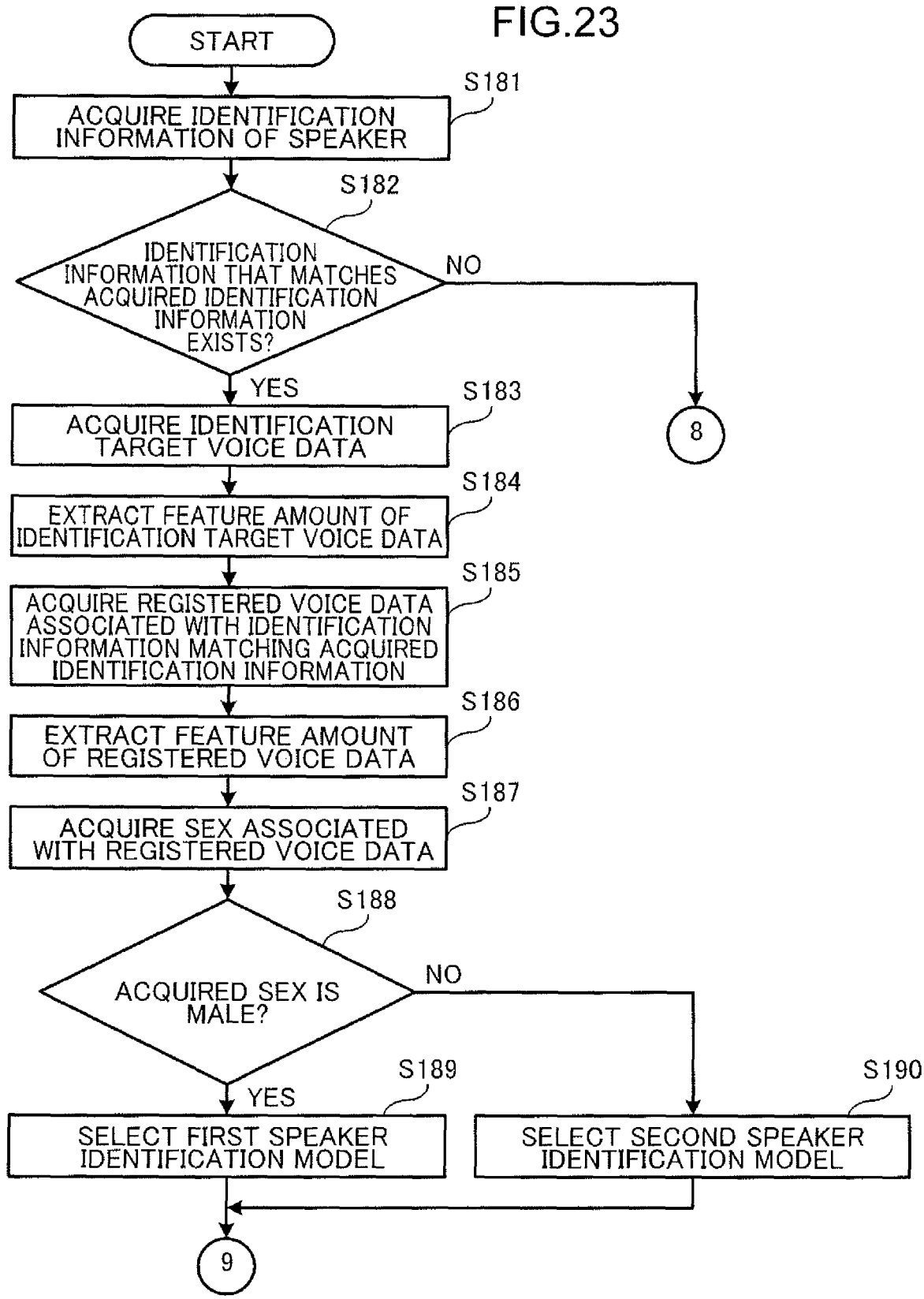
FIG. 23 is a first flowchart for explaining operation of speaker identification processing of a speaker identification device according to the third embodiment.
Figure 24:
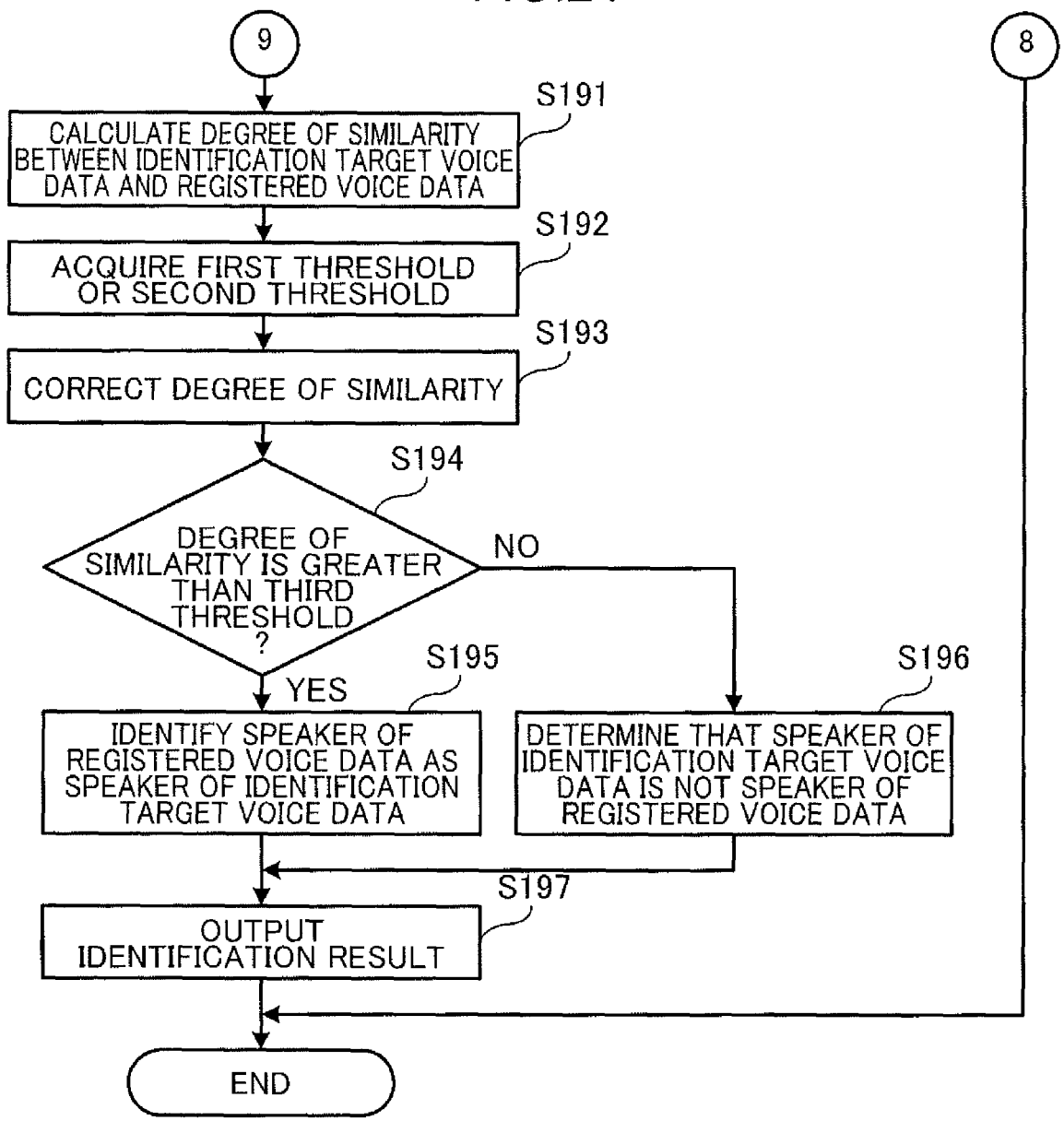
FIG. 24 is a second flowchart for explaining the operation of the speaker identification processing of the speaker identification device according to the third embodiment.

FIG. 23 is a first flowchart for explaining the operation of the speaker identification processing of the speaker identification device in the third embodiment, and FIG. 24 is a second flowchart for explaining the operation of the speaker identification processing of the speaker identification device in the third embodiment.

Since processing of Steps S181 to S191 is the same as the processing of Steps S131 to S141 illustrated in FIG. 16 and FIG. 17, description thereof will be omitted.

Next, in Step S192, the degree of similarity correction unit 233 acquires the first threshold or the second threshold from the threshold storage unit 223. At this time, in a case where the first speaker identification model is selected by the model selection unit 217, the degree of similarity correction unit 233 acquires the first threshold from the threshold storage unit 223. In a case where the second speaker identification model is selected by the model selection unit 217, the degree of similarity correction unit 233 acquires the second threshold from the threshold storage unit 223.

Next, in Step S193, the degree of similarity correction unit 233 corrects the degree of similarity calculated by the degree of similarity calculation unit 2311 using the acquired first threshold or second threshold. At this time, the degree of similarity correction unit 233 subtracts the first threshold or the second threshold from the degree of similarity calculated by the degree of similarity calculation unit 2311.

Next, in Step S194, the degree of similarity determination unit 2322 determines whether or not the degree of similarity corrected by the degree of similarity correction unit 233 is greater than the third threshold. The third threshold is, for example, 0. The degree of similarity determination unit 2322 determines that the identification target voice data matches the registered voice data registered in advance in a case where the corrected degree of similarity is greater than 0, and determines that the identification target voice data does not match the registered voice data registered in advance in a case where the corrected degree of similarity is 0 or lower.

In a case where it is determined here that the degree of similarity corrected by the degree of similarity correction unit 233 is greater than the third threshold (YES in Step S194), in Step S195, the degree of similarity determination unit 2322 identifies the speaker of the registered voice data as the speaker of the identification target voice data.

On the other hand, in a case where it is determined that the degree of similarity corrected by the degree of similarity correction unit 233 is the third threshold or lower (NO in Step S194), in Step S196, the degree of similarity determination unit 2322 determines that the speaker of the identification target voice data is not the speaker of the registered voice data.

Since processing of Step S197 is the same as the processing of Step S145 illustrated in FIG. 17, description thereof will be omitted.

In a case where two different first speaker identification model and second speaker identification model are used, the first speaker identification model and the second speaker identification model may have different ranges of output values. Therefore, in the third embodiment, at the time of registration, a first threshold and a second threshold enabling identification of the same speaker are calculated for the first speaker identification model and the second speaker identification model, respectively. In addition, at the time of speaker identification, the first threshold or the second threshold is subtracted from the calculated degree of similarity between the identification target voice data and the registered voice data to correct the degree of similarity. Then, the speaker of the identification target voice data can be identified more accurately by comparing the corrected degree of similarity with the third threshold common to the first speaker identification model and the second speaker identification model.

Fourth Embodiment

Since an amount of information in the utterance is larger as an utterance time is longer, it is easier to identify a speaker, and a degree of similarity between pieces of registered voice data of a person himself or herself and identification target voice data tends to be higher. On the other hand, since an amount of information in the utterance is smaller as an utterance time is shorter, it is more difficult to identify a speaker, and even pieces of registered voice data of a person himself or herself and identification target voice data might have a low degree of similarity therebetween. Therefore, in a ease where a speaker of identification target voice data having a short utterance time is identified by a speaker identification model obtained by machine learning using voice data having a long utterance time, accuracy of speaker identification might decrease.

Therefore, a speaker identification method according to a fourth embodiment includes, by a computer: acquiring identification target voice data; acquiring registered voice data registered in advance; extracting a feature amount of the identification target voice data; extracting a feature amount of the registered voice data; selecting a third speaker identification model machine-learned by using voice data having an utterance time of a predetermined time or longer in order to identify a speaker whose utterance time is a predetermined time or longer in a case where an utterance time of at least one of a speaker of the identification target voice data and a speaker of the registered voice data is the predetermined time or longer; selecting a fourth speaker identification model machine-learned by using voice data having an utterance time being shorter than the predetermined time in order to identify a speaker whose utterance time is shorter than the predetermined time in a case where the utterance time of at least one of the speaker of the identification target voice data and the speaker of the registered voice data is shorter than the predetermined time; and inputting the feature amount of the identification target voice data and the feature amount of the registered voice data to one of the selected third speaker identification model and fourth speaker identification model, thereby identifying a speaker of the identification target voice data.

Figure 25:
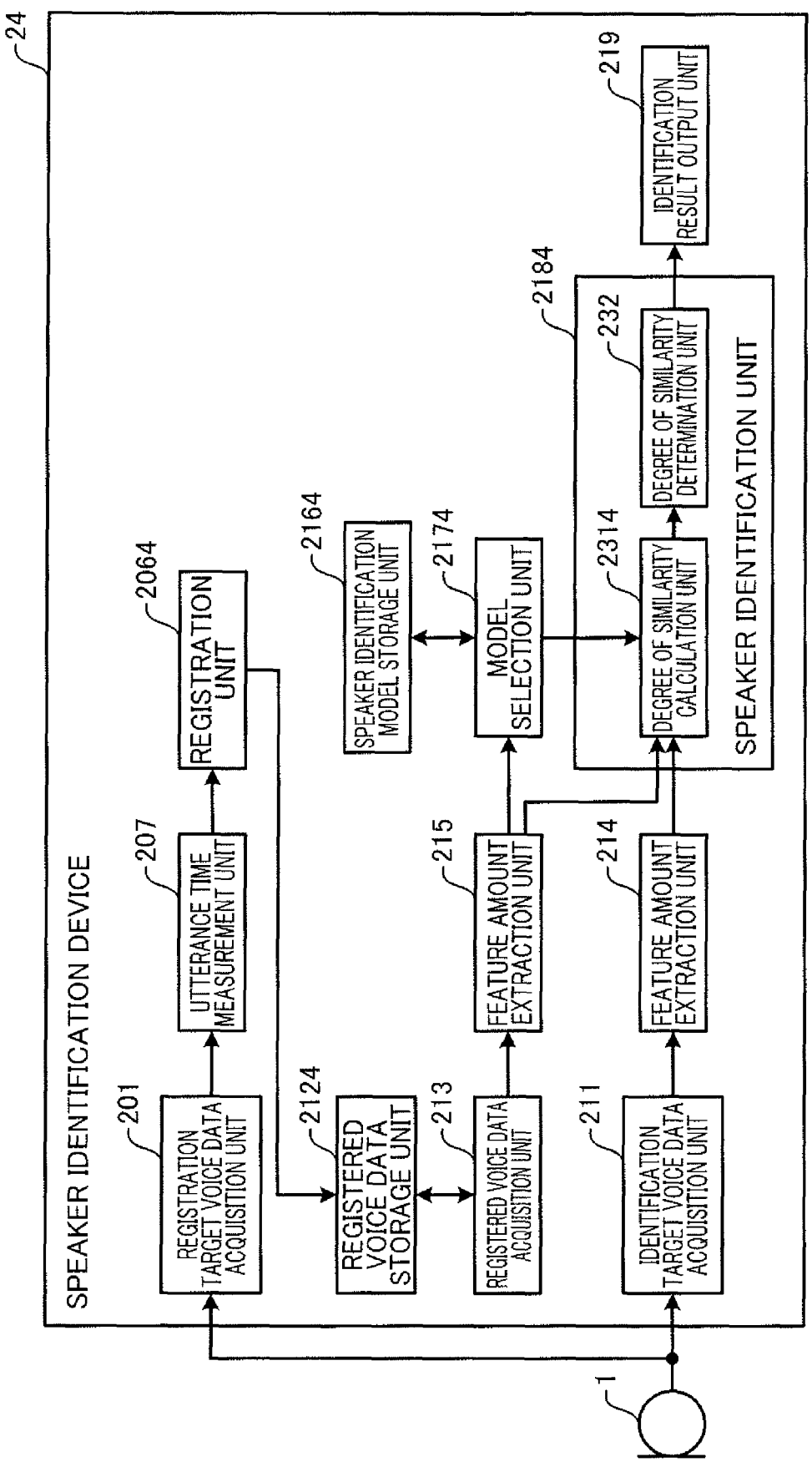
FIG. 25 is a diagram illustrating a configuration of a speaker identification system according to a fourth embodiment of the present disclosure.

FIG. 25 is a diagram illustrating a configuration of a speaker identification system according to the fourth embodiment of the present disclosure.

The speaker identification system illustrated in FIG. 25 includes a microphone 1 and a speaker identification device 24. Note that the speaker identification device 24 may or may not include the microphone 1.

In the fourth embodiment, the same components as those in the first embodiment are denoted by the same reference numerals, and description thereof will be omitted.

The speaker identification device 24 includes a registration target voice data acquisition unit 201, an utterance time measurement unit 207, a registration unit 2064, an identification target voice data acquisition unit 211, a registered voice data storage unit 2124, a registered voice data acquisition unit 213, a feature amount extraction unit 214, a feature amount extraction unit 215, a speaker identification model storage unit 2164, a model selection unit 2174, a speaker identification unit 2184, and an identification result output unit 219.

The utterance time measurement unit 207 measures an utterance time of registration target voice data acquired by the registration target voice data acquisition unit 201. Note that the utterance time is a time from time when the acquisition of registration target voice data is started by the registration target voice data acquisition unit 201 to time when the acquisition of the registration target voice data is ended.

The registration unit 2064 registers, as registered voice data, registration target voice data associated with utterance time information indicating an utterance time measured by the utterance time measurement unit 207. The registration unit 2064 registers the registered voice data in the registered voice data storage unit 2124.

The speaker identification device 24 may further include an input reception unit that receives an input of information on a speaker of registration target voice data. Then, the registration unit 2064 may register registered voice data in the registered voice data storage unit 2124 in association with information on a speaker. Information on a speaker is, for example, a name of the speaker.

The registered voice data storage unit 2124 stores registered voice data associated with utterance time information. The registered voice data storage unit 2124 stores a plurality of pieces of registered voice data.

The speaker identification model storage unit 2164 stores in advance the third speaker identification model machine-learned by using voice data having an utterance time of a predetermined time or longer in order to identify a speaker whose utterance time is the predetermined time or longer, and the fourth speaker identification model machine-learned by using voice data having an utterance time being shorter than the predetermined time in order to identify a speaker whose utterance time is shorter than the predetermined time. The speaker identification model storage unit 2164 stores in advance the third speaker identification model and the fourth speaker identification model generated by a speaker identification model generation device 44 to be described later. A method for generating the third speaker identification model and the fourth speaker identification model will be described later.

In a case where an utterance time of at least one of a speaker of identification target voice data and a speaker of registered voice data is the predetermined time or longer, the model selection unit 2174 selects the third speaker identification model machine-learned by using voice data having an utterance time of the predetermined time or longer in order to identify a speaker whose utterance time is the predetermined time or longer. In addition, in a case where the utterance time of at least one of the speaker of the identification target voice data and the speaker of the registered voice data is shorter than the predetermined time, the model selection unit 2174 selects the fourth speaker identification model machine-learned by using voice data having an utterance time being shorter than the predetermined time in order to identify a speaker whose utterance time is shorter than the predetermined time.

In the fourth embodiment, the model selection unit 2174 selects the third speaker identification model in a case where the utterance time of the speaker of the registered voice data is the predetermined time or longer, and selects the fourth speaker identification model in a case where the utterance time of the speaker of the registered voice data is shorter than the predetermined time. The registered voice data is associated with an utterance time in advance. Therefore, the model selection unit 2174 selects the third speaker identification model in a case where the utterance time associated with the registered voice data is the predetermined time or longer, and selects the fourth speaker identification model in a case where the utterance time associated with the registered voice data is shorter than the predetermined time. The predetermined time is, for example, 60 seconds.

The speaker identification unit 2184 identifies a speaker of identification target voice data by inputting a feature amount of the identification target voice data and a feature amount of the registered voice data to one of the third speaker identification model and the fourth speaker identification model selected by the model selection unit 2174.

The speaker identification unit 2184 includes a degree of similarity calculation unit 2314 and a degree of similarity determination unit 232.

The degree of similarity calculation unit 2314 inputs a feature amount of identification target voice data and a feature amount of each of the plurality of pieces of registered voice data to one of the selected third speaker identification model and fourth speaker identification model to acquire a degree of similarity between the identification target voice data and each of the plurality of pieces of registered voice data from one of the third speaker identification model and the fourth speaker identification model.

Next, a speaker identification model generation device according to the fourth embodiment of the present disclosure will be described.

Figure 26:
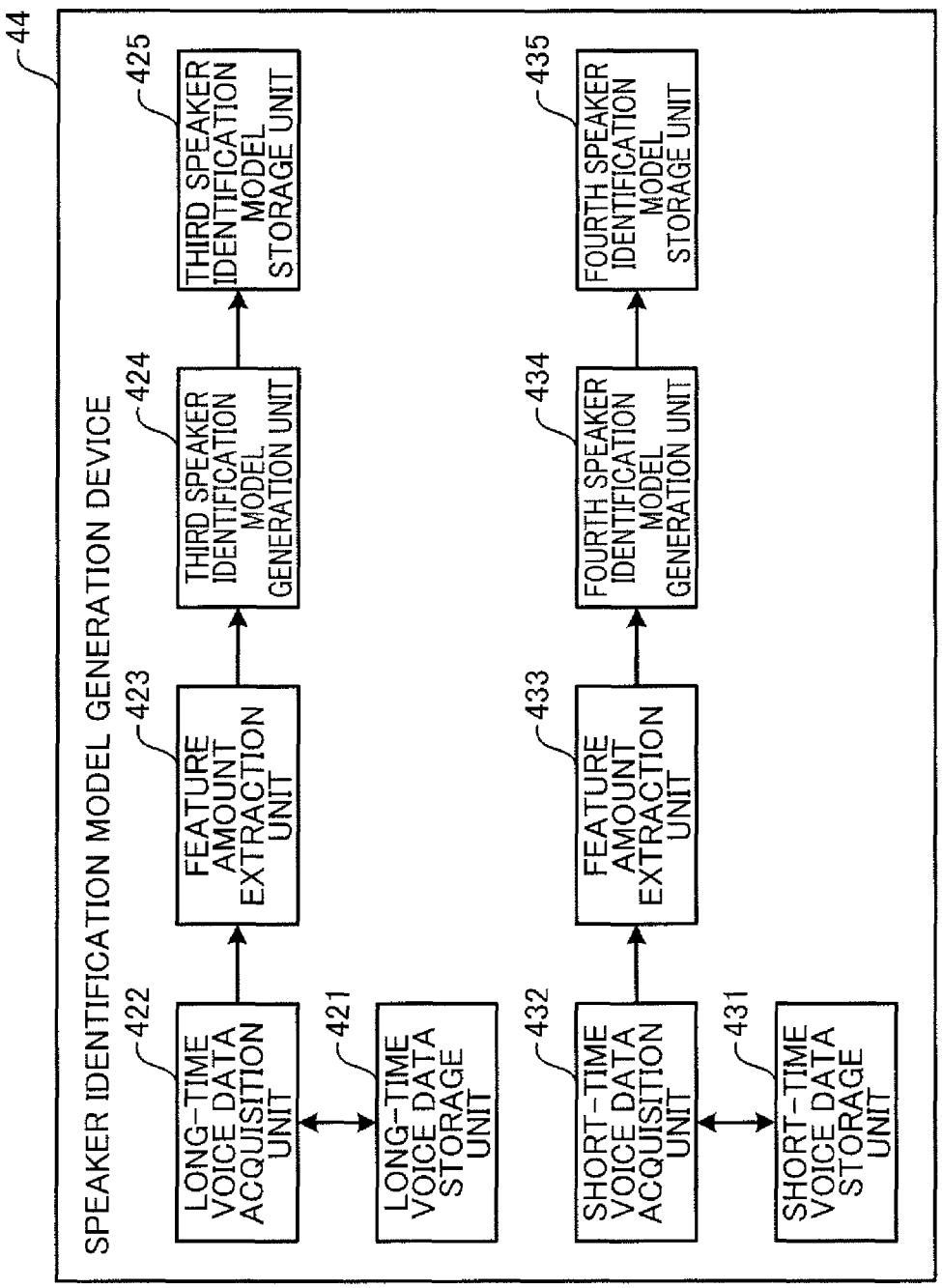
FIG. 26 is a diagram illustrating a configuration of a speaker identification model generation device according to the fourth embodiment of the present disclosure.

FIG. 26 is a diagram illustrating a configuration of the speaker identification model generation device according to the fourth embodiment of the present disclosure.

The speaker identification model generation device 44 illustrated in FIG. 26 includes a long-time voice data storage unit 421, a long-time voice data acquisition unit 422, a feature amount extraction unit 423, a third speaker identification model generation unit 424, a third speaker identification model storage unit 425, a short-time voice data storage unit 431, a short-time voice data acquisition unit 432, a feature amount extraction unit 433, a fourth speaker identification model generation unit 434, and a fourth speaker identification model storage unit 435.

The long-time voice data acquisition unit 422, the feature amount extraction unit 423, the third speaker identification model generation unit 424, the short-time voice data acquisition unit 432, the feature amount extraction unit 433, and the fourth speaker identification model generation unit 434 are implemented by a processor. The long-time voice data storage unit 421, the third speaker identification model storage unit 425, the short-time voice data storage unit 431, and the fourth speaker identification model storage unit 435 are implemented by a memory.

The long-time voice data storage unit 421 stores a plurality of pieces of long-time voice data to which a speaker identification label for identifying a speaker is assigned and whose utterance time is a predetermined time or longer. The long-time voice data is voice data whose utterance time is a predetermined time or longer. The long-time voice data storage unit 421 stores a plurality of pieces of long-time voice data different for each of a plurality of speakers.

The long-time voice data acquisition unit 422 acquires, from the long-time voice data storage unit 421, a plurality of pieces of long-time voice data to which a speaker identification label for identifying a speaker is assigned. Although in the fourth embodiment, the long-time voice data acquisition unit 422 acquires a plurality of pieces of long-time voice data from the long-time voice data storage unit 421, the present disclosure is not particularly limited thereto, and a plurality of pieces of long-time voice data may be acquired (received) from an external device via a network.

The feature amount extraction unit 423 extracts feature amounts of the plurality of pieces of long-time voice data acquired by the long-time voice data acquisition unit 422. The feature amount is, for example, i-vector.

The third speaker identification model generation unit 424 uses a feature amount of each of first long-time voice data and second long-time voice data among the plurality of long-time voice data and a degree of similarity between speaker identification labels of the first long-time voice data and the second long-time voice data as teacher data, to generate, by machine learning, the third speaker identification model with each feature amount of the two pieces of voice data as an input and a degree of similarity between the two pieces of voice data as an output. For example, the third speaker identification model is machine-learned such that the highest degree of similarity is output when a speaker identification label of the first long-time voice data is the same as a speaker identification label of the second long-time voice data, and the lowest degree of similarity is output when the speaker identification label of the first long-time voice data is different from the speaker identification label of the second long-time voice data.

As the third speaker identification model, a model based on PLDA is used. The PLDA model automatically selects a feature amount effective for speaker identification from 400 dimensional i-vectors (feature amounts), and calculates a logarithmic likelihood ratio as a degree of similarity.

Examples of the machine learning include supervised learning in which a relationship between an input and an output is learned using teacher data in which a label (output information) is assigned to input information, unsupervised learning in which a data structure is constructed only by an unlabeled input, semi-supervised learning in which both labeled and unlabeled input are handled, and reinforcement learning in which an action that maximizes a reward is learned by trial and error. Furthermore, as a specific method of machine learning, presented are a neural network (including deep learning using a multilayer neural network), genetic programming, a decision tree, a Bayesian network, a support vector machine (SVM), and the like. In the machine learning of the third speaker identification model, any of the specific examples described above may be used.

The third speaker identification model storage unit 425 stores the third speaker identification model generated by the third speaker identification model generation unit 424.

The short-time voice data storage unit 431 stores a plurality of pieces of short-time voice data to which a speaker identification label for identifying a speaker is assigned and whose utterance time is shorter than a predetermined time. The short-time voice data is voice data whose utterance time is shorter than the predetermined time. The short-time voice data storage unit 431 stores a plurality of pieces of short-time voice data different for each of a plurality of speakers.

The short-time voice data acquisition unit 432 acquires, from the short-time voice data storage unit 431, a plurality of pieces of short-time voice data to which a speaker identification label for identifying a speaker is assigned. Although in the fourth embodiment, the short-time voice data acquisition unit 432 acquires a plurality of pieces of short-time voice data from the short-time voice data storage unit 431, the present disclosure is not particularly limited thereto, and a plurality of pieces of short-time voice data may be acquired (received) from an external device via a network.

The feature amount extraction unit 433 extracts feature amounts of the plurality of pieces of short-time voice data acquired by the short-time voice data acquisition unit 432. The feature amount is, for example, i-vector.

The fourth speaker identification model generation unit 434 uses a feature amount of each of first short-time voice data and second short-time voice data among the plurality of short-time voice data and a degree of similarity between speaker identification labels of the first short-time voice data and the second short-time voice data as teacher data, to generate, by machine learning, the fourth speaker identification model with each feature amount of the two pieces of voice data as an input and a degree of similarity between the two pieces of voice data as an output. For example, the fourth speaker identification model is machine-learned such that the highest degree of similarity is output when a speaker identification label of the first short-time voice data is the same as a speaker identification label of the second short-time voice data, and the lowest degree of similarity is output when the speaker identification label of the first short-time voice data is different from the speaker identification label of the second short-time voice data.

As the fourth speaker identification model, a model based on PLDA is used. The PLDA model automatically selects a feature amount effective for speaker identification from 400 dimensional i-vectors (feature amounts), and calculates a logarithmic likelihood ratio as a degree of similarity.

Examples of the machine learning include supervised learning in which a relationship between an input and an output is learned using teacher data in which a label (output information) is assigned to input information, unsupervised learning in which a data structure is constructed only by an unlabeled input, semi-supervised learning in which both labeled and unlabeled input are handled, and reinforcement learning in which an action that maximizes a reward is learned by trial and error. Furthermore, as a specific method of machine learning, presented are a neural network (including deep learning using a multilayer neural network), genetic programming, a decision tree, a Bayesian network, a support vector machine (SVM), and the like. In the machine learning of the fourth speaker identification model, any of the specific examples described above may be used.

The fourth speaker identification model storage unit 435 stores the fourth speaker identification model generated by the fourth speaker identification model generation unit 434.

The speaker identification model generation device 44 may transmit the third speaker identification model stored in the third speaker identification model storage unit 425 and the fourth speaker identification model stored in the fourth speaker identification model storage unit 435 to the speaker identification device 24. The speaker identification device 24 may store the received third speaker identification model and fourth speaker identification model in the speaker identification model storage unit 2164. In addition, at the time of manufacturing the speaker identification device 24, the third speaker identification model and the fourth speaker identification model generated by the speaker identification model generation device 44 may be stored in the speaker identification device 24.

Next, operation of each of registration processing and speaker identification processing of the speaker identification device 24 in the fourth embodiment will be described.

Figure 27:
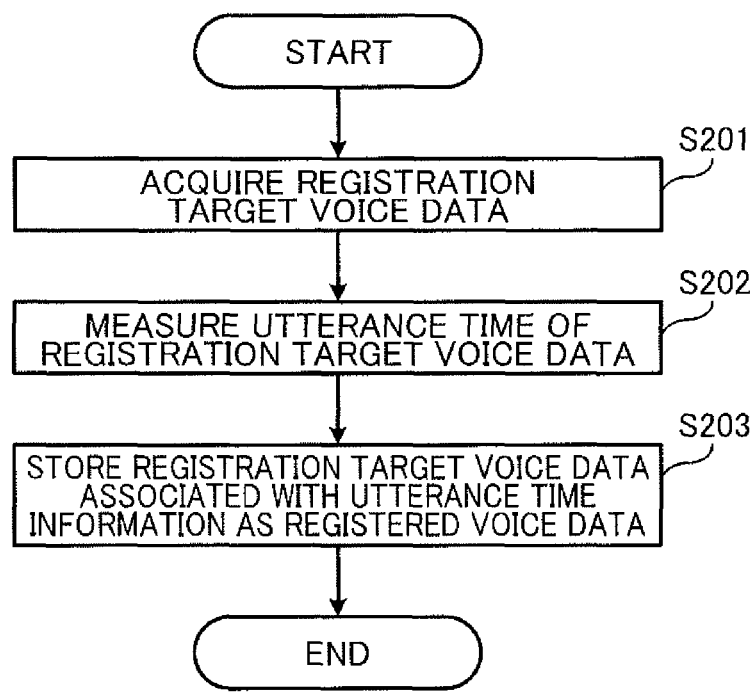
FIG. 27 is a flowchart for explaining operation of registration processing of a speaker identification device according to the fourth embodiment.

FIG. 27 is a flowchart for explaining the operation of the registration processing of the speaker identification device in the fourth embodiment.

First, in Step S201, the registration target voice data acquisition unit 201 acquires the registration target voice data output from the microphone 1. A speaker who wishes to register voice data uttered by himself/herself utters a predetermined sentence toward the microphone 1. At this time, the predetermined sentence is either a sentence whose utterance time is a predetermined time or longer or a sentence whose utterance time is shorter than the predetermined time. The speaker identification device 24 may present a plurality of predetermined sentences to a registration target speaker. In this case, the registration target speaker utters the plurality of presented sentences.

Next, in Step S202, the utterance time measurement unit 207 measures an utterance time of registration target voice data acquired by the registration target voice data acquisition unit 201.

Next, in Step S203, the registration unit 2064 stores, as registered voice data, registration target voice data associated with utterance time information indicating the utterance time measured by the utterance time measurement unit 207 in the registered voice data storage unit 2124.

Figure 28:
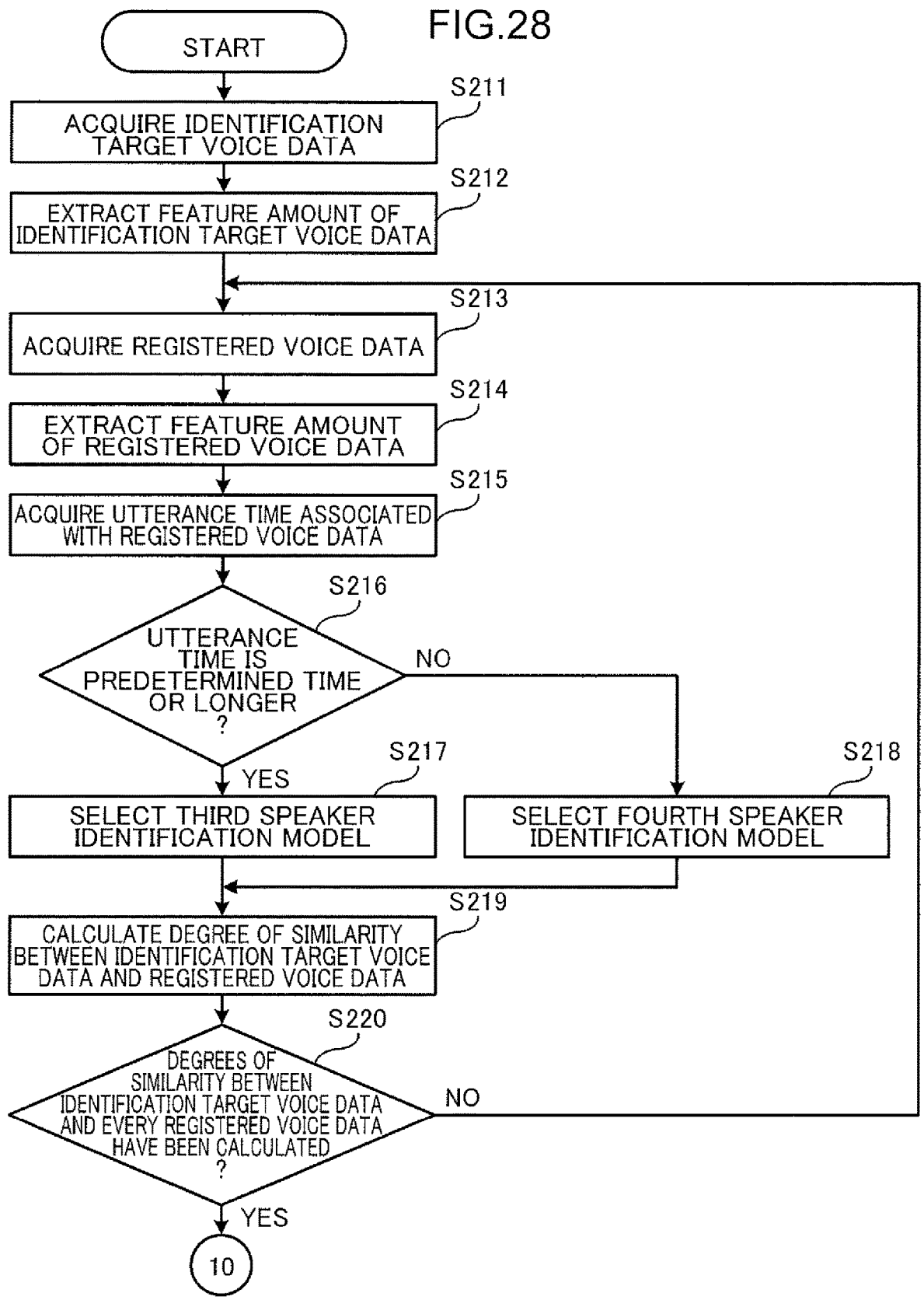
FIG. 28 is a first flowchart for explaining operation of speaker identification processing of the speaker identification device according to the fourth embodiment.
Figure 29:
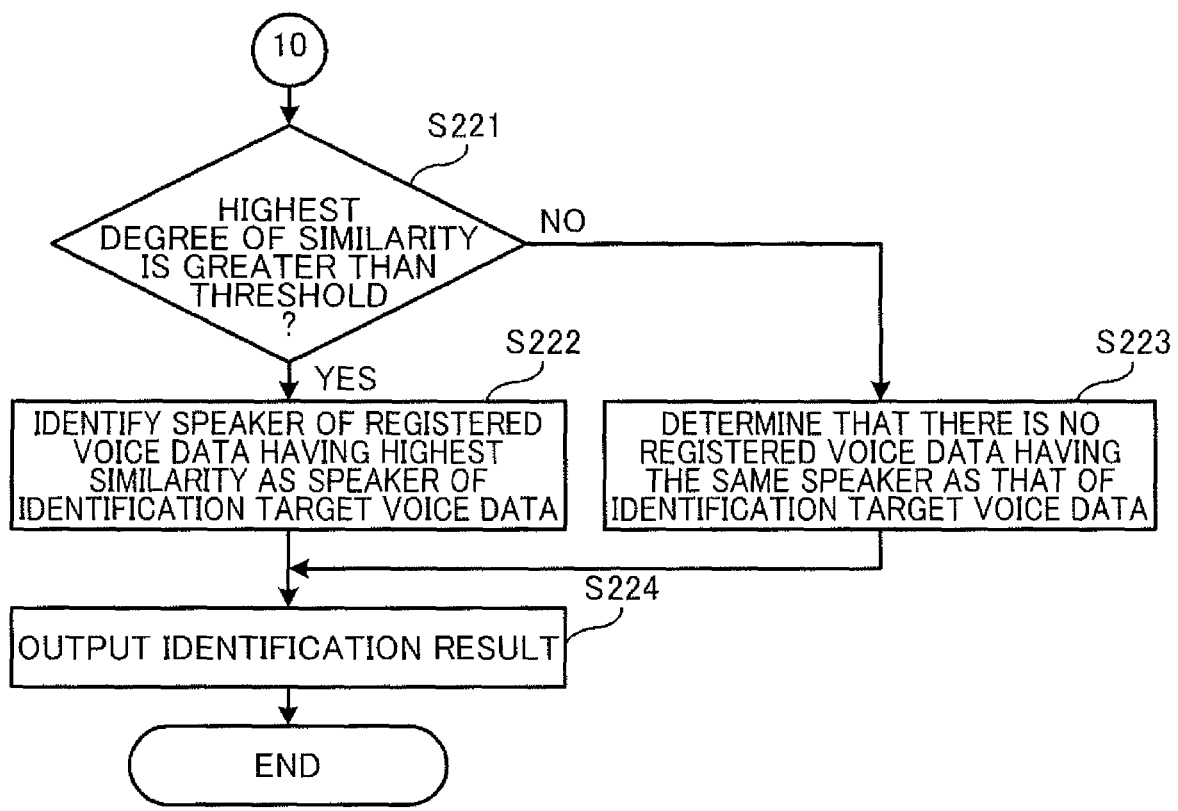
FIG. 29 is a second flowchart for explaining the operation of the speaker identification processing of the speaker identification device according to the fourth embodiment.

FIG. 28 is a first flowchart for explaining the operation of the speaker identification processing of the speaker identification device in the fourth embodiment, and FIG. 29 is a second flowchart for explaining the operation of the speaker identification processing of the speaker identification device in the fourth embodiment.

Since processing of Steps S211 to S214 is the same as the processing of Steps S31 to S34 illustrated in FIG. 6, description thereof will be omitted.

Next, in Step S215, the model selection unit 2174 acquires an utterance time associated with the registered voice data acquired by the registered voice data acquisition unit 213.

Next, in Step S216, the model selection unit 2174 determines whether or not the acquired utterance time is a predetermined time or longer. In a case where it is determined here that the acquired utterance time is the predetermined time or longer (YES in Step S216), the model selection unit 2174 selects the third speaker identification model in Step S217. The model selection unit 2174 acquires the selected third speaker identification model from the speaker identification model storage unit 2164, and outputs the acquired third speaker identification model to the degree of similarity calculation unit 2314.

On the other hand, in a case where it is determined that the acquired utterance time is not the predetermined time or longer, i.e., in a case where it is determined that the acquired utterance time is shorter than the predetermined time (NO in Step S216), the model selection unit 2174 selects the fourth speaker identification model in Step S218. The model selection unit 2174 acquires the selected fourth speaker identification model from the speaker identification model storage unit 2164, and outputs the acquired fourth speaker identification model to the degree of similarity calculation unit 2314.

Next, in Step S219, the degree of similarity calculation unit 2314 inputs the feature amount of the identification target voice data and the feature amount of the registered voice data to one of the selected third speaker identification model and fourth speaker identification model to calculate a degree of similarity between the identification target voice data and the registered voice data.

Next, in Step S220, the degree of similarity calculation unit 2314 determines whether or not a degree of similarity between the identification target voice data and every registered voice data stored in the registered voice data storage unit 2124 has been calculated. In a case where it is determined here that the degree of similarity between the identification target voice data and every registered voice data has not been calculated (NO in Step S220), the processing returns to Step S213. Then, the registered voice data acquisition unit 213 acquires registered voice data whose degree of similarity is yet to be calculated from among the plurality of pieces of registered voice data stored in the registered voice data storage unit 2124.

On the other hand, in a case where it is determined that the degree of similarity between the identification target voice data and every registered voice data has been calculated (YES in Step S220), in Step S221, the degree of similarity determination unit 232 determines whether or not the highest degree of similarity is greater than the threshold.

Since processing of Steps S221 to S224 is the same as the processing of Steps S41 to S44 illustrated in FIG. 7, description thereof will be omitted.

As described above, in a case where an utterance time of at least one of a speaker of the identification target voice data and a speaker of the registered voice data is the predetermined time or longer, the speaker of the identification target voice data is identified by inputting the feature amount of the identification target voice data and the feature amount of the registered voice data to the third speaker identification model machine-learned by using voice data having an utterance time of the predetermined time or longer. In addition, in a case where an utterance time of at least one of a speaker of the identification target voice data and a speaker of the registered voice data is shorter than the predetermined time, the speaker of the identification target voice data is identified by inputting the feature amount of the identification target voice data and the feature amount of the registered voice data to the fourth speaker identification model machine-learned by using voice data having an utterance time shorter than the predetermined time.

Therefore, since a speaker of the identification target voice data is identified by the third speaker identification model and the fourth speaker identification model corresponding to at least one of the utterance times of the identification target voice data and the registered voice data, the accuracy of identifying whether or not an identification target speaker is a speaker registered in advance can be improved.

Although in the fourth embodiment, the model selection unit 2174 selects one of the third speaker identification model and the fourth speaker identification model on the basis of an utterance time associated with the registered voice data, the present disclosure is not particularly limited thereto. The speaker identification device 24 may include an utterance time measurement unit that measures an utterance time of registered voice data acquired by the registered voice data acquisition unit 213. The utterance time measurement unit may output the measured utterance time to the model selection unit 2174. Note that in a case of measuring the utterance time of the speaker of the registered voice data acquired by the registered voice data acquisition unit 213, the utterance time measurement unit 207 becomes unnecessary, and the registration unit 2064 may store, in the registered voice data storage unit 2124, only the registration target voice data acquired by the registration target voice data acquisition unit 201 as the registered voice data.

Although in the fourth embodiment, the model selection unit 2174 selects one of the third speaker identification model and the fourth speaker identification model on the basis of an utterance time of a speaker of the registered voice data, the present disclosure is not particularly limited thereto. The model selection unit 2174 may select one of the third speaker identification model and the fourth speaker identification model on the basis of an utterance time of a speaker of the identification target voice data. In this case, the speaker identification device 24 may include an utterance time measurement unit that measures an utterance time of a speaker of identification target voice data. The utterance time measurement unit may measure an utterance time of the identification target voice data acquired by the identification target voice data acquisition unit 211, and output the measured utterance time to the model selection unit 2174. The model selection unit 2174 may select the third speaker identification model in a case where the utterance time of the speaker of the identification target voice data is the predetermined time or longer, and select the fourth speaker identification model in a case where the utterance time of the speaker of the identification target voice data is shorter than the predetermined time. The predetermined time is, for example, 30 seconds. Note that in a case of measuring the utterance time of the speaker of the identification target voice data, the utterance time measurement unit 207 becomes unnecessary, and the registration unit 2064 may store only the registration target voice data acquired by the registration target voice data acquisition unit 201 in the registered voice data storage unit 2124 as the registered voice data.

In the fourth embodiment, the model selection unit 2174 may select one of the third speaker identification model and the fourth speaker identification model on the basis of both an utterance time of a speaker of the registered voice data and an utterance time of a speaker of the identification target voice data. The model selection unit 2174 may select the third speaker identification model in a case where both the utterance time of the speaker of the registered voice data and the utterance time of the speaker of the identification target voice data are the predetermined time or longer. In addition, the model selection unit 2174 may select the fourth speaker identification model in a case where at least one of the utterance time of the speaker of the registered voice data and the utterance time of the speaker of the identification target voice data are shorter than the predetermined time. The predetermined time is, for example, 20 seconds. In this case, the speaker identification device 24 may further include an utterance time measurement unit that measures an utterance time of a speaker of identification target voice data. JD addition, the speaker identification device 24 may include an utterance time measurement unit that measures an utterance time of a speaker of the registered voice data acquired by the registered voice data acquisition unit 213 without including the utterance time measurement unit 207.

Furthermore, in the fourth embodiment, the model selection unit 2174 may select the third speaker identification model in a case where one of the utterance time of the speaker of the registered voice data and the utterance time of the speaker of the identification target voice data is the predetermined time or longer. In addition, the model selection unit 2174 may select the fourth speaker identification model in a case where both of the utterance time of the speaker of the registered voice data and the utterance time of the speaker of the identification target voice data are shorter than the predetermined time. The predetermined time is, for example, 100 seconds. In this case, the speaker identification device 24 may further include an utterance time measurement unit that measures an utterance time of a speaker of identification target voice data. In addition, the speaker identification device 24 may include an utterance time measurement unit that measures an utterance time of a speaker of the registered voice data acquired by the registered voice data acquisition unit 213 without including the utterance time measurement unit 207.

Next, operation of speaker identification model generation processing of the speaker identification model generation device 44 in the fourth embodiment will be described.

Figure 30:
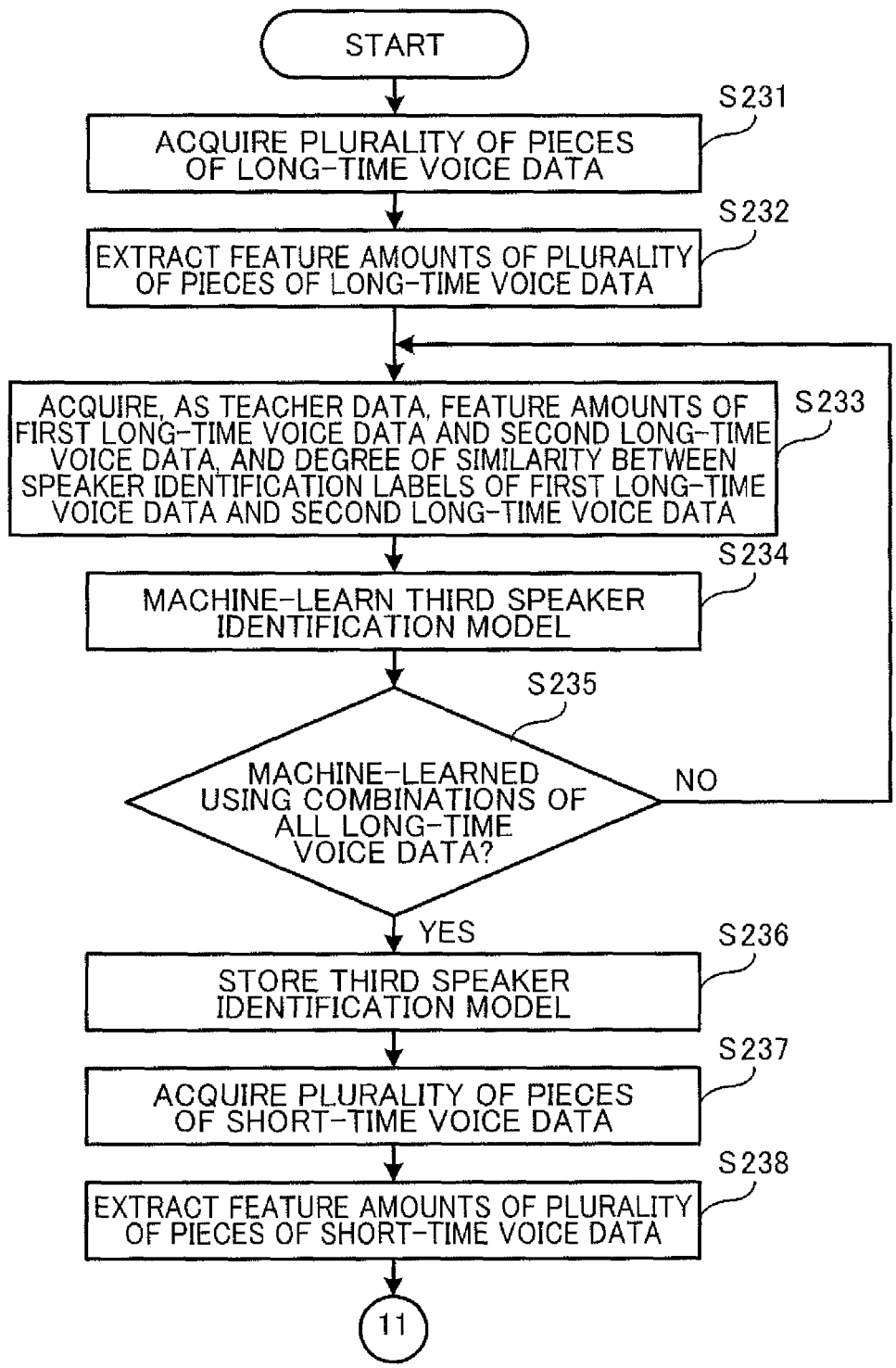
FIG. 30 is a first flowchart for explaining operation of speaker identification model generation processing of the speaker identification model generation device according to the fourth embodiment.
Figure 31:
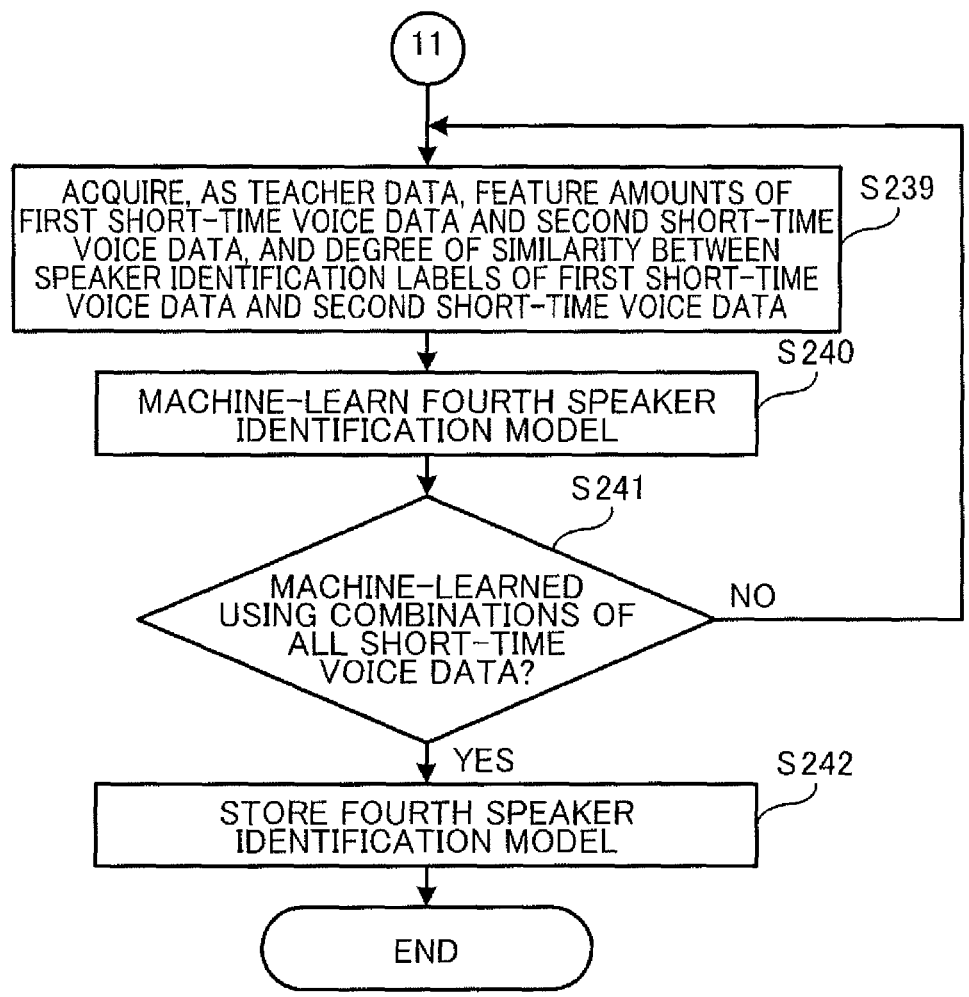
FIG. 31 is a second flowchart for explaining the operation of the speaker identification model generation processing of the speaker identification model generation device according to the fourth embodiment.

FIG. 30 is a first flowchart for explaining the operation of the speaker identification model generation processing of the speaker identification model generation device in the fourth embodiment, and FIG. 31 is a second flowchart for explaining the operation of the speaker identification model generation processing of the speaker identification model generation device in the fourth embodiment.

First, in Step S231, the long-time voice data acquisition unit 422 acquires, from the long-time voice data storage unit 421, a plurality of pieces of long-time voice data to which a speaker identification label for identifying a speaker is assigned and whose utterance time is the predetermined time or longer.

Next, in Step S232, the feature amount extraction unit 423 extracts feature amounts of the plurality of pieces of long-time voice data acquired by the long-time voice data acquisition unit 422.

Next, in Step S233, the third speaker identification model generation unit 424 acquires, as teacher data, the feature amounts of the first long-time voice data and the second long-time voice data among the plurality of pieces of long-time voice data, and the degree of similarity between the speaker identification labels of the first long-time voice data and the second long-time voice data.

Next, in Step S234, using the acquired teacher data, the third speaker identification model generation unit 424 machine-learns the third speaker identification model with the feature amounts of the two pieces of voice data as an input and the degree of similarity between the two pieces of voice data as an output.

Next, in Step S235, the third speaker identification model generation unit 424 determines whether or not the third speaker identification model has been machine-learned using combinations of all the long-time voice data among the plurality of pieces of long-time voice data. In a case where it is determined here that the third speaker identification model has not been machine-learned using the combinations of all the long-time voice data (NO in Step S235), the processing returns to Step S233. Then, the third speaker identification model generation unit 424 acquires, as teacher data, feature amounts of the first long-time voice data and the second long-time voice data whose combination is not used for the machine learning among the plurality of pieces of long-time voice data, and a degree of similarity between the speaker identification labels of the first long-time voice data and the second long-time voice data.

On the other hand, in a case where it is determined that the third speaker identification model has been machine-learned using the combinations of all the long-time voice data (YES in Step S235), in Step S236, the third speaker identification model generation unit 424 stores the third speaker identification model generated by the machine learning in the third speaker identification model storage unit 425.

Next, in Step S237, the short-time voice data acquisition unit 432 acquires, from the short-time voice data storage unit 431, a plurality of pieces of short-time voice data to which a speaker identification label for identifying a speaker is assigned and whose utterance time is shorter than the predetermined time.

Next, in Step S238, the feature amount extraction unit 433 extracts feature amounts of the plurality of pieces of short-time voice data acquired by the short-time voice data acquisition unit 432.

Next, in Step S239, the fourth speaker identification model generation unit 434 acquires, as teacher data, the feature amounts of the first short-time voice data and the second short-time voice data among the plurality of pieces of short-time voice data, and a degree of similarity between the speaker identification labels of the first short-time voice data and the second short-time voice data.

Next, in Step S240, using the acquired teacher data, the fourth speaker identification model generation unit 434 machine-learns the fourth speaker identification model with the feature amounts of the two pieces of voice data as an input and the degree of similarity between the two pieces of voice data as an output.

Next, in Step S241, the fourth speaker identification model generation unit 434 determines whether or not the fourth speaker identification model has been machine-learned using combinations of all the short-time voice data among the plurality of pieces of short-time voice data. In a case where it is determined here that the fourth speaker identification model has not been machine-learned using the combinations of all the short-time voice data (NO in Step S241), the processing returns to Step S239. Then, the fourth speaker identification model generation unit 434 acquires, as teacher data, the feature amounts of the first short-time voice data and the second short-time voice data whose combination is not used for the machine learning among the plurality of pieces of short-time voice data, and a degree of similarity between the speaker identification labels of the first short-time voice data and the second short-time voice data.

On the other hand, in a case where it is determined that the fourth speaker identification model has been machine-learned using combinations of all the short-time voice data (YES in Step S241), in Step S242, the fourth speaker identification model generation unit 434 stores the fourth speaker identification model generated by the machine learning in the fourth speaker identification model storage unit 435.

Fifth Embodiment

In the fourth embodiment, a degree of similarity between each of all the pieces of registered voice data stored in the registered voice data storage unit 2124 and the identification target voice data is calculated, and a speaker of the registered voice data having the highest degree of similarity is identified as the speaker of the identification target voice data. On the other hand, in a fifth embodiment, identification information of a speaker of identification target voice data is input, and one piece of registered voice data associated with the identification information in advance is acquired from among a plurality of pieces of registered voice data stored in the registered voice data storage unit 212. Then, a degree of similarity between the one piece of registered voice data and the identification target voice data is calculated, and in a case where the degree of similarity is higher than a threshold, the speaker of the registered voice data is identified as the speaker of the identification target voice data.

Figure 32:
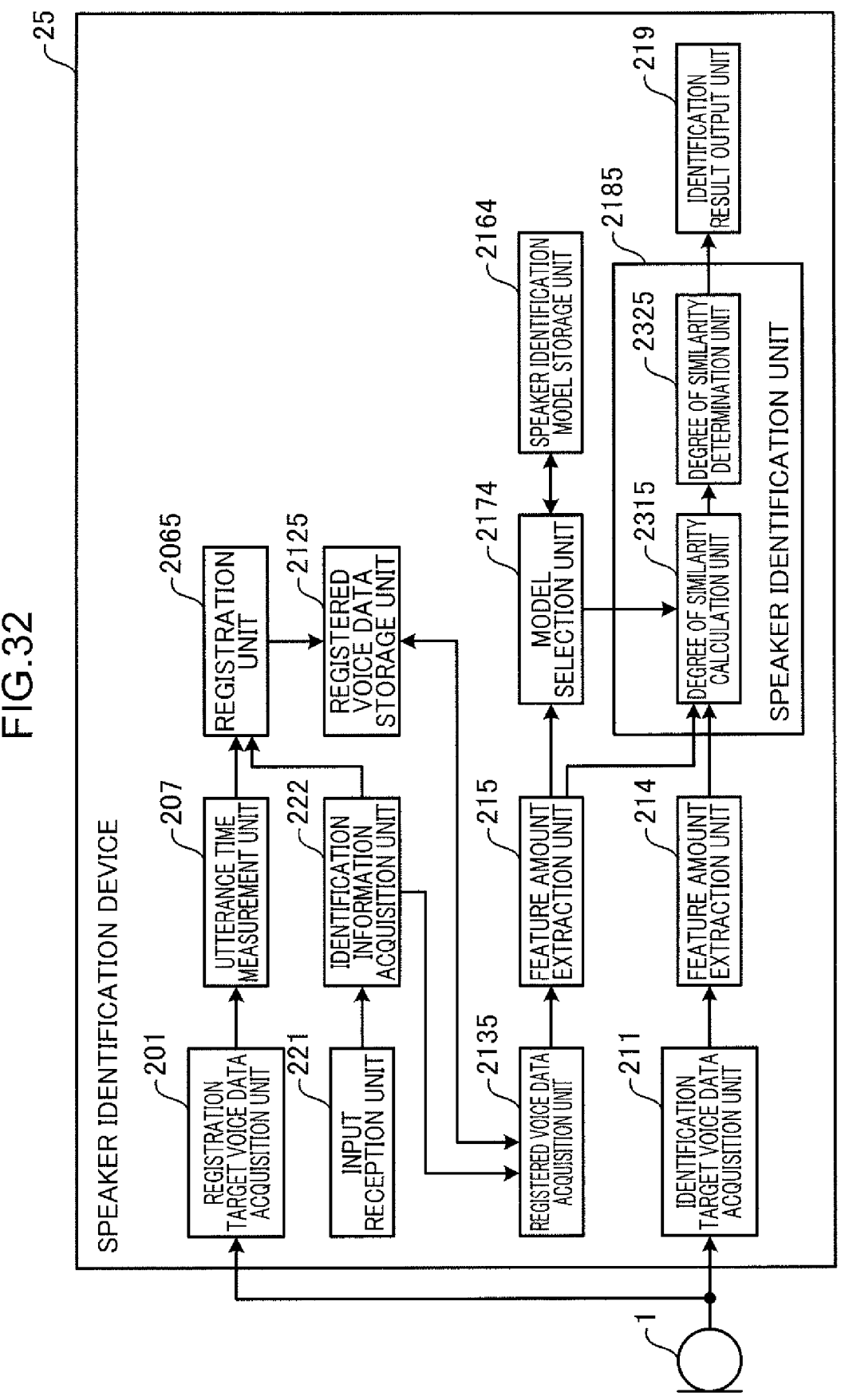
FIG. 32 is a diagram illustrating a configuration of a speaker identification system according to a fifth embodiment of the present disclosure.

FIG. 32 is a diagram illustrating a configuration of a speaker identification system according to the fifth embodiment of the present disclosure.

The speaker identification system illustrated in FIG. 32 includes a microphone 1 and a speaker identification device 25. Note that the speaker identification device 25 may or may not include the microphone 1.

In the fifth embodiment, the same components as those in the first to fourth embodiments are denoted by the same reference numerals, and description thereof will be omitted.

The speaker identification device 25 includes a registration target voice data acquisition unit 201, an utterance time measurement unit 207, a registration unit 2065, an identification target voice data acquisition unit 211, a registered voice data storage unit 2125, a registered voice data acquisition unit 2135, a feature amount extraction unit 214, a feature amount extraction unit 215, a speaker identification model storage unit 2164, a model selection unit 2174, a speaker identification unit 2185, an identification result output unit 219, an input reception unit 221, and an identification information acquisition unit 222.

The registration unit 2065 registers, as registered voice data, registration target voice data associated with utterance time information indicating an utterance time measured by the utterance time measurement unit 207 and identification information acquired by the identification information acquisition unit 222. The registration unit 2065 registers the registered voice data in the registered voice data storage unit 2125.

The registered voice data storage unit 2125 stores registered voice data associated with utterance time information and identification information. The registered voice data storage unit 2125 stores a plurality of pieces of registered voice data. Each of the plurality of pieces of registered voice data is associated with identification information for identifying a speaker of each of the plurality of pieces of registered voice data.

The registered voice data acquisition unit 2135 acquires registered voice data associated with identification information matching identification information acquired by the identification information acquisition unit 222 from among the plurality of pieces of registered voice data registered in the registered voice data storage unit 2125.

The speaker identification unit 2185 includes a degree of similarity calculation unit 2315 and a degree of similarity determination unit 2325.

The degree of similarity calculation unit 2315 inputs a feature amount of identification target voice data and a feature amount of registered voice data to one of the selected third speaker identification model and fourth speaker identification model to acquire a degree of similarity between the identification target voice data and the registered voice data from one of the third speaker identification model and the fourth speaker identification model.

In a case where the acquired degree of similarity is higher than the threshold, the degree of similarity determination unit 2325 identifies the speaker of the registered voice data as the speaker of the identification target voice data.

Next, operation of each of registration processing and speaker identification processing of the speaker identification device 25 in the fifth embodiment will be described.

Figure 33:
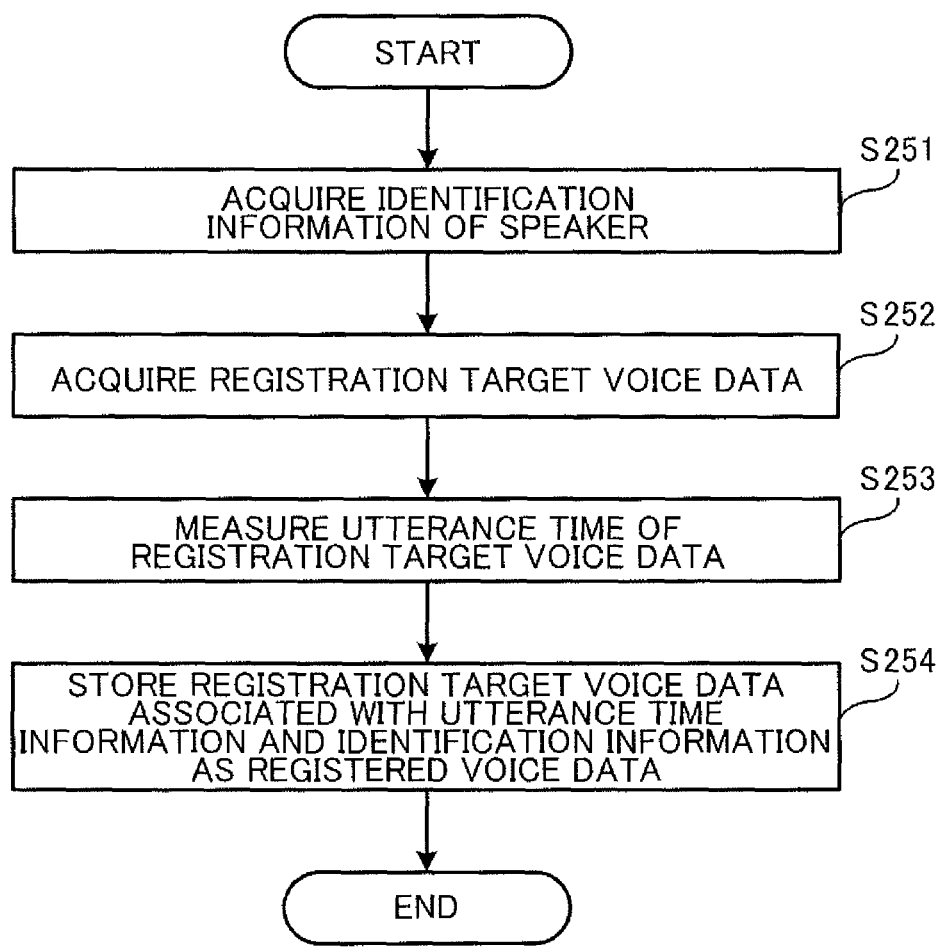
FIG. 33 is a flowchart for explaining operation of registration processing of a speaker identification device according to the fifth embodiment.

FIG. 33 is a flowchart for explaining the operation of the registration processing of the speaker identification device in the fifth embodiment.

Note that processing in Step S251 and Step S252 is the same as the processing in Step S121 and Step S122 shown in FIG. 15, and thus description thereof is omitted. Since processing of Step S253 is the same as the processing of Step S202 illustrated in FIG. 27, description thereof will be omitted.

Next, in Step S254, the registration unit 2065 stores, in the registered voice data storage unit 2125, registration target voice data associated with the utterance time information measured by the utterance time measurement unit 207 and the identification information acquired by the identification information acquisition unit 222 as registered voice data. As a result, the registered voice data storage unit 2125 stores the registered voice data in which the utterance time information and the identification information are associated with each other.

Figure 34:
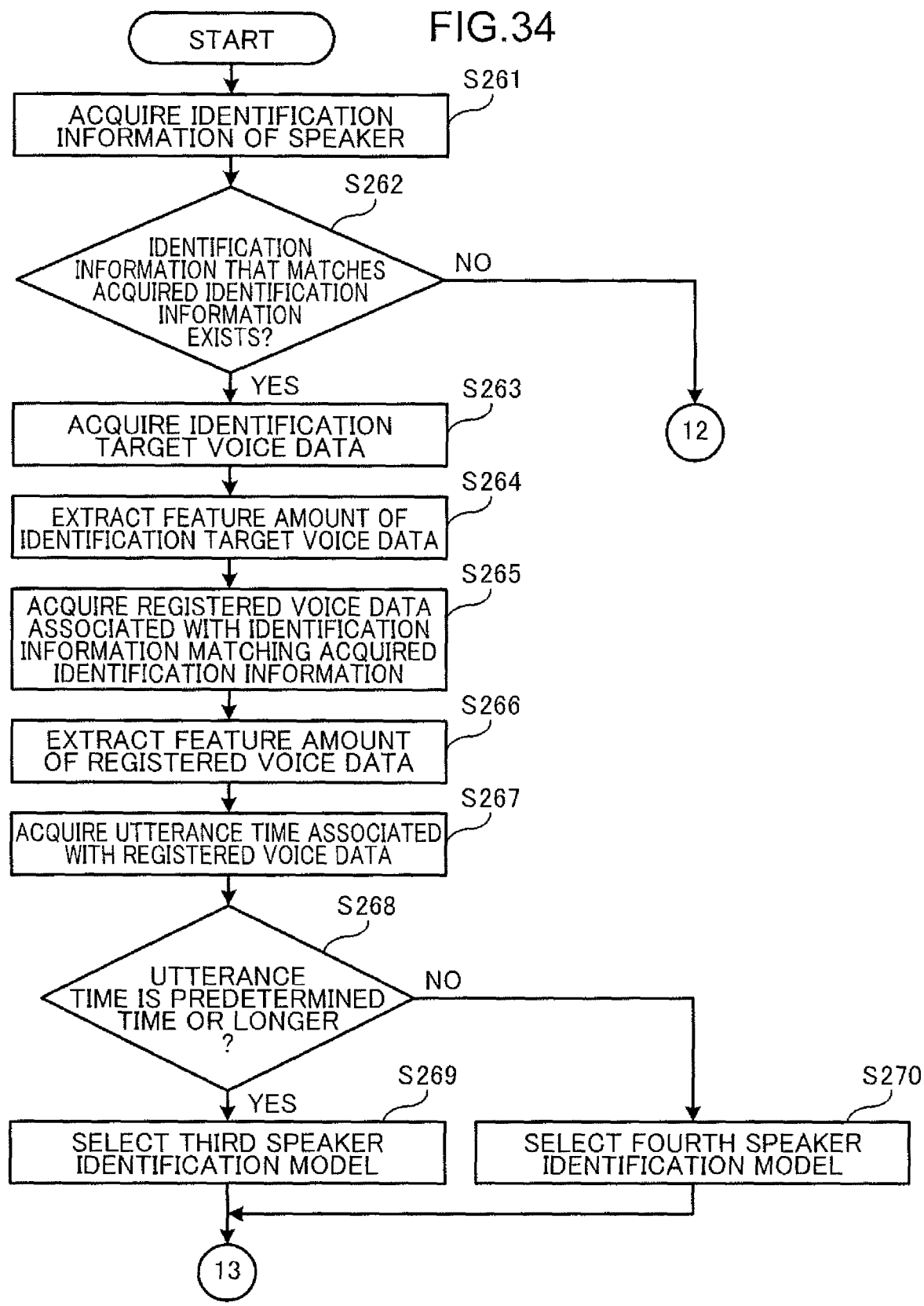
FIG. 34 is a first flowchart for explaining operation of speaker identification processing of the speaker identification device according to the fifth embodiment.
Figure 35:
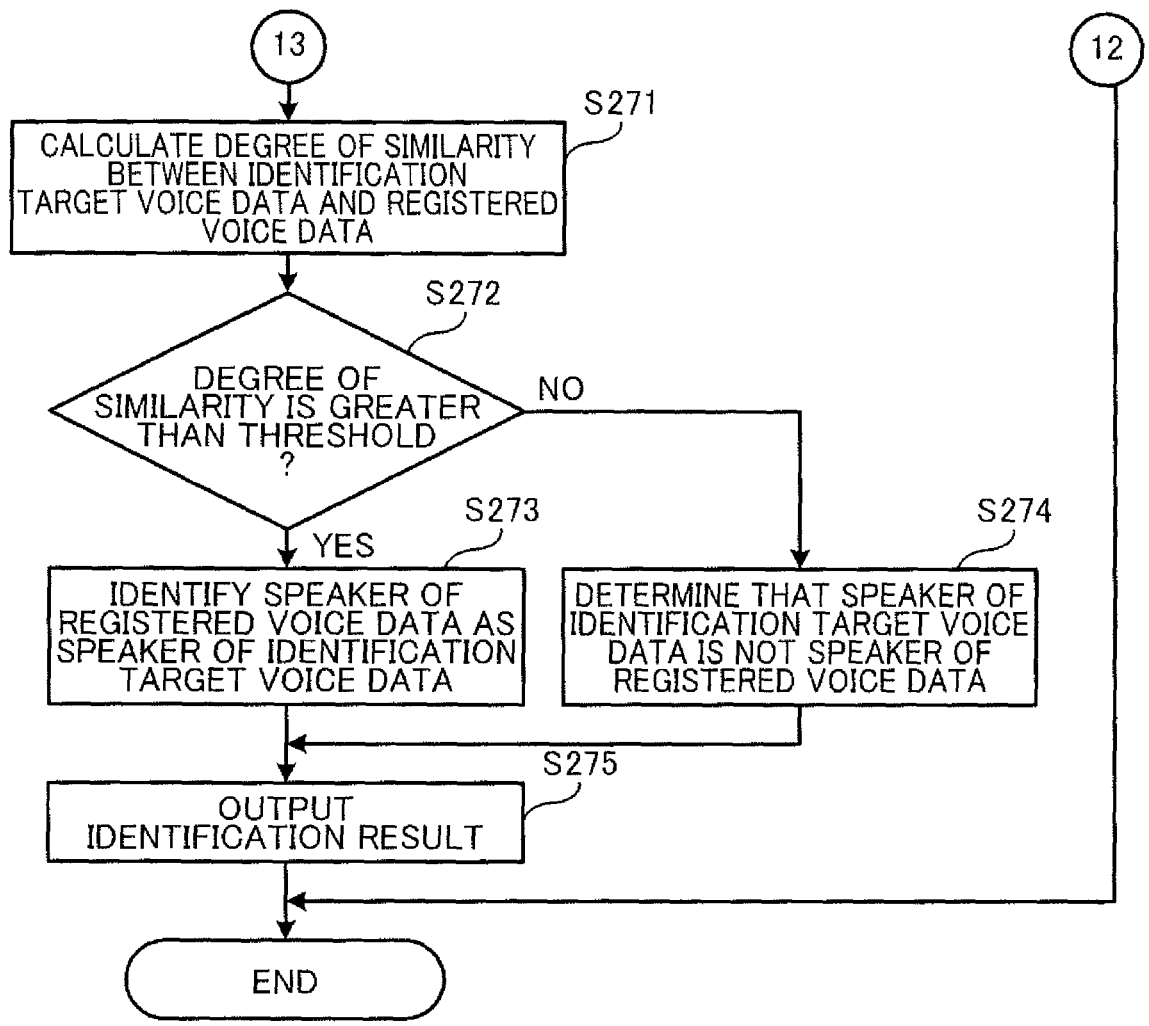
FIG. 35 is a second flowchart for explaining the operation of the speaker identification processing of the speaker identification device according to the fifth embodiment.

FIG. 34 is a first flowchart for explaining the operation of the speaker identification processing of the speaker identification device in the fifth embodiment, and FIG. 35 is a second flowchart for explaining the operation of the speaker identification processing of the speaker identification device in the fifth embodiment.

Since processing of Steps S261 to S264 is the same as the processing of Steps S131 to S134 illustrated in FIG. 16, description thereof will be omitted.

Next, in Step S265, the registered voice data acquisition unit 2135 acquires registered voice data associated with identification information matching the identification information acquired by the identification information acquisition unit 222 from among the plurality of pieces of registered voice data registered in the registered voice data storage unit 2125.

Since processing of Steps S266 to S270 is the same as the processing of Steps S214 to S218 illustrated in FIG. 28, description thereof will be omitted.

Next, in Step S271, the degree of similarity calculation unit 2315 inputs a feature amount of the identification target voice data and a feature amount of the registered voice data to one of the selected third speaker identification model and fourth speaker identification model to acquire a degree of similarity between the identification target voice data and the registered voice data from one of the third speaker identification model and the fourth speaker identification model.

Next, in Step S272, the degree of similarity determination unit 2325 determines whether or not the degree of similarity calculated by the degree of similarity calculation unit 2315 is greater than the threshold.

In a case where it is determined here that the degree of similarity calculated by the degree of similarity calculation unit 2315 is greater than the threshold (YES in Step S272), in Step S273, the degree of similarity determination unit 2325 identifies the speaker of the registered voice data as the speaker of the identification target voice data.

On the other hand, in a case where it is determined here that the degree of similarity calculated by the degree of similarity calculation unit 2315 is the threshold or lower (NO in Step S272), in Step S274, the degree of similarity determination unit 2325 determines that the speaker of the identification target voice data is not the speaker of the registered voice data.

Since processing of Step S275 is the same as the processing of Step S44 illustrated in FIG. 7, description thereof will be omitted.

As described above, in the fifth embodiment, only a degree of similarity between the registered voice data associated with the identification information and the identification target voice data is calculated. Therefore, as compared with the fourth embodiment in which a plurality of degrees of similarity between the respective pieces of registered voice data and identification target voice data are calculated, a processing load on calculation of a degree of similarity can be reduced in the fifth embodiment.

Sixth Embodiment

Although in the fourth embodiment and the fifth embodiment described above, one of the third speaker identification model and the fourth speaker identification model is selected according to an utterance time of a speaker of registered voice data, in a case where two different third speaker identification model and fourth speaker identification model are used, the third speaker identification model and the fourth speaker identification model may have different ranges of output values. Therefore, in a sixth embodiment, at the time of registering voice data, a third threshold and a fourth threshold enabling identification of the same speaker are calculated for the third speaker identification model and the fourth speaker identification model, respectively, and the calculated third threshold and fourth threshold are stored. Furthermore, at the time of identification of voice data, the third threshold or the fourth threshold is subtracted from the calculated degree of similarity between the identification target voice data and the registered voice data to correct the degree of similarity. Then, a speaker of the identification target voice data is identified by comparing the corrected degree of similarity with a fifth threshold common to the third speaker identification model and the fourth speaker identification model.

First, a speaker identification model generation device according to the sixth embodiment of the present disclosure will be described.

Figure 36:
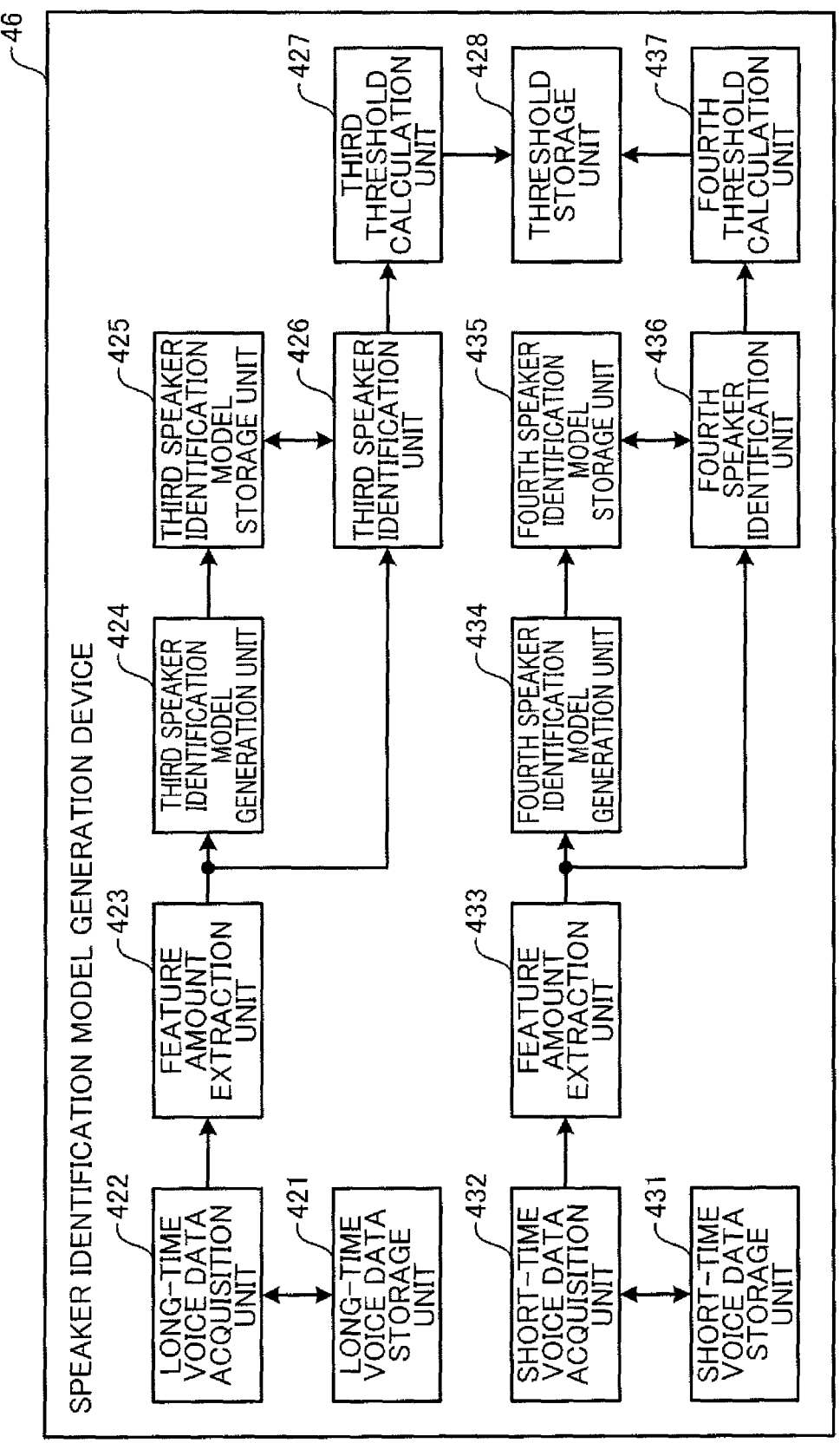
FIG. 36 is a diagram illustrating a configuration of a speaker identification model generation device according to a sixth embodiment of the present disclosure.

FIG. 36 is a diagram illustrating a configuration of the speaker identification model generation device according to the sixth embodiment of the present disclosure.

A speaker identification model generation device 46 illustrated in FIG. 36 includes a long-time voice data storage unit 421, a long-time voice data acquisition unit 422, a feature amount extraction unit 423, a third speaker identification model generation unit 424, a third speaker identification model storage unit 425, a third speaker identification unit 426, a third threshold calculation unit 427, a threshold storage unit 428, a short-time voice data storage unit 431, a short-time voice data acquisition unit 432, a feature amount extraction unit 433, a fourth speaker identification model generation unit 434, a fourth speaker identification model storage unit 435, a fourth speaker identification unit 436, and a fourth threshold calculation unit 437.

In the sixth embodiment, the same components as those in the first to fifth embodiments are denoted by the same reference numerals, and description thereof will be omitted.

The third speaker identification unit 426 inputs all combinations of feature amounts of two pieces of voice data among a plurality of pieces of voice data whose utterance time is a predetermined time or longer to the third speaker identification model, thereby acquiring a degree of similarity of each of the plurality of combinations of the two pieces of voice data from the third speaker identification model.

The third threshold calculation unit 427 calculates a third threshold enabling identification of a degree of similarity between two pieces of voice data of the same speaker and a degree of similarity between two pieces of voice data of different speakers. The third threshold calculation unit 427 calculates the third threshold by performing regression analysis on the plurality of degrees of similarity calculated by the third speaker identification unit 426.

The fourth speaker identification unit 436 inputs all combinations of feature amounts of two pieces of voice data among a plurality of pieces of voice data whose utterance time is the predetermined time or shorter to the fourth speaker identification model, thereby acquiring a degree of similarity of each of the plurality of combinations of the two pieces of voice data from the fourth speaker identification model.

The fourth threshold calculation unit 437 calculates a fourth threshold enabling identification of a degree of similarity between two pieces of voice data of the same speaker and a degree of similarity between two pieces of voice data of different speakers. The fourth threshold calculation unit 437 calculates the fourth threshold by performing regression analysis on the plurality of degrees of similarity calculated by the fourth speaker identification unit 436.

The threshold storage unit 428 stores the third threshold calculated by the third threshold calculation unit 427 and the fourth threshold calculated by the fourth threshold calculation unit 437.

Next, a speaker identification system according to the sixth embodiment of the present disclosure will be described.

Figure 37:
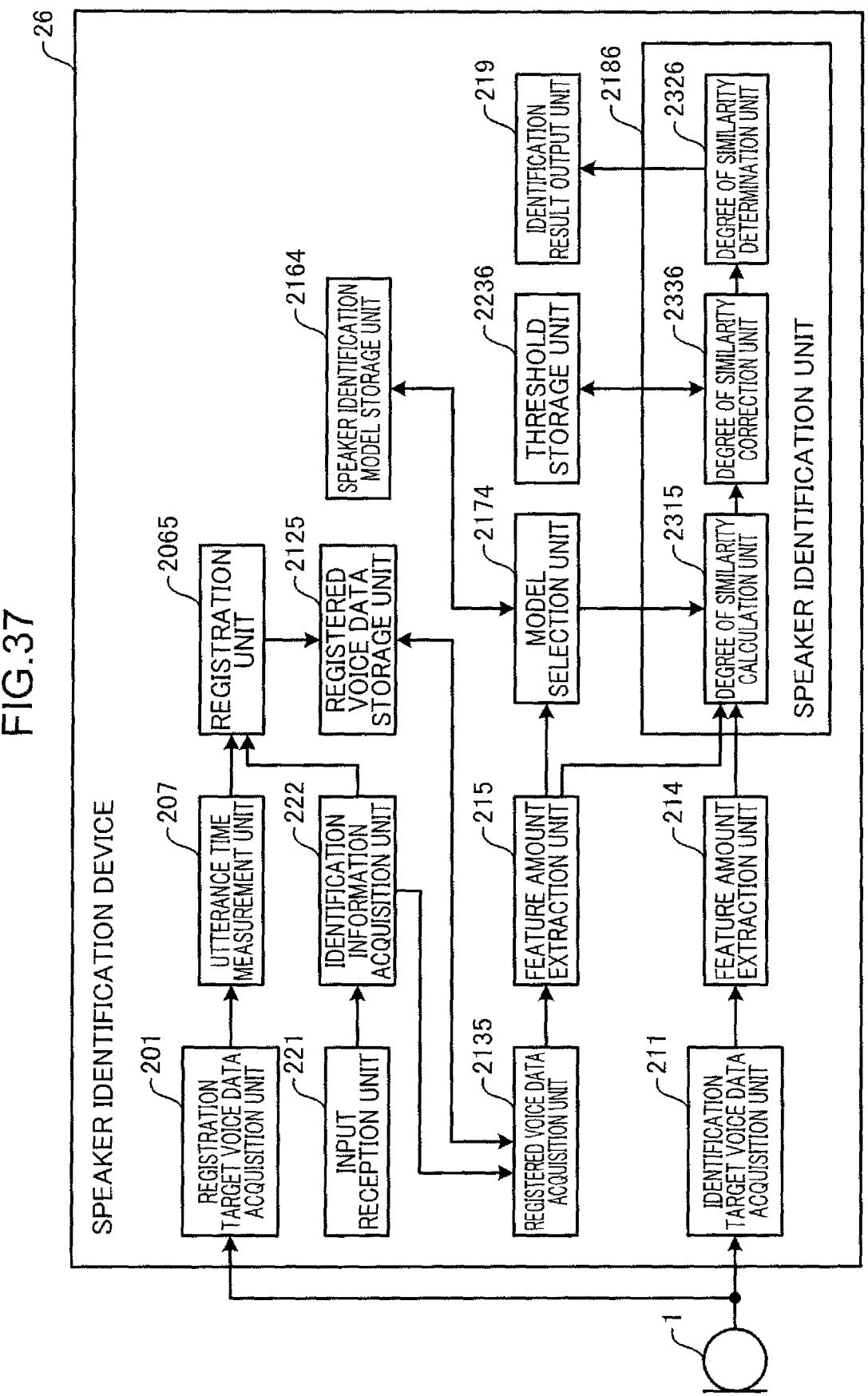
FIG. 37 is a diagram illustrating a configuration of a speaker identification system according to the sixth embodiment of the present disclosure.

FIG. 37 is a diagram illustrating a configuration of the speaker identification system according to the sixth embodiment of the present disclosure.

The speaker identification system illustrated in FIG. 37 includes a microphone 1 and a speaker identification device 26. Note that the speaker identification device 26 may or may not include the microphone 1.

In the sixth embodiment, the same components as those in the first to fifth embodiments are denoted by the same reference numerals, and description thereof will be omitted.

The speaker identification device 26 includes a registration target voice data acquisition unit 201, an utterance time measurement unit 207, a registration unit 2065, an identification target voice data acquisition unit 211, a registered voice data storage unit 2125, a registered voice data acquisition unit 2135, a feature amount extraction unit 214, a feature amount extraction unit 215, a speaker identification model storage unit 2164, a model selection unit 2174, a speaker identification unit 2186, an identification result output unit 219, an input reception unit 221, an identification information acquisition unit 222, and threshold storage unit 2236.

The speaker identification unit 2186 includes a degree of similarity calculation unit 2315, a degree of similarity correction unit 2336, and a degree of similarity determination unit 2326.

When acquiring a degree of similarity from the third speaker identification model, the degree of similarity correction unit 2336 subtracts the third threshold from the acquired degree of similarity. When acquiring a degree of similarity from the fourth speaker identification model, the degree of similarity correction unit 2336 subtracts the fourth threshold from the acquired degree of similarity. When a degree of similarity is calculated by the degree of similarity calculation unit 2315 using the third speaker identification model, the degree of similarity correction unit 2336 reads the third threshold from the threshold storage unit 2236 and subtracts the third threshold from the calculated degree of similarity. When a degree of similarity is calculated by the degree of similarity calculation unit 2315 using the fourth speaker identification model, the degree of similarity correction unit 2336 reads the fourth threshold from the threshold storage unit 2236 and subtracts the fourth threshold from the calculated degree of similarity.

The threshold storage unit 2236 stores in advance the third threshold for correcting a degree of similarity calculated using the third speaker identification model and the fourth threshold for correcting a degree of similarity calculated using the fourth speaker identification model. The threshold storage unit 2236 stores in advance the third threshold and the fourth threshold generated by the speaker identification model generation device 46.

The speaker identification model generation device 46 may transmit the third threshold and the fourth threshold stored in the threshold storage unit 428 to the speaker identification device 26. The speaker identification device 26 may store the received third threshold and fourth threshold in the threshold storage unit 2236. In addition, at the time of manufacturing the speaker identification device 26, the third threshold and the fourth threshold generated by the speaker identification model generation device 46 may be stored in the threshold storage unit 2236.

When a degree of similarity obtained by subtracting the third threshold or the fourth threshold by the degree of similarity correction unit 2336 is higher than the fifth threshold, the degree of similarity determination unit 2326 identifies a speaker of registered voice data as a speaker of identification target voice data.

Next, operation of speaker identification model generation processing of the speaker identification model generation device 46 in the sixth embodiment will be described.

Figure 38:
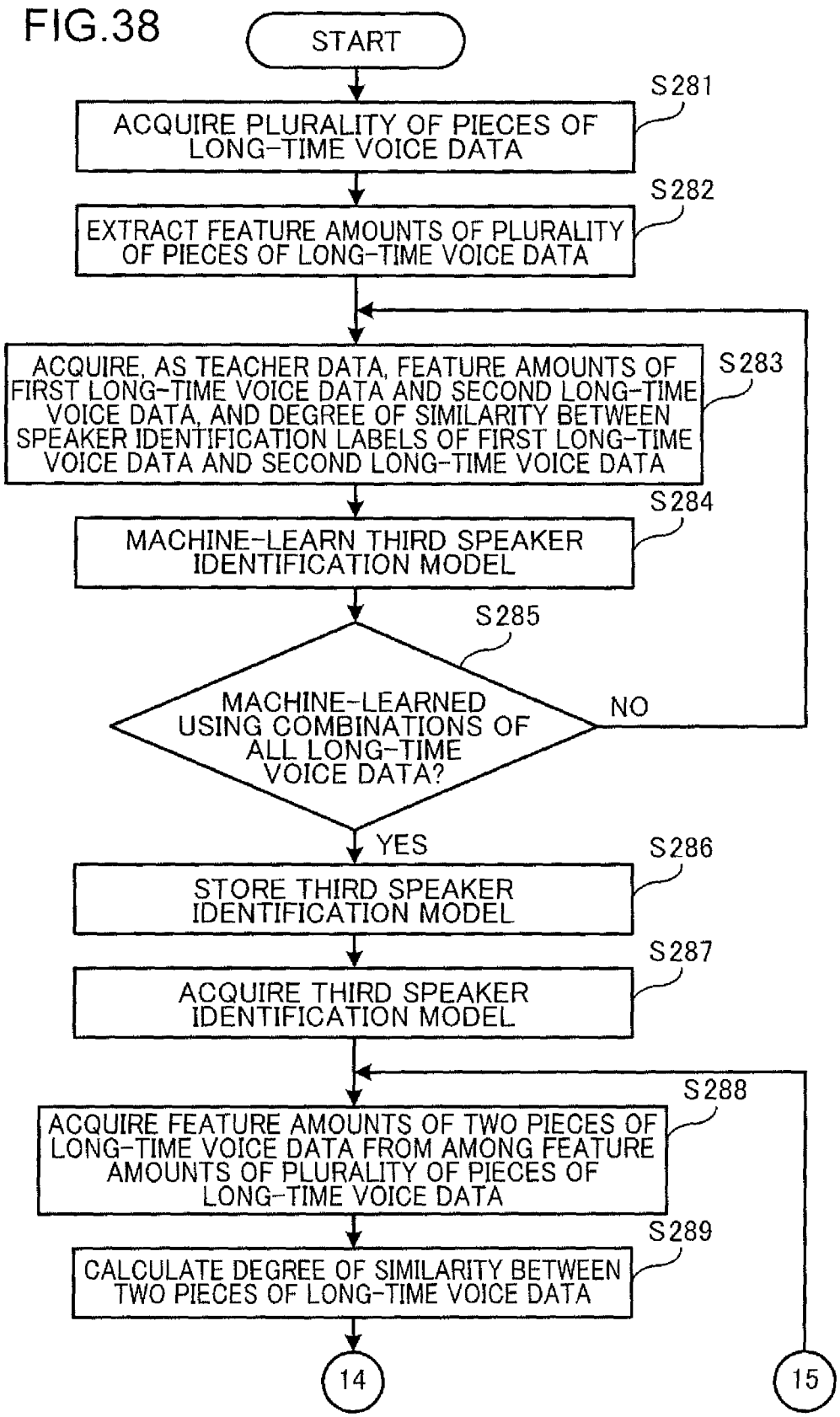
FIG. 38 is a first flowchart for explaining operation of speaker identification model generation processing of the speaker identification model generation device according to the sixth embodiment.
Figure 39:
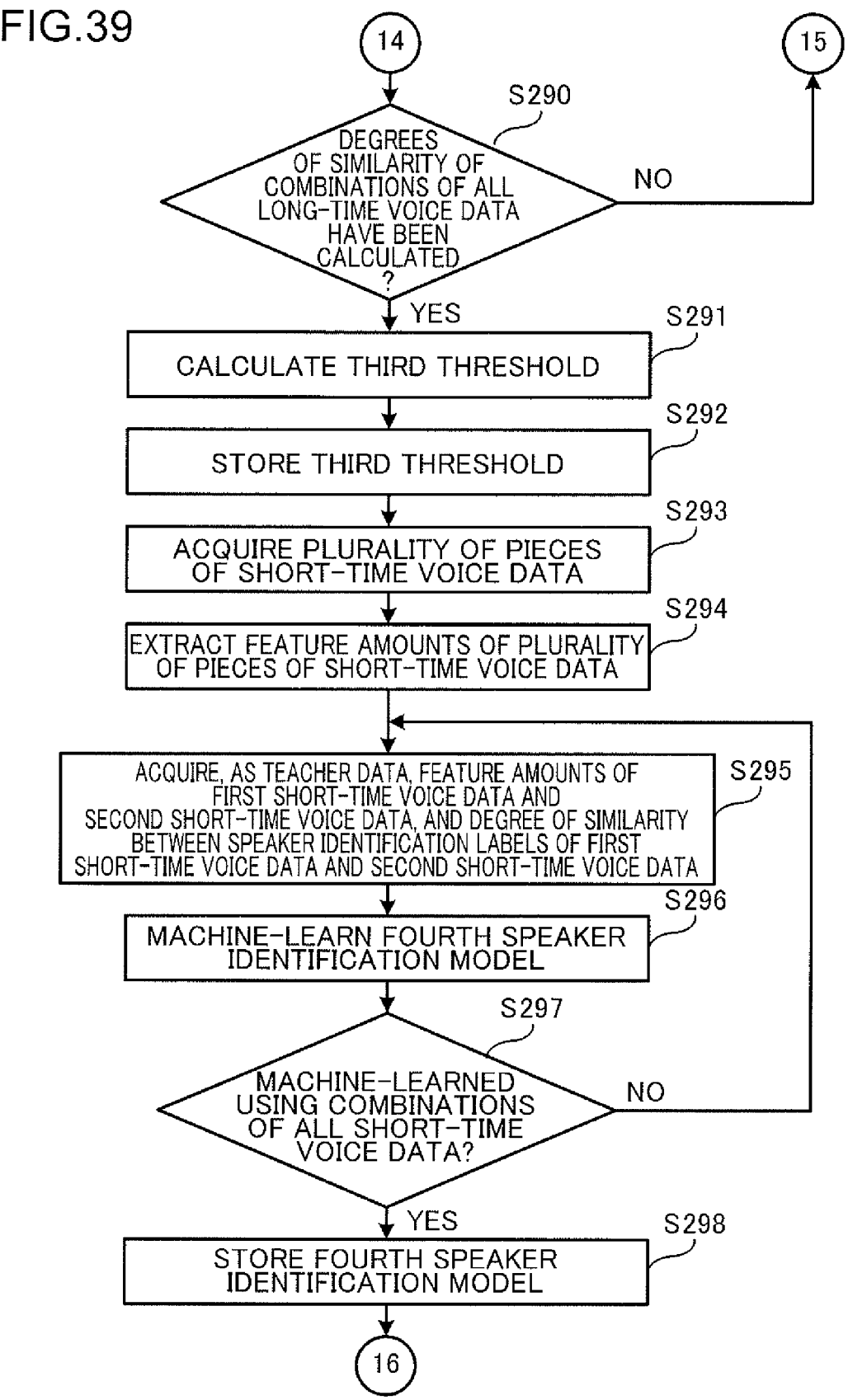
FIG. 39 is a second flowchart for explaining the operation of the speaker identification model generation processing of the speaker identification model generation device according to the sixth embodiment.
Figure 40:
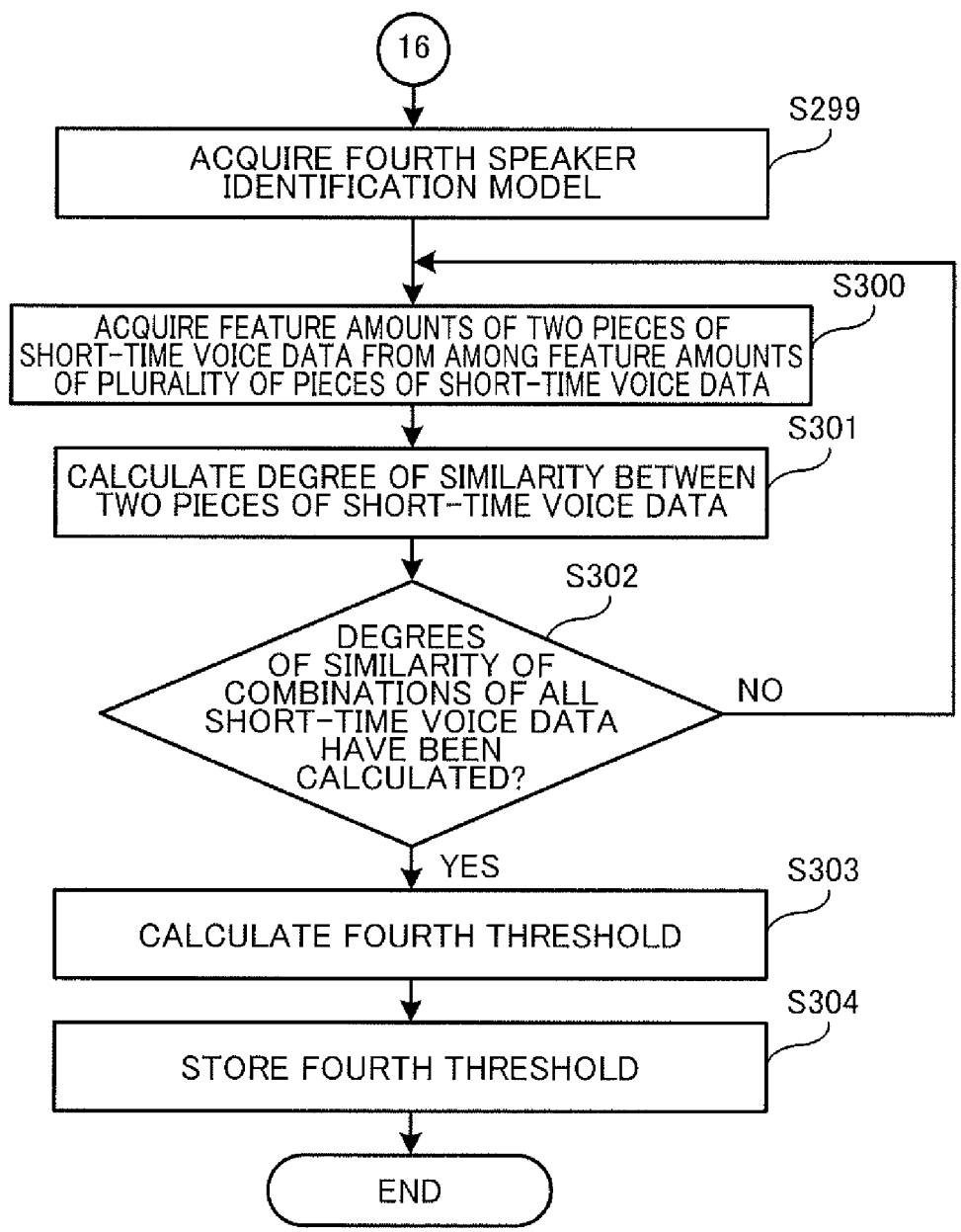
FIG. 40 is a third flowchart for explaining the operation of the speaker identification model generation processing of the speaker identification model generation device according to the sixth embodiment.

FIG. 38 is a first flowchart for explaining the operation of the speaker identification model generation processing of the speaker identification model generation device in the sixth embodiment, FIG. 39 is a second flowchart for explaining the operation of the speaker identification model generation processing of the speaker identification model generation device in the sixth embodiment, and FIG. 40 is a third flowchart for explaining the operation of the speaker identification model generation processing of the speaker identification model generation device in the sixth embodiment.

Since processing of Steps S281 to S286 is the same as the processing of Steps S231 to S236 illustrated in FIG. 30, description thereof will be omitted.

Next, in Step S287, the third speaker identification unit 426 acquires the third speaker identification model from the third speaker identification model storage unit 425.

Next, in Step S288, the third speaker identification unit 426 acquires feature amounts of two pieces of long-time voice data from among the feature amounts of the plurality of pieces of long-time voice data extracted by the feature amount extraction unit 423.

Next, in Step S289, the third speaker identification unit 426 inputs the acquired feature amounts of the two pieces of long-time voice data to the third speaker identification model to calculate a degree of similarity between the two pieces of long-time voice data. Note that the two pieces of long-time voice data are either two long-time voice data uttered by one speaker or two long-time voice data uttered by two speakers. At this time, a degree of similarity in a case where the two pieces of long-time voice data are long-time voice data uttered by one speaker is higher than a degree of similarity in a case where the two pieces of long-time voice data are long-time voice data uttered by two speakers.

Next, in Step S290, the third speaker identification unit 426 determines whether or not degrees of similarity of combinations of all the long-time voice data have been calculated. In a case where it is determined here that the degrees of similarity of combinations of all the long-time voice data have not been calculated (NO in Step S290), the processing returns to Step S288. Then, the third speaker identification unit 426 acquires, from the feature amount extraction unit 423, feature amounts of two pieces of the long-time voice data whose degree of similarity is yet to be calculated from among the feature amounts of the plurality of pieces of long-time voice data.

On the other hand, in a case where it is determined that the degrees of similarity of the combinations of all the long-time voice data have been calculated (YES in Step S290), in Step S291, the third threshold calculation unit 427 performs regression analysis on the plurality of degrees of similarity calculated by the third speaker identification unit 426 to calculate the third threshold that enables identification of a degree of similarity between two pieces of long-time voice data of the same speaker and a degree of similarity between two pieces of long-time voice data of different speakers.

Next, in step S292, the third threshold calculation unit 427 stores the calculated third threshold in the threshold storage unit 428.

Since processing of Steps S293 to S298 is the same as the processing of Steps S237 to S242 illustrated in FIG. 30 and FIG. 31, description thereof will be omitted.

Next, in Step S299, the fourth speaker identification unit 436 acquires the fourth speaker identification model from the fourth speaker identification model storage unit 435.

Next, in Step S300, the fourth speaker identification unit 436 acquires feature amounts of two pieces of short-time voice data from among the feature amounts of the plurality of pieces of short-time voice data extracted by the feature amount extraction unit 433.

Next, in Step S301, the fourth speaker identification unit 436 inputs the acquired feature amounts of the two pieces of short-time voice data to the fourth speaker identification model to calculate a degree of similarity between the two pieces of short-time voice data. Note that the two pieces of short-time voice data are either two pieces of short-time voice data uttered by one speaker or two pieces of short-time voice data uttered by two speakers. At this time, a degree of similarity in a case where the two pieces of short-time voice data are short-time voice data uttered by one speaker is higher than a degree of similarity in a case where the two pieces of short-time voice data are short-time voice data uttered by two speakers.

Next, in Step S302, the fourth speaker identification unit 436 determines whether or not degrees of similarity of combinations of all the short-time voice data have been calculated. In a case where it is determined here that the degrees of similarity of the combinations of all the short-time voice data have not been calculated (NO in Step S302), the processing returns to Step S300. Then, the fourth speaker identification unit 436 acquires, from the feature amount extraction unit 433, feature amounts of two pieces of the short-time voice data whose degree of similarity is yet to be calculated from among the feature amounts of the plurality of pieces of short-time voice data.

On the other hand, in a case where it is determined that the degrees of similarity of the combinations of all the short-time voice data have been calculated (YES in Step S302), in Step S303, the fourth threshold calculation unit 437 performs regression analysis on the plurality of degrees of similarity calculated by the fourth speaker identification unit 436 to calculate the fourth threshold that enables identification of a degree of similarity between two pieces of short-time voice data of the same speaker and a degree of similarity between two pieces of short-time voice data of different speakers.

Next, in Step S304, the fourth threshold calculation unit 437 stores the calculated fourth threshold in the threshold storage unit 428.

Next, operation of speaker identification processing of the speaker identification device 26 in the sixth embodiment will be described.

FIG. 41 is a first flowchart for explaining the operation of the speaker identification processing of the speaker identification device in the sixth embodiment, and FIG. 42 is a second flowchart for explaining the operation of the speaker identification processing of the speaker identification device in the sixth embodiment.

Since processing of Steps S311 to S321 is the same as the processing of Steps S261 to S271 illustrated in FIG. 34 and FIG. 35, description thereof will be omitted.

Next, in Step S322, the degree of similarity correction unit 2336 acquires the third threshold or the fourth threshold from the threshold storage unit 2236. At this time, in a case where the third speaker identification model is selected by the model selection unit 2174, the degree of similarity correction unit 2336 acquires the third threshold from the threshold storage unit 2236. In a case where the fourth speaker identification model is selected by the model selection unit 2174, the degree of similarity correction unit 2336 acquires the fourth threshold from the threshold storage unit 2236.

Next, in Step S323, the degree of similarity correction unit 2336 corrects the degree of similarity calculated by the degree of similarity calculation unit 2315 using the acquired third threshold or fourth threshold. At this time, the degree of similarity correction unit 2336 subtracts the third threshold or the fourth threshold from the degree of similarity calculated by the degree of similarity calculation unit 2315.

Next, in Step S324, the degree of similarity determination unit 2326 determines whether or not the degree of similarity corrected by the degree of similarity correction unit 2336 is greater than the fifth threshold. The fifth threshold is, for example, 0. The degree of similarity determination unit 2326 determines that the identification target voice data matches the registered voice data registered in advance in a case where the corrected degree of similarity is greater than 0, and determines that the identification target voice data does not match the registered voice data registered in advance in a case where the corrected degree of similarity is 0 or lower.

In a case where it is determined here that the degree of similarity corrected by the degree of similarity correction unit 2336 is greater than the fifth threshold (YES in Step S324), in Step S325, the degree of similarity determination unit 2326 identifies the speaker of the registered voice data as a speaker of the identification target voice data.

On the other hand, in a case where it is determined here that the degree of similarity corrected by the degree of similarity correction unit 2336 is the fifth threshold or lower (NO in Step S324), in Step S326, the degree of similarity determination unit 2326 determines that the speaker of the identification target voice data is not the speaker of the registered voice data.

Since processing of Step S327 is the same as the processing of Step S275 illustrated in FIG. 35, description thereof will be omitted.

In a case where two different third speaker identification model and fourth speaker identification model are used, the third speaker identification model and the fourth speaker identification model may have different ranges of output values. Therefore, in the sixth embodiment, at the time of registration, the third threshold and the fourth threshold enabling identification of the same speaker are calculated for the third speaker identification model and the fourth speaker identification model, respectively. In addition, at the time of speaker identification, the third threshold or the fourth threshold is subtracted from the calculated degree of similarity between the identification target voice data and the registered voice data to correct the degree of similarity. Then, the speaker of the identification target voice data is identified more accurately by comparing the corrected degree of similarity with the fifth threshold common to the third speaker identification model and the fourth speaker identification model.

Note that in each of the above embodiments, each component may be configured with dedicated hardware or may be implemented by executing a software program suitable for each component. Each component may be implemented by reading and executing, by a program execution unit such as a CPU or a processor, a software program recorded in a recording medium such as a hard disk or a semiconductor memory.

A part or all of the functions of the devices according to the embodiments of the present disclosure are realized as large scale integration (LSI) that is typically an integrated circuit. These may be individually integrated into one chip, or may be integrated into one chip so as to include a part or all of the functions. Further, the circuit integration is not limited to LSI, and may be realized by a dedicated circuit or a general-purpose processor. A field programmable gate array (FPGA) that can be programmed after manufacturing of LSI, or a reconfigurable processor in which connections and settings of circuit cells inside LSI can be reconfigured may be used.

A part or all of the functions of the devices according to the embodiments of the present disclosure may be implemented by execution of a program by a processor such as a CPU.

In addition, the numbers used above are all illustrated to specifically describe the present disclosure, and the present disclosure is not limited to the illustrated numbers.

In addition, the order in which each step illustrated in the above flowchart is executed is for specifically describing the present disclosure, and may be an order other than the above order as long as a similar effect can be obtained. In addition, a part of the above steps may be executed simultaneously (in parallel) with other steps.

INDUSTRIAL APPLICABILITY

Since the technique according to the present disclosure enables improvement of accuracy of identifying whether or not an identification target speaker is a speaker registered in advance, the technique is useful as a technique for identifying a speaker.

The invention claimed is:

1. A speaker identification method comprising, by a computer:
  acquiring identification target voice data;
  acquiring registered voice data registered in advance;
  extracting a feature amount of the identification target voice data;
  extracting a feature amount of the registered voice data;
  selecting a first speaker identification model machine-learned using male voice data to identify a male speaker in a case where one of a sex of a speaker of the identification target voice data and a sex of a speaker of the registered voice data is male, and selecting a second speaker identification model machine-learned using female voice data to identify a female speaker in a case where one of the sex of the speaker of the identification target voice data and the sex of the speaker of the registered voice data is female;
  inputting the feature amount of the identification target voice data and the feature amount of the registered voice data to a selected one of the first speaker identification model and the second speaker identification model to identify the speaker of the identification target voice data,
  acquiring registration target voice data;
  extracting a feature amount of the registration target voice data;
  identifying a sex of a speaker of the registration target voice data using the feature amount of the registration target voice data; and
  registering the registration target voice data associated with the identified sex as the registered voice data, wherein
  the identification of the sex of the registration target voice data includes:
    acquiring a sex identification model machine-learned by using male and female voice data to identify a sex of a speaker;
    by inputting the feature amount of the registration target voice data and a feature amount of each of a plurality of pieces of male voice data stored in advance to the sex identification model, acquiring a degree of similarity between the registration target voice data and each of the plurality of pieces of male voice data from the sex identification model;
    calculating an average of the acquired plurality of degrees of similarity between the registration target voice data and the plurality of pieces of male voice data as an average male degree of similarity;
    by inputting the feature amount of the registration target voice data and a feature amount of each of a plurality of pieces of female voice data stored in advance to the sex identification model, acquiring a degree of similarity between the registration target voice data and each of the plurality of pieces of female voice data from the sex identification model;

calculating an average of the acquired plurality of degrees of similarity between the registration target voice data and the plurality of pieces of female voice data as an average female degree of similarity;

in a case where the average male degree of similarity is higher than the average female degree of similarity, identifying the sex of the speaker of the registration target voice data as male; and in a case where the average male degree of similarity is lower than the average female degree of similarity, identifying the sex of the speaker of the registration target voice data as female.

2. The speaker identification method according to claim 1, wherein the selection of the first speaker identification model or the second speaker identification model includes:

selecting the first speaker identification model in a case where the sex of the speaker of the registered voice data is male; and selecting the second speaker identification model in a case where the sex of the speaker of the registered voice data is female.

3. The speaker identification method according to claim 1, wherein the registered voice data includes a plurality of pieces of registered voice data, and the identification of the speaker includes:

by inputting the feature amount of the identification target voice data and the feature amount of each of the plurality of pieces of registered voice data to the selected one of the first speaker identification model and the second speaker identification model, acquiring a degree of similarity between the identification target voice data and each of the plurality of pieces of registered voice data from the selected one of the first speaker identification model and the second speaker identification model; and identifying a speaker of the registered voice data whose acquired degree of similarity is highest as a speaker of the identification target voice data.

4. The speaker identification method according to claim 3, wherein in machine learning, by inputting all combinations of feature amounts of two pieces of voice data among a plurality of pieces of male voice data to the first speaker identification model, a degree of similarity of each of the combinations of the two pieces of voice data is acquired from the first speaker identification model to calculate a first threshold that enables identification of the degree of similarity between the two pieces of voice data of a same speaker and the degree of similarity between the two pieces of voice data of different speakers, in machine learning, by inputting all combinations of feature amounts of two pieces of voice data among a plurality of pieces of female voice data to the second speaker identification model, a degree of similarity of each of the combinations of the two pieces of voice data is acquired from the second speaker identification model to calculate a second threshold that enables identification of the degree of similarity between the two pieces of voice data of a same speaker and the degree of similarity between the two pieces of voice data of different speakers, and the identification of the speaker includes, in a case where the degree of similarity is acquired from the first speaker identification model, subtracting the first threshold from the acquired degree of similarity, and in a case where the degree of similarity is acquired from the second speaker identification model, subtracting the second threshold from the acquired degree of similarity.

5. The speaker identification method according to claim 1, wherein the registered voice data includes a plurality of pieces of registered voice data, the plurality of pieces of registered voice data being associated with identification information for identifying a speaker of each of the plurality of pieces of registered voice data, the speaker identification method further comprising:

acquiring identification information for identifying the speaker of the identification target voice data, wherein the acquisition of the registered voice data includes acquiring registered voice data associated with identification information matching the acquired identification information from among the plurality of pieces of registered voice data, and the identification of the speaker includes:

by inputting the feature amount of the identification target voice data and the feature amount of the registered voice data to the selected one of the first speaker identification model and the second speaker identification model, acquiring a degree of similarity between the identification target voice data and the registered voice data from the selected one of the first speaker identification model and the second speaker identification model; and in a case where the acquired degree of similarity is higher than a threshold, identifying the speaker of the registered voice data as the speaker of the identification target voice data.

6. The speaker identification method according to claim 5, wherein in machine learning, by inputting all combinations of feature amounts of two pieces of voice data among a plurality of pieces of male voice data to the first speaker identification model, a degree of similarity of each of the combinations of the two pieces of voice data is acquired from the first speaker identification model to calculate a first threshold that enables identification of the degree of similarity between the two pieces of voice data of a same speaker and the degree of similarity between the two pieces of voice data of different speakers, in machine learning, by inputting all combinations of feature amounts of two pieces of voice data among a plurality of pieces of female voice data to the second speaker identification model, a degree of similarity of each of the combinations of the two pieces of voice data is acquired from the second speaker identification model to calculate a second threshold that enables identification of the degree of similarity between the two pieces of voice data of a same speaker and the degree of similarity between the two pieces of voice data of different speakers, and the identification of the speaker includes, in a case where the degree of similarity is acquired from the first speaker identification model, subtracting the first threshold from the acquired degree of similarity, and in a case where the degree of similarity is acquired from the second speaker identification model, subtracting the second threshold from the acquired degree of similarity.

7. A speaker identification device comprising:
an identification target voice data acquisition unit that acquires identification target voice data;
a registered voice data acquisition unit that acquires registered voice data registered in advance;
a first extraction unit that extracts a feature amount of the identification target voice data;
a second extraction unit that extracts a feature amount of the registered voice data;
a speaker identification model selection unit that selects a first speaker identification model machine-learned using male voice data to identify a male speaker in a case where one of a sex of a speaker of the identification target voice data and a sex of a speaker of the registered voice data is male, and selects a second speaker identification model machine-learned using female voice data to identify a female speaker in a case where one of the sex of the speaker of the identification target voice data and the sex of the speaker of the registered voice data is female;
a speaker identification unit that identifies the speaker of the identification target voice data by inputting the feature amount of the identification target voice data and the feature amount of the registered voice data to a selected one of the first speaker identification model and the second speaker identification model;
a registration target voice data acquisition unit that acquires registration target voice data;
a third extraction unit that extracts a feature amount of the registration target voice data;
a sex identification unit that identifies a sex of a speaker of the registration target voice data using the feature amount of the registration target voice data; and
a registration unit that registers the registration target voice data associated with the identified sex as the registered voice data, wherein
the sex identification unit:
  acquires a sex identification model machine-learned by using male and female voice data to identify a sex of a speaker;
  by inputting the feature amount of the registration target voice data and a feature amount of each of a plurality of pieces of male voice data stored in advance to the sex identification model, acquires a degree of similarity between the registration target voice data and each of the plurality of pieces of male voice data from the sex identification model;
  calculates an average of the acquired plurality of degrees of similarity between the registration target voice data and the plurality of pieces of male voice data as an average male degree of similarity;
  by inputting the feature amount of the registration target voice data and a feature amount of each of a plurality of pieces of female voice data stored in advance to the sex identification model, acquires a degree of similarity between the registration target voice data and each of the plurality of pieces of female voice data from the sex identification model;
  calculates an average of the acquired plurality of degrees of similarity between the registration target voice data and the plurality of pieces of female voice data as an average female degree of similarity;
  in a case where the average male degree of similarity is higher than the average female degree of similarity, identifies the sex of the speaker of the registration target voice data as male; and
  in a case where the average male degree of similarity is lower than the average female degree of similarity, identifies the sex of the speaker of the registration target voice data as female.

8. A non-transitory computer readable recording medium storing a speaker identification program causing a computer to function to:
acquire identification target voice data;
acquire registered voice data registered in advance;
extract a feature amount of the identification target voice data;
extract a feature amount of the registered voice data;
select a first speaker identification model machine-learned using male voice data to identify a male speaker in a case where one of a sex of a speaker of the identification target voice data and a sex of a speaker of the registered voice data is male, and select a second speaker identification model machine-learned using female voice data to identify a female speaker in a case where one of the sex of the speaker of the identification target voice data and the sex of the speaker of the registered voice data is female;
input the feature amount of the identification target voice data and the feature amount of the registered voice data to a selected one of the first speaker identification model and the second speaker identification model to identify the speaker of the identification target voice data;
acquire registration target voice data;
extract a feature amount of the registration target voice data;
identify a sex of a speaker of the registration target voice data using the feature amount of the registration target voice data; and
register the registration target voice data associated with the identified sex as the registered voice data, wherein
the identification of the sex of the registration target voice data includes:
  acquiring a sex identification model machine-learned by using male and female voice data to identify a sex of a speaker;
  by inputting the feature amount of the registration target voice data and a feature amount of each of a plurality of pieces of male voice data stored in advance to the sex identification model, acquiring a degree of similarity between the registration target voice data and each of the plurality of pieces of male voice data from the sex identification model;
  calculating an average of the acquired plurality of degrees of similarity between the registration target voice data and the plurality of pieces of male voice data as an average male degree of similarity;
  by inputting the feature amount of the registration target voice data and a feature amount of each of a plurality of pieces of female voice data stored in advance to the sex identification model, acquiring a degree of similarity between the registration target voice data and each of the plurality of pieces of female voice data from the sex identification model;
  calculating an average of the acquired plurality of degrees of similarity between the registration target voice data and the plurality of pieces of female voice data as an average female degree of similarity;
  in a case where the average male degree of similarity is higher than the average female degree of similarity, identifying the sex of the speaker of the registration target voice data as male; and in a case where the average male degree of similarity is lower than the average female degree of similarity, identifying the sex of the speaker of the registration target voice data as female.

* * * * *